(12) United States Patent
Seok et al.

(10) Patent No.: US 12,212,507 B2
(45) Date of Patent: Jan. 28, 2025

(54) METHOD FOR TRANSMITTING UPLINK CHANNEL IN WIRELESS COMMUNICATION SYSTEM, AND DEVICE THEREFOR

(71) Applicant: WILUS INSTITUTE OF STANDARDS AND TECHNOLOGY INC., Gyeonggi-do (KR)

(72) Inventors: Geunyoung Seok, Gyeonggi-do (KR); Kyungjun Choi, Gyeonggi-do (KR); Minseok Noh, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 18/241,120

(22) Filed: Aug. 31, 2023

(65) Prior Publication Data

US 2024/0163034 A1    May 16, 2024

Related U.S. Application Data

(63) Continuation of application No. 18/103,457, filed on Jan. 30, 2023, now Pat. No. 11,863,472, which is a
(Continued)

(30) Foreign Application Priority Data

Jul. 31, 2020 (KR) .................. 10-2020-0096439
Aug. 8, 2020 (KR) .................. 10-2020-0099536
(Continued)

(51) Int. Cl.
*H04L 5/00* (2006.01)
*H04L 5/14* (2006.01)

(52) U.S. Cl.
CPC .......... *H04L 5/0012* (2013.01); *H04L 5/0051* (2013.01); *H04L 5/1469* (2013.01)

(58) Field of Classification Search
CPC .... H04L 5/0012; H04L 5/0051; H04L 5/1469
See application file for complete search history.

(56) References Cited

U.S. PATENT DOCUMENTS

2016/0150504 A1* 5/2016 Chae ...................... H04B 1/713
                                                                375/133
2019/0028143 A1* 1/2019 Zhang ................... H04L 5/0044
(Continued)

FOREIGN PATENT DOCUMENTS

EP          3 713 099            9/2020
KR    10-2019-0067731            6/2019
(Continued)

OTHER PUBLICATIONS

Office Action dated Dec. 20, 2023 for Indian Patent Application No. 202327010458.
(Continued)

*Primary Examiner* — Shukri Taha
(74) *Attorney, Agent, or Firm* — Womble Bond Dickinson (US) LLP

(57) ABSTRACT

A method by which a terminal transmits an uplink channel in a wireless communication system comprises steps of: receiving, from a base station, first information, which is information related to a time division duplex (TDD) configuration; and repeatedly transmitting, to the base station, an uplink channel on a resource determined on the basis of the first information.

20 Claims, 48 Drawing Sheets

(a) PUSCH repetition type A (b) PUSCH repetition type B

Related U.S. Application Data continuation of application No. PCT/KR2021/010089, filed on Aug. 2, 2021.

(30) Foreign Application Priority Data

| Aug. 18, 2020 | (KR) | ................... 10-2020-0103571 |
| Aug. 25, 2020 | (KR) | ................... 10-2020-0107438 |
| Jan. 12, 2021 | (KR) | ................... 10-2021-0004309 |
| Feb. 25, 2021 | (KR) | ................... 10-2021-0025337 |

(56) References Cited

U.S. PATENT DOCUMENTS

| 2020/0127786 | A1 | 4/2020 | Kwak et al. |
| 2020/0214006 | A1 | 7/2020 | Choi et al. |
| 2021/0258820 | A1 | 8/2021 | Dao |
| 2021/0345362 | A1* | 11/2021 | Kim .................. H04W 28/02 |
| 2022/0104219 | A1 | 3/2022 | Sridhara et al. |
| 2022/0132534 | A1 | 4/2022 | Jang et al. |
| 2022/0248430 | A1 | 8/2022 | Ly et al. |
| 2022/0311472 | A1 | 9/2022 | Ly et al. |
| 2023/0179348 | A1 | 6/2023 | Seok et al. |

FOREIGN PATENT DOCUMENTS

| KR | 10-2020-0041943 | 4/2020 |
| WO | 2018/194412 | 10/2018 |
| WO | 2019/097658 | 5/2019 |
| WO | 2020/040534 | 2/2020 |
| WO | 2020/067821 | 4/2020 |
| WO | 2022/025740 | 2/2022 |
| WO | 2022/031919 | 2/2022 |
| WO | 2022/147621 | 7/2022 |
| WO | 2022/151406 | 7/2022 |
| WO | 2022/151868 | 7/2022 |
| WO | 2022/152195 | 7/2022 |
| WO | 2022/152217 | 7/2022 |
| WO | 2022/155108 | 7/2022 |
| WO | 2022/236565 | 11/2022 |

OTHER PUBLICATIONS

Extended European Search Report dated Dec. 21, 2023 for European Patent Application No. 21850954.5.

Apple Inc.: "Remaining issues on PUSCH enhancements", 3GPP TSG RAN WG1 #100-e, R1-2000856, e-Meeting, Feb. 15, 2020, pp. 1-4.

International Search Report for PCT/KR2021/010089 mailed on Nov. 30, 2021 and its English translation from WIPO (now published as WO 2022/025740).

Written Opinion of the International Searching Authority for PCT/KR2021/010089 mailed on Nov. 30, 2021 and its English translation from WIPO (now published as WO 2022/025740).

Notice of Allowance dated May 11, 2023 for U.S. Appl. No. 18/103,457 (now published as US 2023/0179348).

Office Action dated Mar. 21, 2024 for U.S. Appl. No. 18/241,152.

Office Action dated Apr. 1, 2024 for Japanese Patent Application No. 2023-506545 and its English translation provided by Applicant's foreign counsel.

Office Action dated Oct. 24, 2024 for European Patent Application No. 21 850 954.5.

Notice of Allowance dated Nov. 11, 2024 for Japanese Patent Application No. 2023-506545 and its English translation from Global Dossier.

* cited by examiner

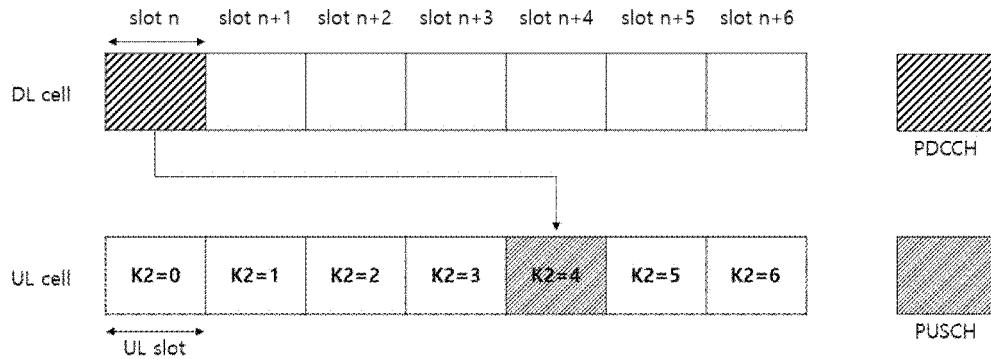
(a) PUSCH scheduling in time (K2)
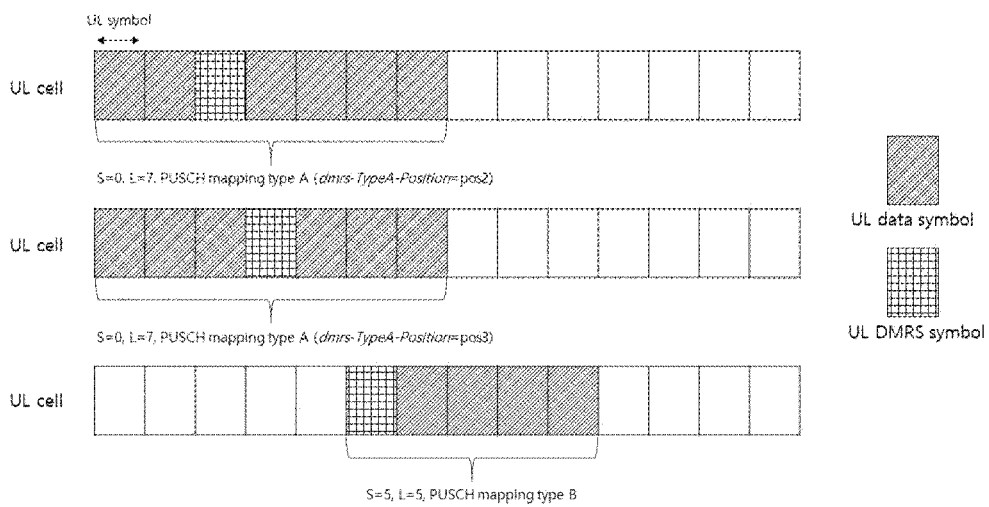
(b) PUSCH scheduling in time (SLIV)
*FIG. 12*

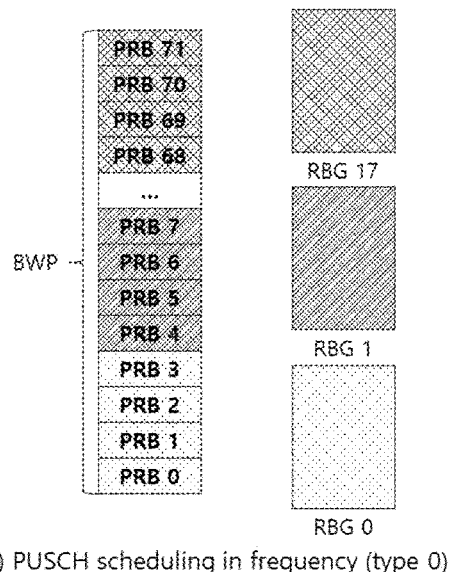
(a) PUSCH scheduling in frequency (type 0)
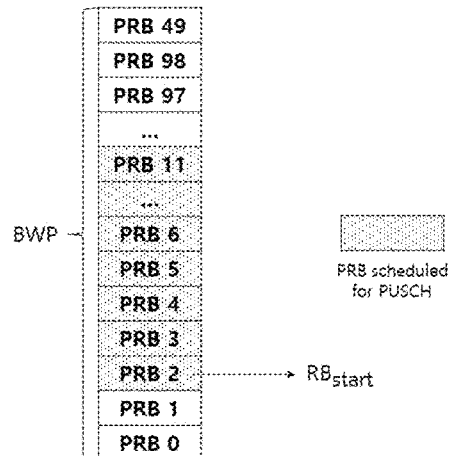
(b) PUSCH scheduling in frequency (type 1)
FIG. 13

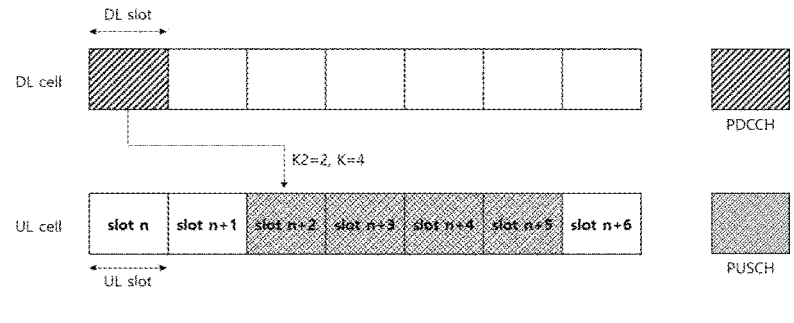
(a) PUSCH repetition type A
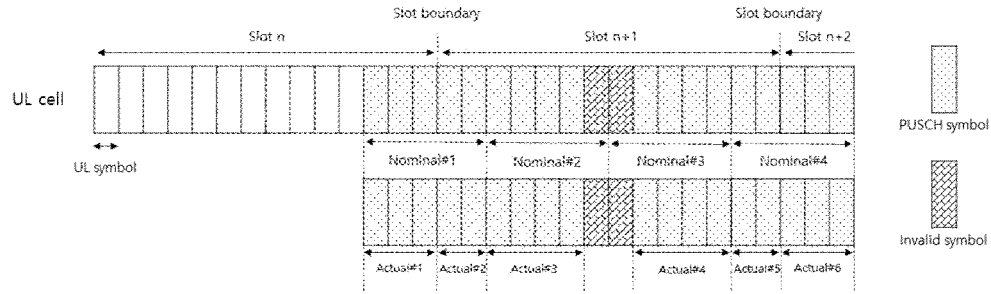
(b) PUSCH repetition type B
FIG. 14
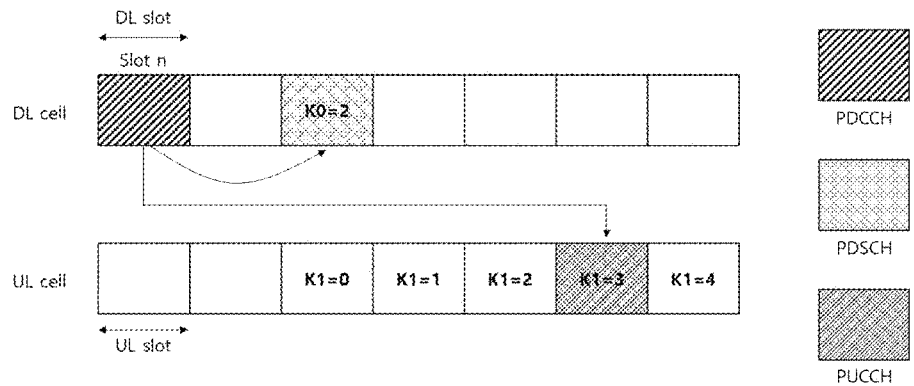
FIG. 15

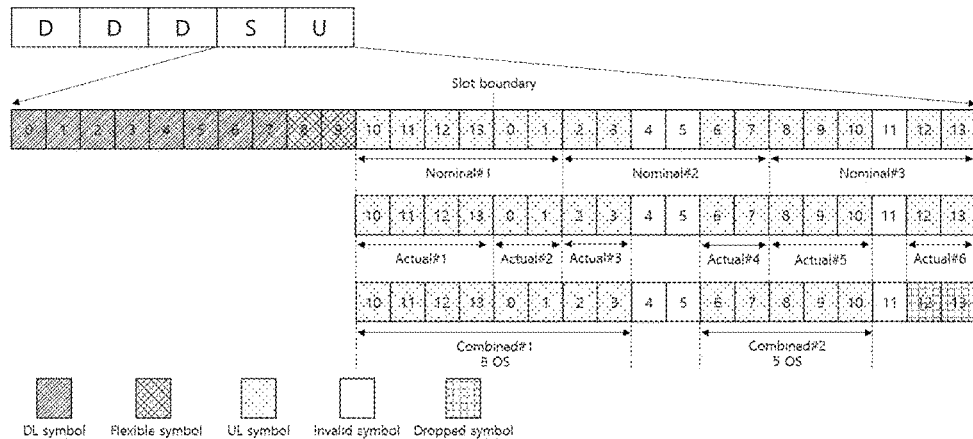
(a) Maximum number of combined symbols is limited (14 OS)
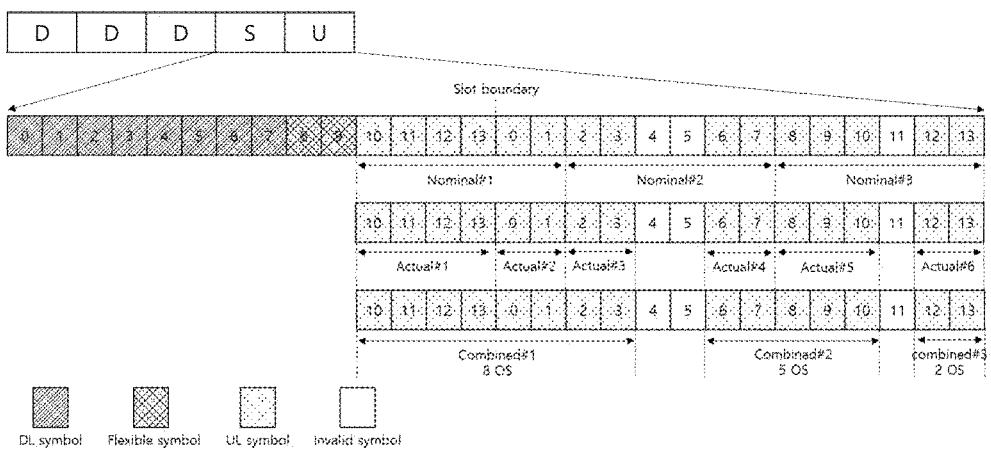
(b) Maximum number of combined symbols is not limited
FIG. 19

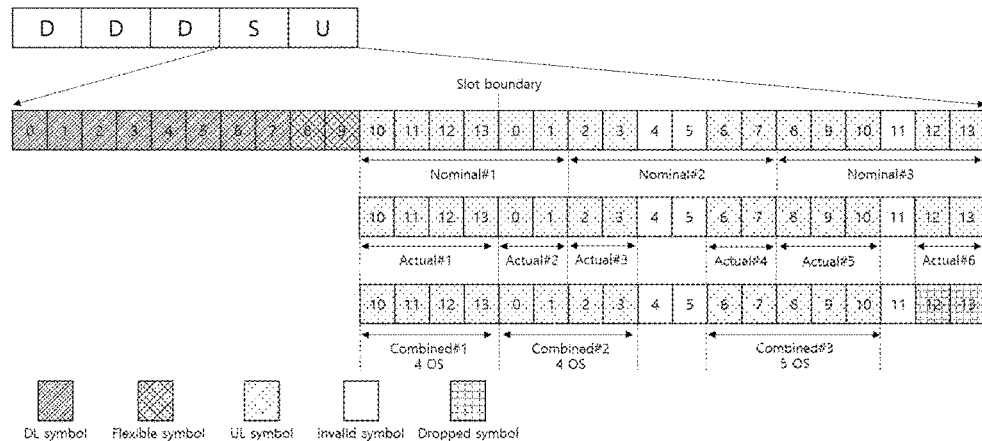
(a) Maximum number of combined symbols is limited (14 OS)
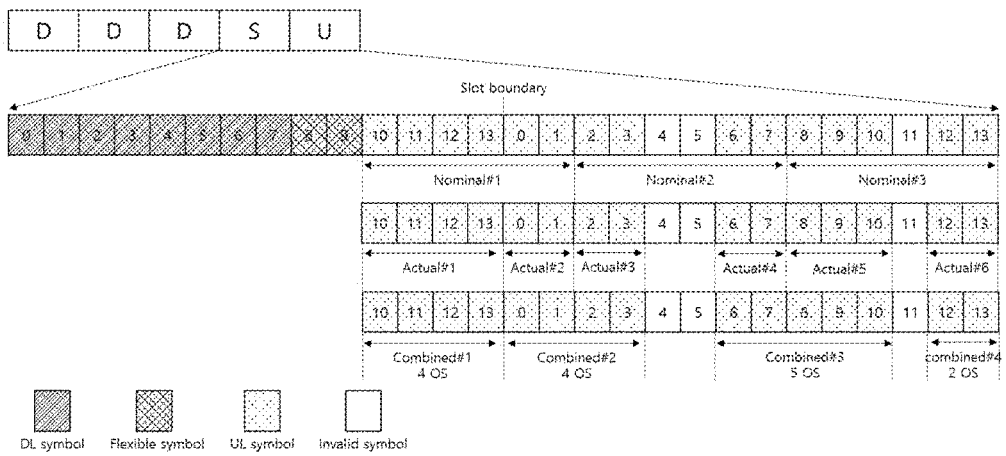
(b) Maximum number of combined symbols is not limited
FIG. 20

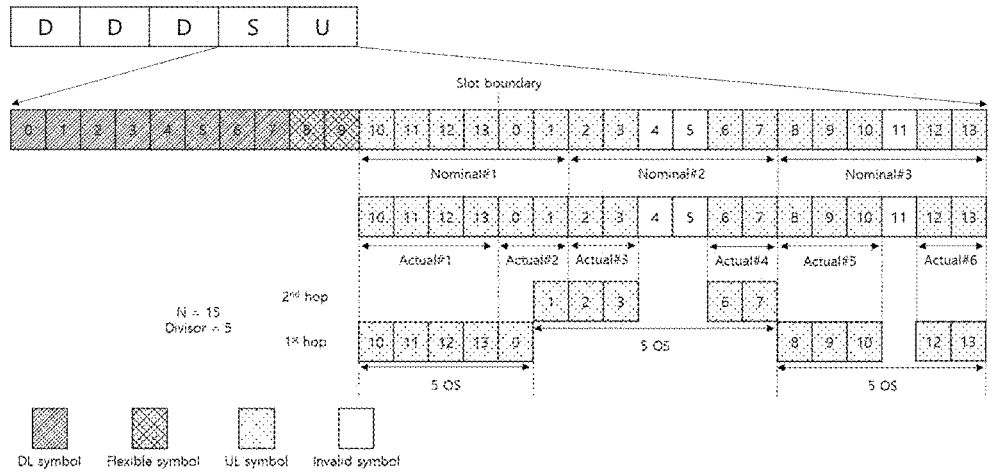
(a) UE selects the number of symbols per hop as 5
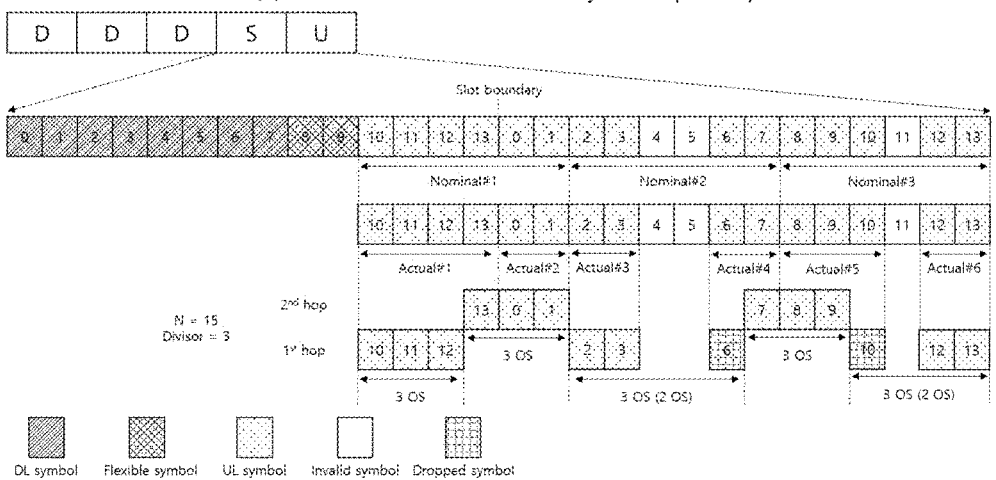
(b) UE selects the number of symbols per hop as 3
FIG. 26

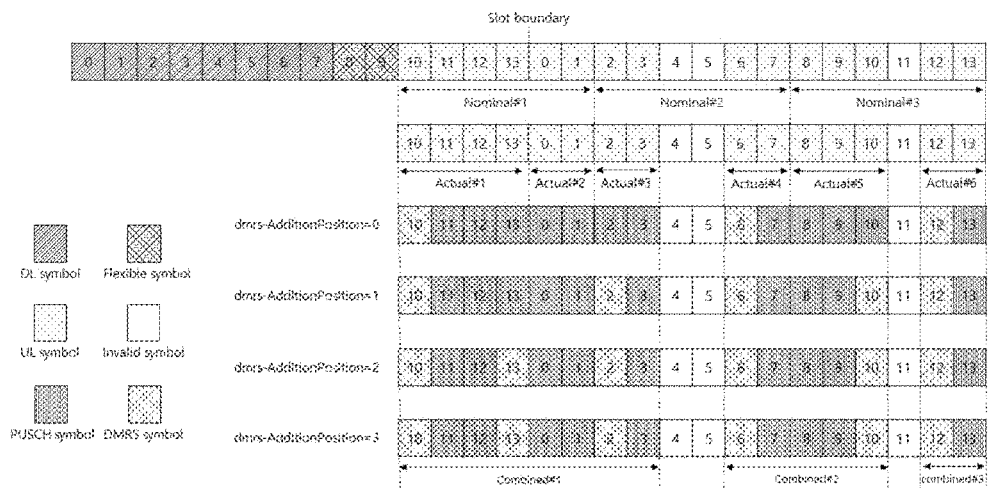
(a) DMRS positions without frequency hopping
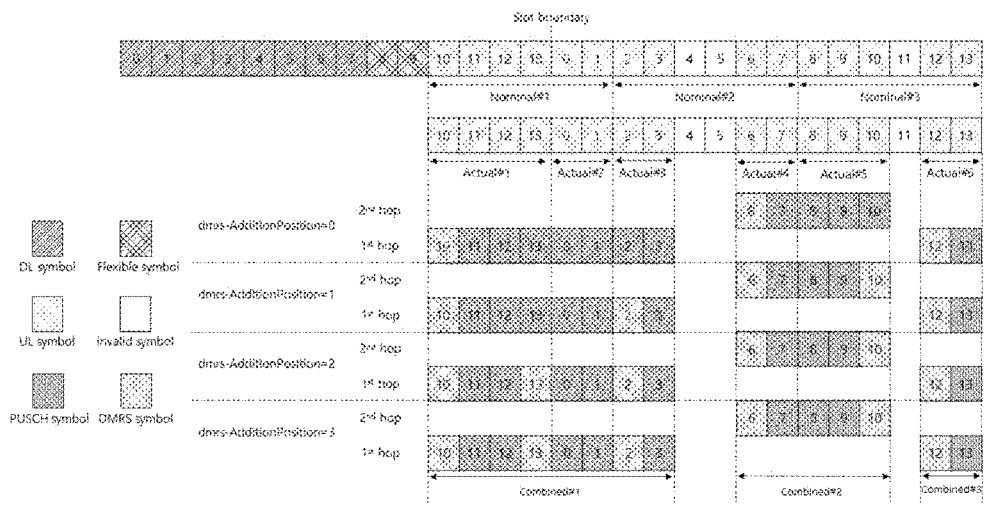
(b) DMRS positions with frequency hopping
*FIG. 27*

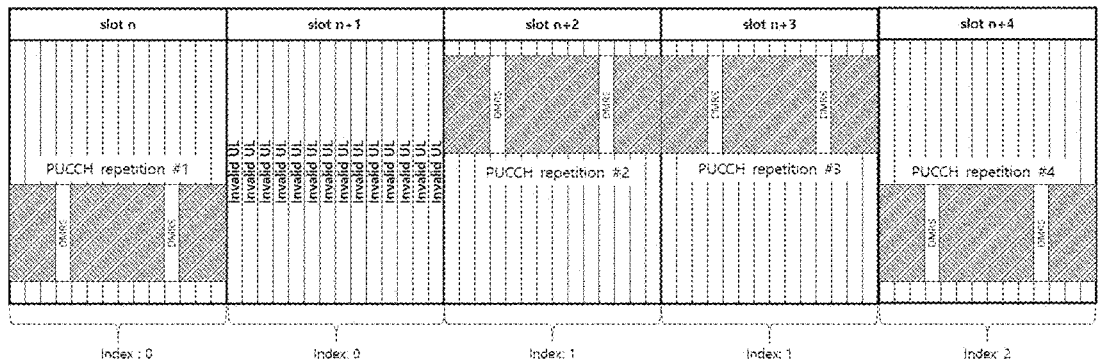
FIG. 49
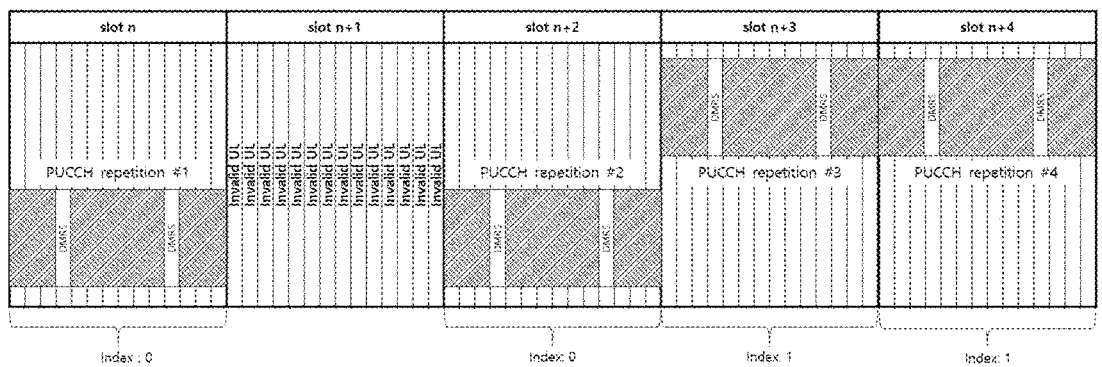
FIG. 50
| slot n | slot n+1 | slot n+2 | slot n+3 | slot n+4 | slot n+5 | slot n+6 |
|---|---|---|---|---|---|---|
| 1st hop | Invalid UL | Invalid UL | 2nd hop | 1st hop | Invalid UL | 2nd hop |
| index: 0 | 0 | 1 | 1 | 2 | 2 | 3 |
(a) First embodiment (Case 1, N=4, M=2)
| slot n | slot n+1 | slot n+2 | slot n+3 | slot n+4 | slot n+5 | slot n+6 |
|---|---|---|---|---|---|---|
| 1st hop | Invalid UL | Invalid UL | 1st hop | 2nd hop | Invalid UL | 2nd hop |
| index: 0 | | | 0 | 1 | | 1 |
(b) Second embodiment (Case 1, N=4, M=2)
FIG. 51

| | slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|---|
| | 1st hop | 1st hop | 2nd hop | Invalid UL | Invalid UL | 1st hop | 2nd hop | Invalid UL | 1st hop | 1st hop | 2nd hop |
| index: | 0 | 0 | 1 | 1 | 2 | 2 | 3 | 3 | 4 | 4 | 5 |

(a) First embodiment (Case 2, N=8, M=2)

| | slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|---|
| | 1st hop | 1st hop | 2nd hop | Invalid UL | Invalid UL | 2nd hop | 1st hop | Invalid UL | 1st hop | 2nd hop | 2nd hop |
| index: | 0 | 0 | 1 | | | 1 | 2 | | 2 | 3 | 3 |

(b) Second embodiment (Case 2, N=8, M=2)

FIG. 52

| | | slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|---|---|
| case 1) N=4 M=2 | | 1st hop | Invalid UL | Invalid UL | 2nd hop | 2nd hop | Invalid UL | 1st hop | | | | |
| | index: | 0 | | | 1 | 1 | | 2 | | | | |

(a) Third embodiment (Case 1, N=4, M=2)

| | | slot n | slot n+1 | slot n+2 | slot n+3 | slot n+4 | slot n+5 | slot n+6 | slot n+7 | slot n+8 | slot n+9 | slot n+10 |
|---|---|---|---|---|---|---|---|---|---|---|---|---|
| case 2) N=8 M=2 | | 1st hop | 1st hop | 2nd hop | Invalid UL | Invalid UL | 1st hop | 1st hop | Invalid UL | 2nd hop | 2nd hop | 1st hop |
| | index: | 0 | 0 | 1 | | | 2 | 2 | | 3 | 3 | 4 |

(b) Third embodiment (Case 2, N=8, M=2)

| slot n | slot n+1 | slot n+2 | slot n+3 | slot n+4 | slot n+5 | slot n+6 | slot n+7 |
|---|---|---|---|---|---|---|---|
| | Repetition#2 | | | | | | |
| Repetition#1 | | | | | | | |

2nd hop / 1st hop

N=4, M=2

| slot n | slot n+1 | slot n+2 | slot n+3 | slot n+4 | slot n+5 | slot n+6 | slot n+7 |
|---|---|---|---|---|---|---|---|
| | | Repetition#3 | Repetition#4 | | | | |
| Repetition#1 | Repetition#2 | | | | | | |

2nd hop / 1st hop

N=8, M=2

| slot n | slot n+1 | slot n+2 | slot n+3 | slot n+4 | slot n+5 | slot n+6 | slot n+7 |
|---|---|---|---|---|---|---|---|
| | | Repetition#3 | Repetition#4 | Repetition#5 | Repetition#6 | Repetition#7 | Repetition#8 |
| Repetition#1 | Repetition#2 | | | | | | |

2nd hop / 1st hop

FIG. 57

| slot 0 | slot 1 | slot 2 | slot 3 | slot 4 | slot 5 |
|---|---|---|---|---|---|
| 0 | 1 | 1 | ~~1~~ | ~~0~~ | 1 |

(a)

| slot 0 | slot 1 | slot 2 | slot 3 | slot 4 | slot 5 |
|---|---|---|---|---|---|
| 0 | 0 | 0 | ~~1~~ | ~~1~~ | 0 |

| slot 0 | slot 1 | slot 2 | slot 3 | slot 4 | slot 5 |
|---|---|---|---|---|---|
| 0 | 1 | 2 | ~~3~~ | ~~0~~ | 1 |

(a)

| slot 0 | slot 1 | slot 2 | slot 3 | slot 4 | slot 5 |
|---|---|---|---|---|---|
| 0 | 1 | 2 | ~~0~~ | ~~1~~ | 0 |

| slot 0 | slot 1 | slot 2 | slot 3 | slot 4 | slot 5 |
|---|---|---|---|---|---|
| 0 | 1 | ✗ | ✗ | 2 | 3 |

(a)

| slot 0 | slot 1 | slot 2 | slot 3 | slot 4 | slot 5 |
|---|---|---|---|---|---|
| (0,2) | (1,2) | ✗ | ✗ | (2,4) | (3,4) |

| slot 0 | slot 1 | slot 2 | slot 3 | slot 4 | slot 5 |
|---|---|---|---|---|---|
| 0 | 0 | 0 | ✗ | ✗ | 1 |

(a)

| slot 0 | slot 1 | slot 2 | slot 3 | slot 4 | slot 5 |
|---|---|---|---|---|---|
| 0 | 0 | 0 | ✗ | ✗ | 2 |

(b)

| slot 0 | slot 1 | slot 2 | slot 3 | slot 4 | slot 5 |
|---|---|---|---|---|---|
| 0 | 0 | ✗ | ✗ | 1 | 1 |

METHOD FOR TRANSMITTING UPLINK CHANNEL IN WIRELESS COMMUNICATION SYSTEM, AND DEVICE THEREFOR

CROSS-REFERENCE TO RELATED APPLICATIONS

This application is a continuation of U.S. patent application Ser. No. 18/103,457 filed on Jan. 30, 2023, which is a continuation of pending PCT International Application No. PCT/KR2021/010089, which was filed on Aug. 2, 2021, and which claims priority under 35 U.S.C 119(a) to Korean Patent Application No. 10-2020-0096439 filed with the Korean Intellectual Property Office on Jul. 31, 2020, Korean Patent Application No. 10-2020-0099536 filed with the Korean Intellectual Property Office on Aug. 8, 2020, Korean Patent Application No. 10-2020-0103571 filed with the Korean Intellectual Property Office on Aug. 18, 2020, Korean Patent Application No. 10-2020-0107438 filed with the Korean Intellectual Property Office on Aug. 25, 2020, Korean Patent Application No. 10-2021-0004309 filed with the Korean Intellectual Property Office on Jan. 12, 2021, Korean Patent Application No. 10-2021-0025337 filed with the Korean Intellectual Property Office on Feb. 25, 2021, the entire contents of which are incorporated herein by reference.

TECHNICAL FIELD

The present specification relates to a wireless communication system and, more particularly, to a method for transmitting an uplink channel and a device therefor.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture. For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

The present specification is to provide a method for transmitting an uplink channel and a device therefor in a wireless communication system.

Solution to Problem

The present specification provides a method for transmitting an uplink channel and a device therefor in a wireless communication system.

A method for performing uplink channel transmission in a wireless communication system, the method being performed by a terminal, includes: receiving, from a base station, first information that is information related to a time division duplex (TDD) configuration, wherein the first information includes information on types of symbols constituting a slot, and the types of the symbols include one of a downlink symbol configured to be available for downlink transmission, an uplink symbol configured to be available for uplink transmission, and a flexible symbol configured to be neither the downlink symbol nor the uplink symbol; and repeatedly transmitting, to the base station, an uplink channel on resources determined based on the first information, wherein the uplink channel is repeatedly transmitted on a first hop and a second hop, each of the first hop and the second hop is configured by bundling a preconfigured number of slots used for uplink channel transmission, the slots used for uplink channel transmission include the uplink symbol, each of the first hop and the second hop includes consecutive slots in the time domain, and each of the first hop and the second hop is transmitted on a different physical resource block (PRB) via frequency hopping.

In the present specification, the method further includes receiving information on a time domain window from the base station, wherein the time domain window is configured based on the information on the time domain window.

A terminal for transmitting an uplink channel in a wireless communication system includes a transceiver, and a processor configured to control the transceiver, wherein the processor is configured to: receive, from a base station, first information that is information related to a time division duplex (TDD) configuration, wherein the first information includes information on types of symbols constituting a slot, and the types of the symbols include one of a downlink symbol configured to be available for downlink transmission, an uplink symbol configured to be available for uplink transmission, and a flexible symbol configured to be neither the downlink symbol nor the uplink symbol; and repeatedly transmit, to the base station, an uplink channel on resources determined based on the first information, wherein the uplink channel is repeatedly transmitted on a first hop and a second hop, each of the first hop and the second hop is configured by bundling a preconfigured number of slots used for uplink channel transmission, the slots used for uplink channel transmission include the uplink symbol, each of the first hop and the second hop includes consecutive slots in the time domain, and each of the first hop and the second hop is transmitted on a different physical resource block (PRB) via frequency hopping.

In the present specification, the processor is configured to receive information on a time domain window from the base station, wherein the time domain window is configured based on the information on the time domain window.

In the present specification, the preconfigured number is received from the base station.

In the present specification, slots included in the first hop are indexed with an identical index, and slots included in the second hop are indexed with an identical index.

In the present specification, if the number of the consecutive slots used for uplink channel transmission is fewer than the preconfigured number, the first hop or the second hop includes fewer consecutive slots than the preconfigured number.

In the present specification, the slots used for uplink channel transmission include the uplink symbol and the flexible symbol.

In the present specification, the first hop includes a first slot and a second slot, the first slot includes a first demodulation reference signal (DM-RS), the second slot includes a second DM-RS, the first DM-RS and the second DM-RS are transmitted on resources of the same number of PRBs starting at the same PRB position in the frequency domain, and transmitted using the same phase, the same transmission power, the same Quasi co-location (QCL), and the same beamforming, the second hop includes a third slot and a fourth slot, the third slot includes a third DM-RS, the fourth slot includes a fourth DM-RS, and the third DM-RS and the fourth DM-RS are transmitted on resources of the same number of PRBs starting at the same PRB position in the frequency domain, and transmitted using the same phase, the same transmission power, the same Quasi co-location (QCL), and the same beamforming.

In the present specification, at least one of the downlink symbol or the flexible symbol exists between a last symbol to which the repeatedly transmitted uplink channel is mapped in the first slot, and a first symbol to which the repeatedly transmitted uplink channel is mapped in the second slot, and at least one of the downlink symbol or the flexible symbol exists between a last symbol to which the repeatedly transmitted uplink channel is mapped in the third slot, and a first symbol to which the repeatedly transmitted uplink channel is mapped in the fourth slot.

In the present specification, the uplink channel is a physical uplink control channel (PUCCH) or a physical uplink shared channel (PUSCH).

In the present specification, the uplink channel is transmitted within a time domain window.

In the present specification, information on the time domain window includes one of the number of slots, the number of symbols, and the number of repeated transmissions of the uplink channel.

In the present specification, the time domain window is from a time point at which the repeated transmission of the uplink channel starts to a time point at which the repeated transmission of the uplink channel ends.

In the present specification, the time domain window includes consecutive slots in the time domain, which include at least one of the uplink symbol and the flexible symbol.

In the present specification, the time domain window includes a first time domain window and a second time domain window, the first time domain window is configured to correspond to a first pattern, the second time domain window is configured to correspond to a second pattern, the first pattern and the second pattern include multiple slots, and multiple slot configurations for configuring each of the first pattern and the second pattern are different from each other.

In the present specification, DM-RSs included in the respective multiple slots constituting the first pattern are transmitted on resources of the same number of PRBs starting at the same PRB position in the frequency domain, and transmitted using the same phase, the same transmission power, the same Quasi co-location (QCL), and the same beamforming, and DM-RSs included in the respective multiple slots constituting the second pattern are transmitted on resources of the same number of PRBs starting at the same PRB position in the frequency domain, and transmitted using the same phase, the same transmission power, the same Quasi co-location (QCL), and the same beamforming.

A method for receiving an uplink channel in a wireless communication system, the method being performed by a base station, includes: transmitting, to a terminal, first information that is information related to a time division duplex (TDD) configuration, wherein the first information includes information on types of symbols constituting a slot, and the types of the symbols include one of a downlink symbol configured to be available for downlink transmission, an uplink symbol configured to be available for uplink transmission, and a flexible symbol configured to be neither the downlink symbol nor the uplink symbol; and receiving, from the terminal, an uplink channel repeatedly transmitted on resources determined based on the first information, wherein the uplink channel is repeatedly transmitted on a first hop and a second hop, each of the first hop and the second hop is configured by bundling a preconfigured number of slots used for uplink channel transmission, the slots used for uplink channel transmission include the uplink symbol, each of the first hop and the second hop includes consecutive slots in the time domain, and each of the first hop and the second hop is transmitted on a different physical resource block (PRB) via frequency hopping.

Advantageous Effects of Invention

The present specification is to transmit an uplink channel via frequency hopping.

The present specification is to provide a method of transmitting, through an uplink channel, DMRSs used for channel estimation in combination thereof.

The present specification is to provide a method of determining a time domain window in which DMRSs used for channel estimation in combination thereof are transmitted.

The effects obtainable in the present specification are not limited to the above-mentioned effects, and other effects that are not mentioned may be clearly understood by those skilled in the art to which the present disclosure belongs, from descriptions below.

BRIEF DESCRIPTION OF DRAWINGS

FIG. 12 illustrates a method of scheduling a physical uplink shared channel in a time domain according to an embodiment of the present disclosure.

FIG. 13 illustrates a method of scheduling a physical uplink shared channel in a frequency domain according to an embodiment of the present disclosure.

FIG. 14 illustrates repeated transmission of a physical uplink shared channel according to an embodiment of the present disclosure.

FIG. 15 illustrates a method of scheduling a physical uplink control channel according to an embodiment of the present disclosure.

FIG. 19 illustrates a method of combining repeatedly transmitted PUSCHs according to an embodiment of the present disclosure.

FIG. 20 illustrates a method of combining repeatedly transmitted PUSCHs according to an embodiment of the present disclosure.

FIG. 21 to FIG. 26 illustrate a frequency hopping method of a repeatedly transmitted PUSCH, according to an embodiment of the present disclosure.

FIG. 27 illustrates a method of determining a position of a symbol to which a DMRS included in a repeatedly transmitted PUSCH is mapped, according to an embodiment of the present disclosure.

FIG. 48 to FIG. 53 illustrate a method of determining a slot index for repetition during PUCCH transmission via frequency hopping, according to an embodiment of the present disclosure.

Figure 57:
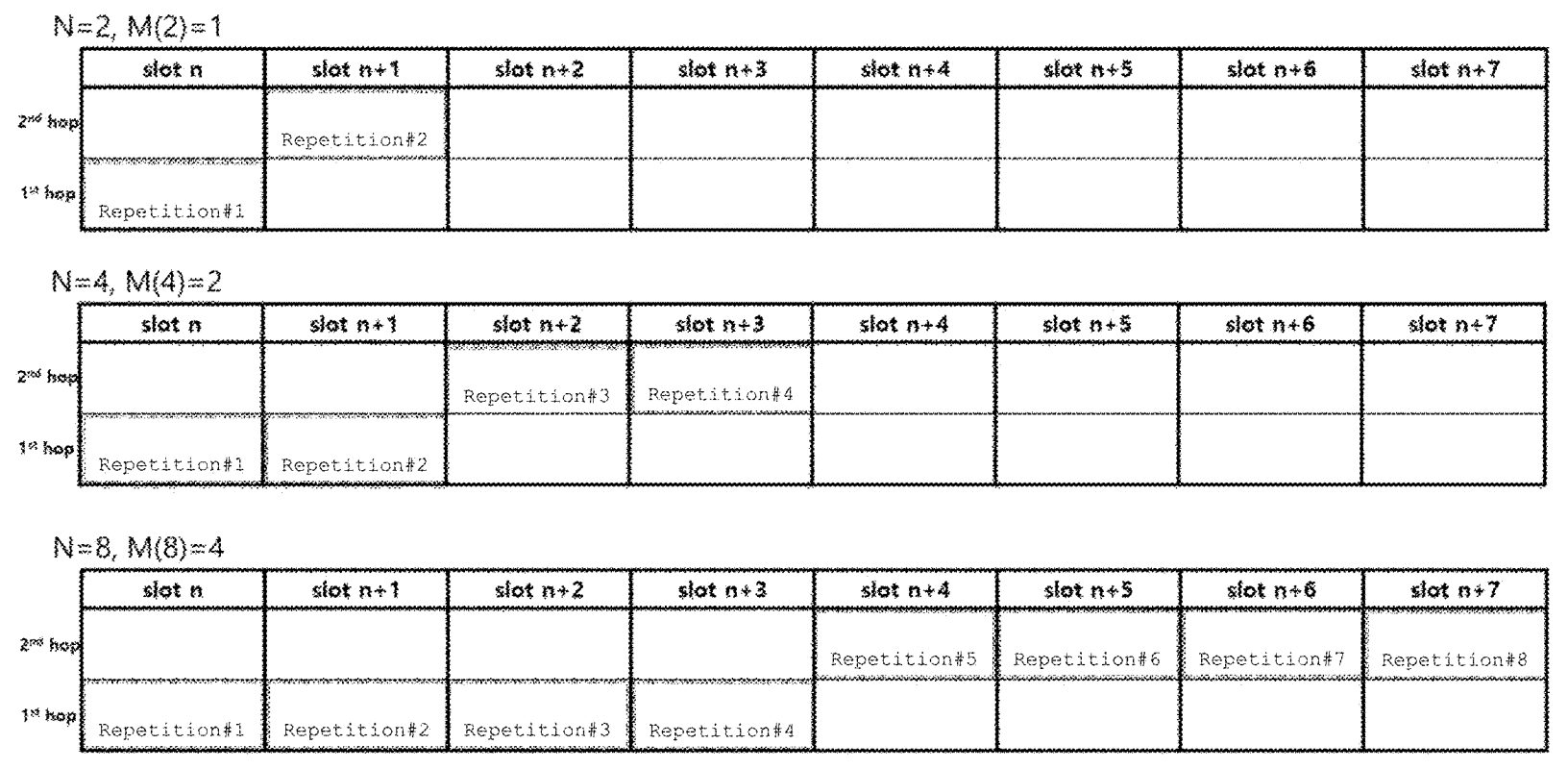

FIG. 54 to FIG. 59 illustrate a method of mapping PUCCH repetitions to frequency hops according to an embodiment of the present disclosure.

FIG. 63 to FIG. 66 illustrate a method of indicating a time domain window according to an embodiment of the present disclosure.

BEST MODE FOR CARRYING OUT THE INVENTION

Figure 1:
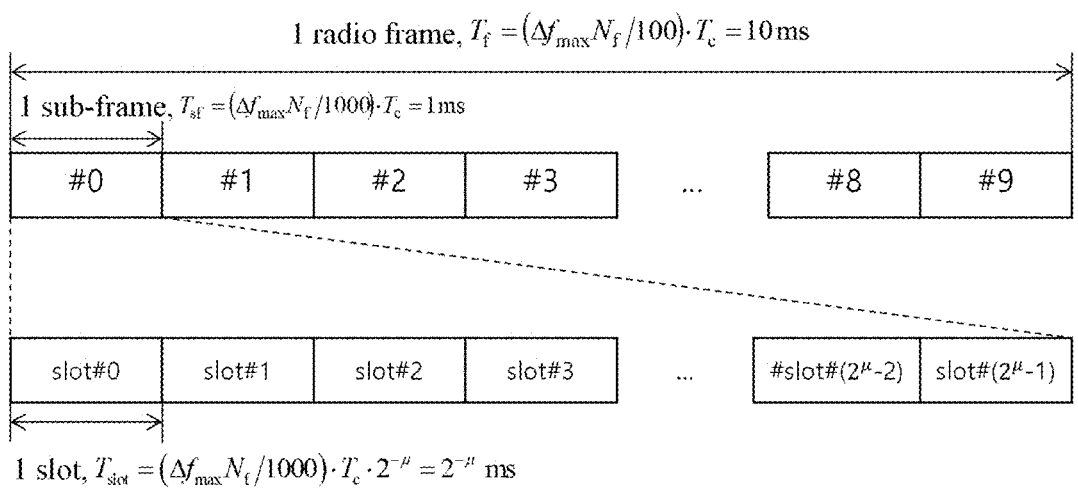
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*103$ Hz, $N_f=4096$, $T_c=1/(\Delta f_{ref}*N_{f,ref})$, $\Delta f_{ref}=15*103$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and p can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 2 slots. In this case, the length of each slot is $2^{-\mu}$ ms. Numbers from 0 to 2-1 may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
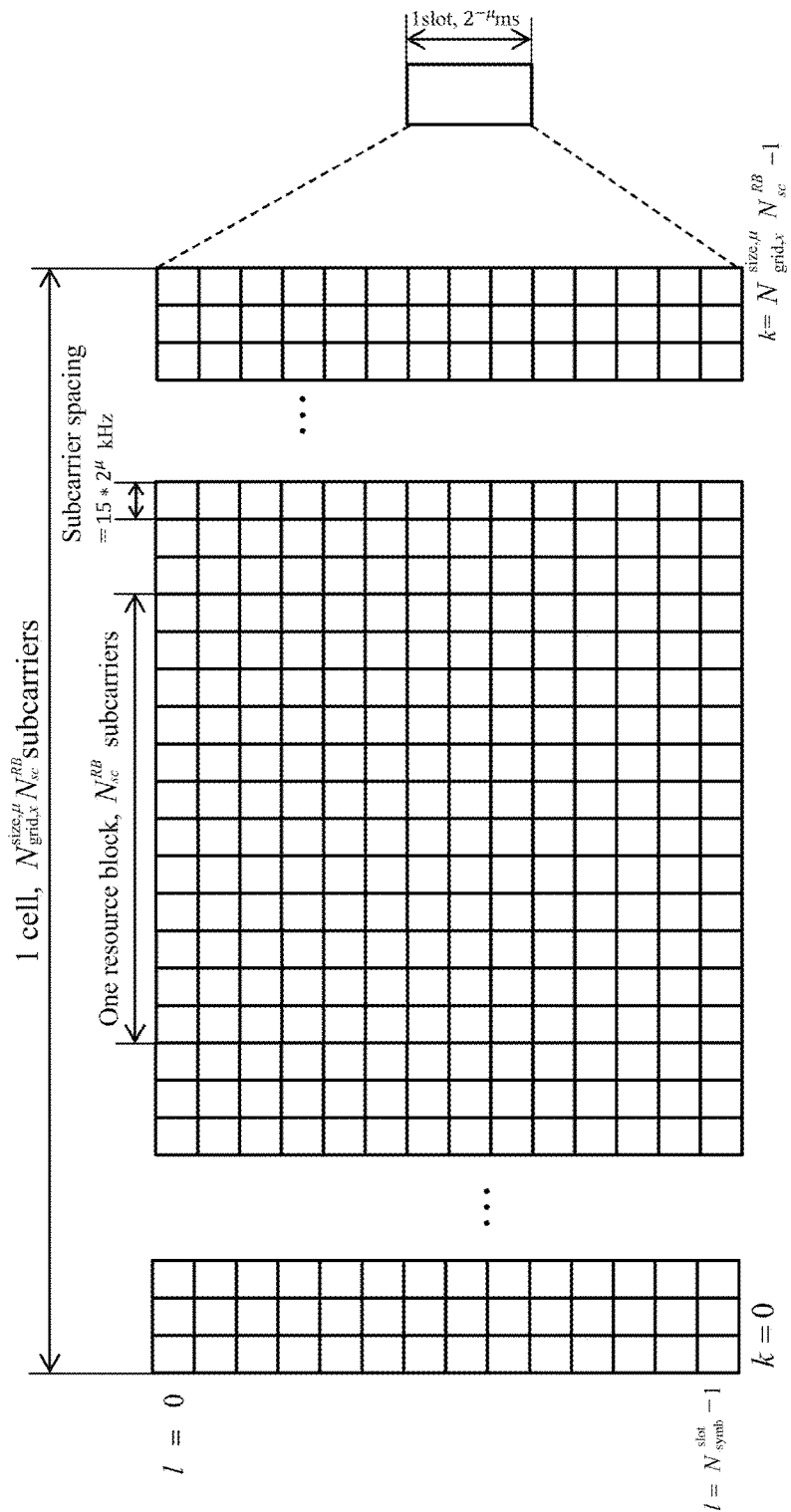
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent μ(x is DL or UL), and $N^{slot}_{symb}$ represents the number of OFDM symbols in a slot. $N^{RB}_{sc}$ is the number of subcarriers constituting one RB and $N^{RB}_{sc}$=12. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc} - 1$ in the frequency domain, and l may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |

TABLE 1-continued

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | U | D | D | D | D | D | X | U |
| 47 | D | D | X | U | U | U | D | D | U | U | U | U | U | U |
| 48 | D | X | U | U | U | U | D | X | U | U | U | U | U | U |
| 49 | D | D | D | X | X | U | D | D | D | X | X | U |
| 50 | D | X | X | U | U | U | D | X | X | U | U | U |
| 51 | D | X | U | U | U | U | D | X | U | U | U | U |
| 52 | D | X | X | X | U | U | D | X | X | X | X | U |
| 53 | D | X | X | U | U | U | D | X | X | U | U | U |
| 54 | X | X | X | X | X | X | D | D | D | D | D | D |
| 55 | D | D | X | X | X | U | U | U | D | D | D | D | D | D |
| 56~256 | | | | | | Reserved | | | | | | | | |

In Table 1, D denotes a DL symbol, U denotes a UL symbol, and X denotes a flexible symbol. As shown in Table 1, up to two DL/UL switching in one slot may be allowed.

Figure 3:
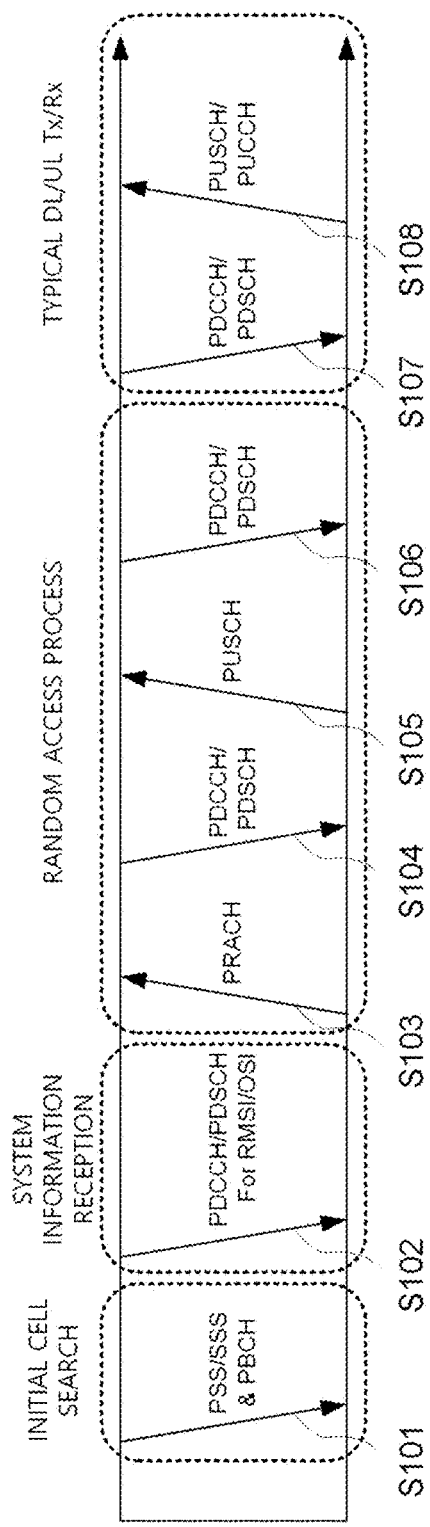
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
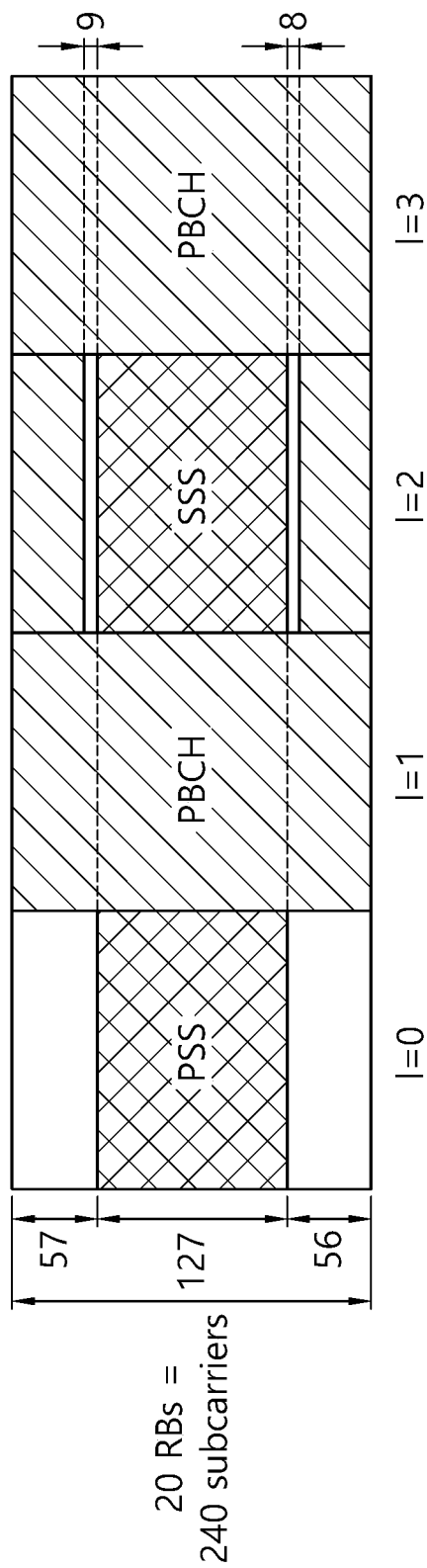
FIGS. 4a and 4b illustrate an SS/PBCH block for initial cell access in a 3GPP NR system.
Figure 4B:
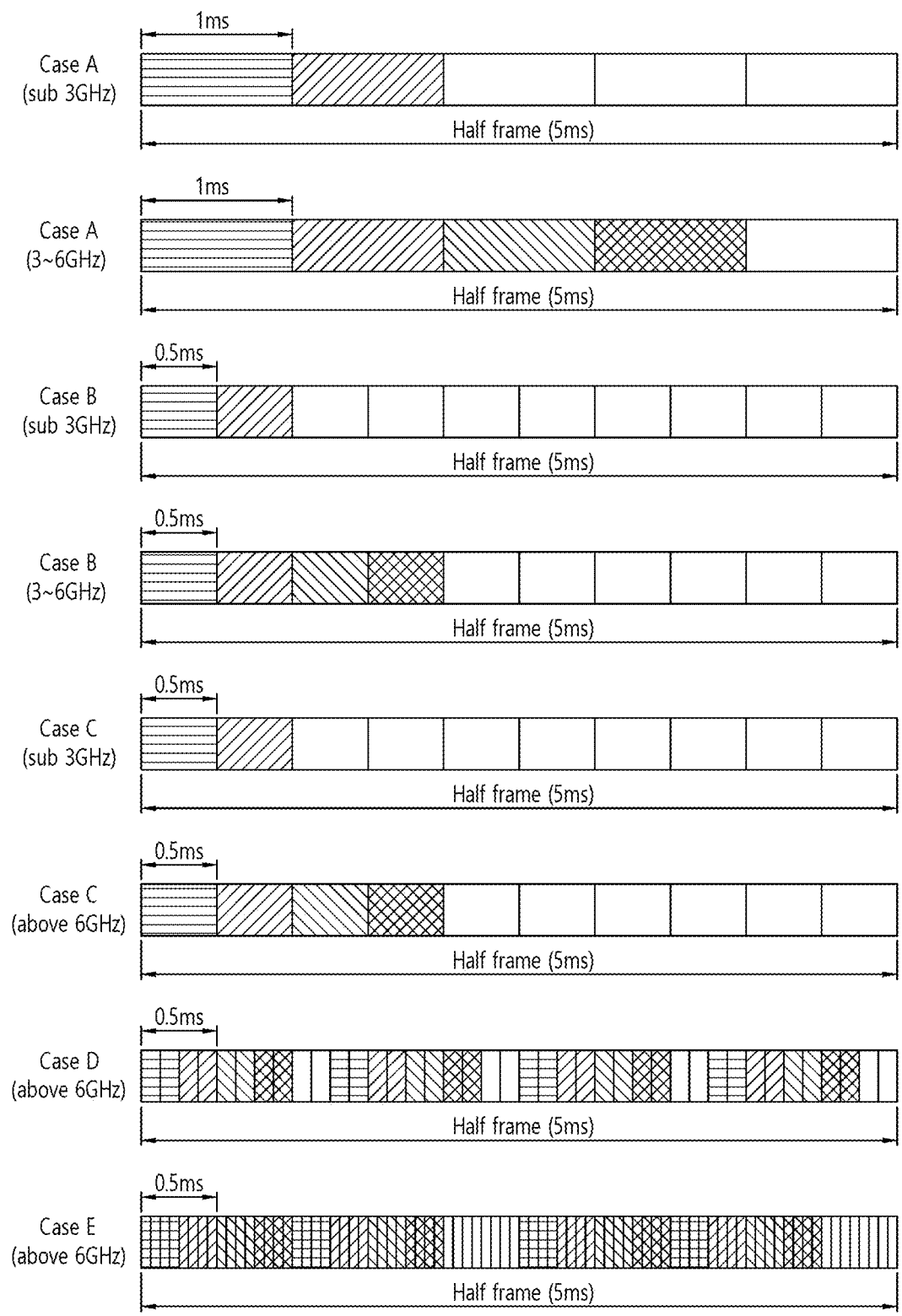

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number 1 relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N^{(2)}_{ID}) \bmod 127$$

$$0 \le n < 127$$

Here, $x(i+7)=(x(i+4)+x(i)) \bmod 2$ and is given as,
[x(6) x(5) x(4) x(3) x(2) x(i) x(0)]=[1 1 1 0 1 1 0]
Further, the sequence $d_{SSS}(n)$ of the SSS is as follows.

$$d_{SSS}(n) = [1 - 2x_0((n+m_0) \bmod 127)][1 - 2x_1((n+m_1) \bmod 127)]$$

$$m_0 = 15 \left\lfloor \frac{N^{(1)}_{ID}}{112} \right\rfloor + 5N^{(2)}_{ID}$$

$$m_1 = N^{(1)}_{ID} \bmod 112$$

$$0 \le n < 127$$

$$\text{Here, } \begin{array}{l} x_0(i+7) = (x_0(i+4)+x_0(i)) \bmod 2 \\ x_1(i+7) = (x_1(i+1)+x_1(i)) \bmod 2 \end{array}$$

and is given as, $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
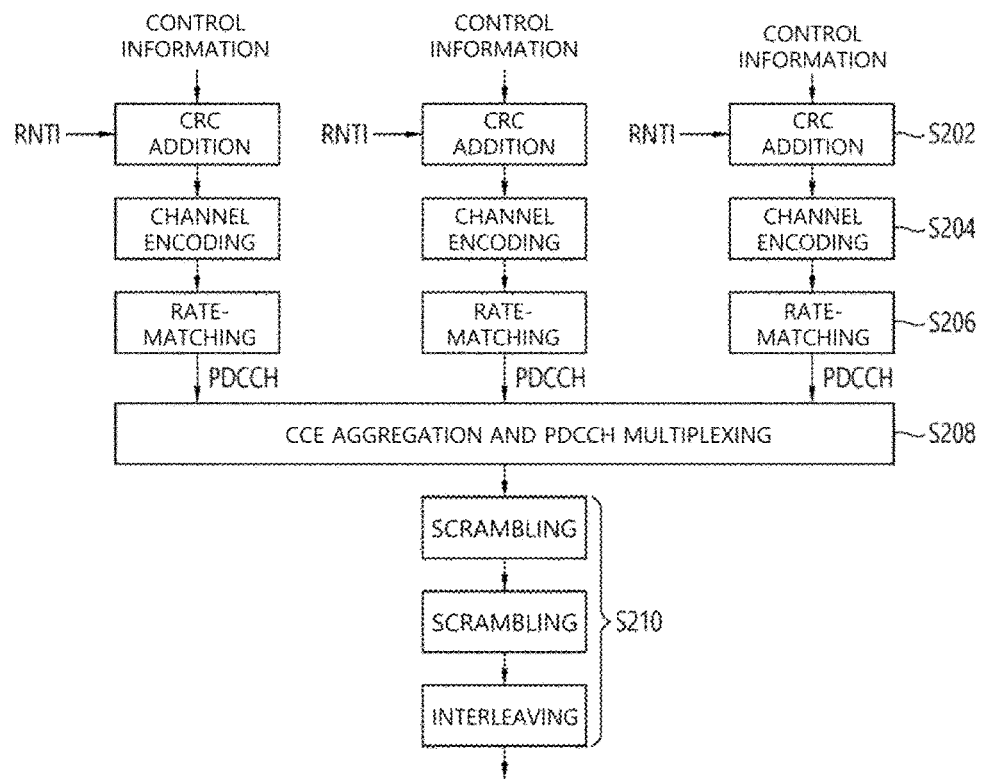
FIG. 5a and FIG. 5b illustrate a procedure for transmitting control information and a control channel in a 3GPP NR system.
Figure 5B:
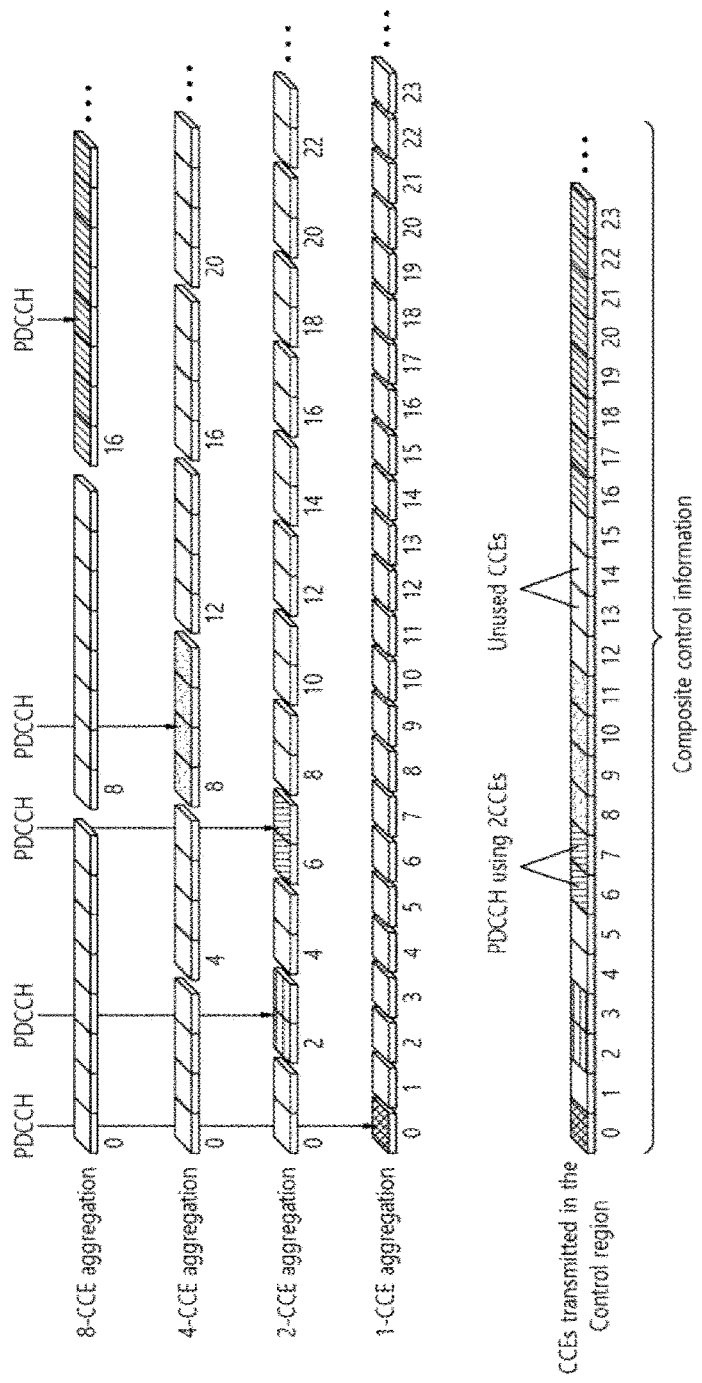

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
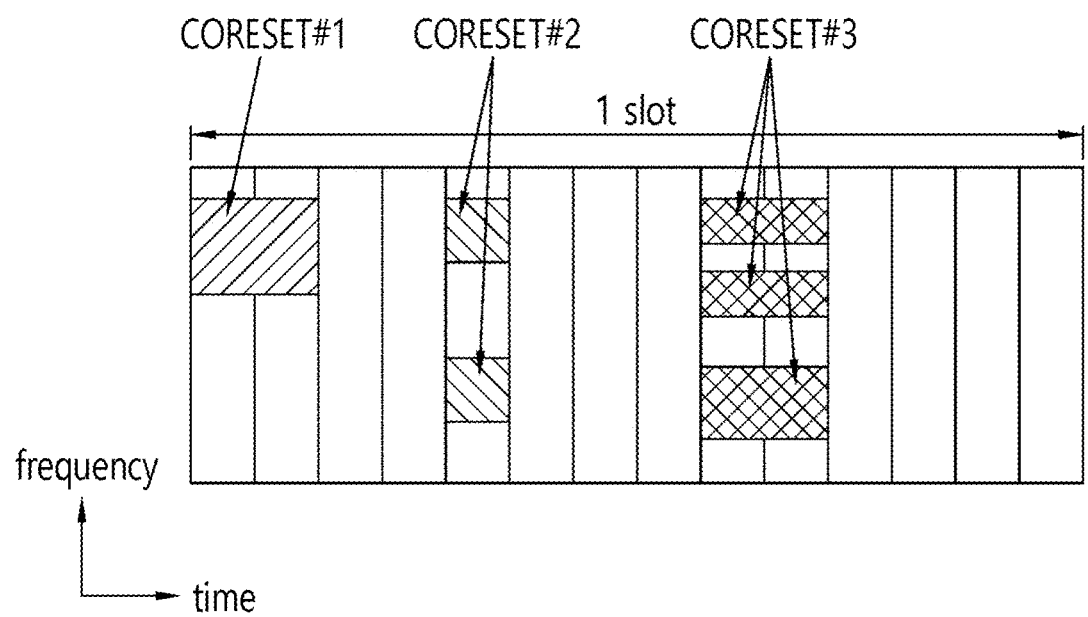
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
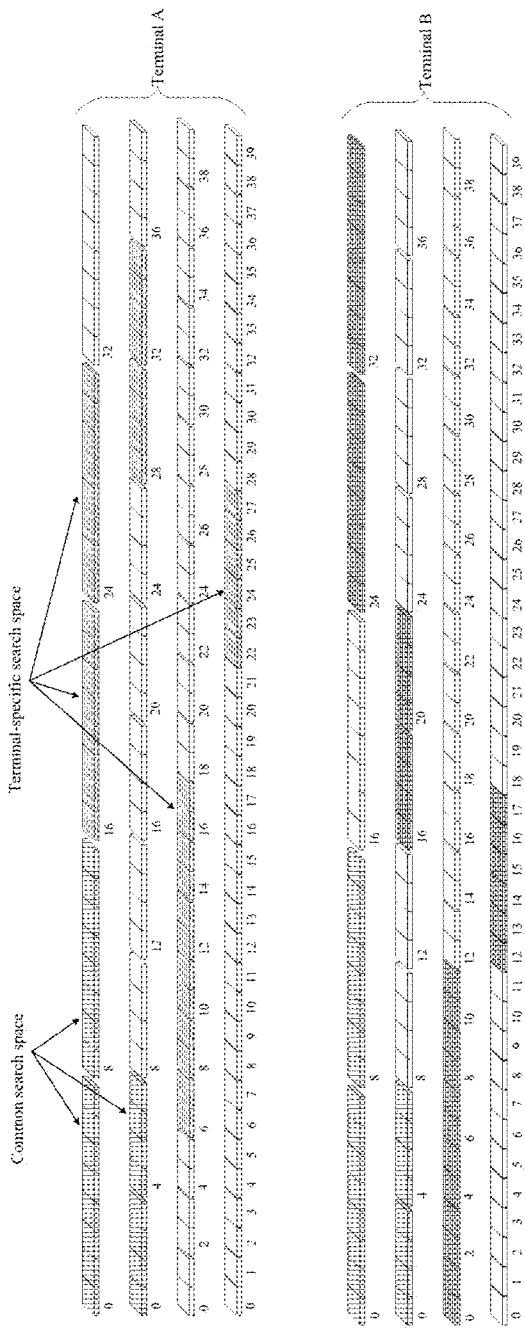
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).
  Scheduling Request (SR): Information used for requesting a UL UL-SCH resource.
  HARQ-ACK: A Response to PDCCH (indicating DL SPS release) and/or a response to DL transport block (TB) on PDSCH. HARQ-ACK indicates whether information transmitted on the PDCCH or PDSCH is received.

The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with a/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
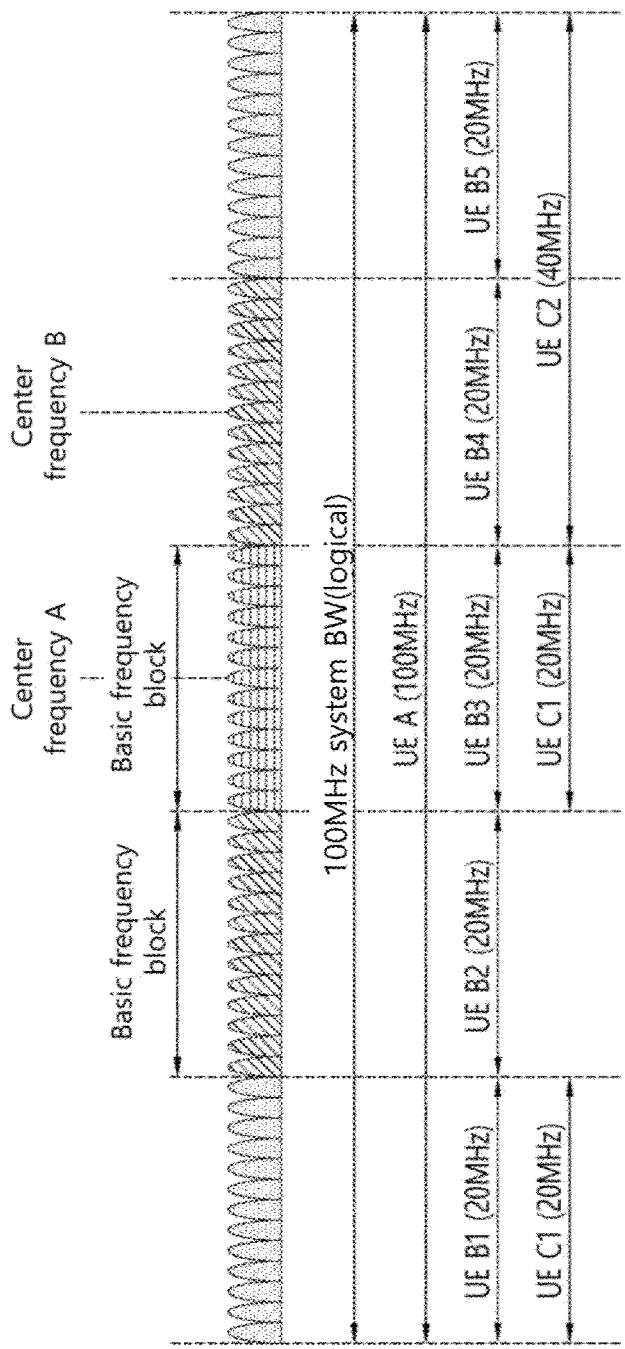
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs Bi-Bs can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
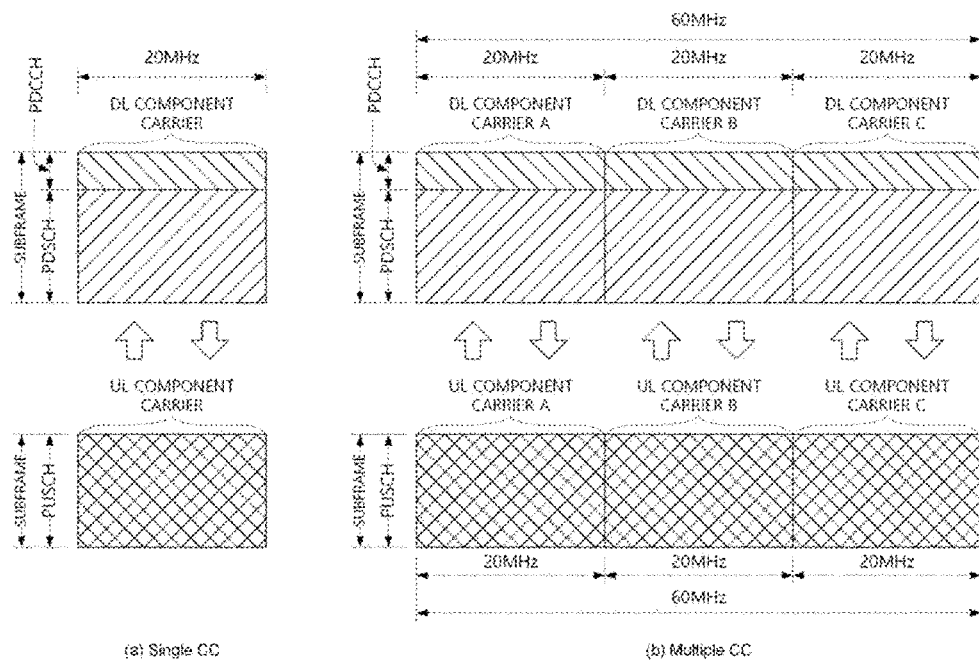
FIG. 9 is a diagram for explaining signal carrier communication and multiple carrier communication.

FIG. 9 is a drawing for explaining signal carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency domain. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
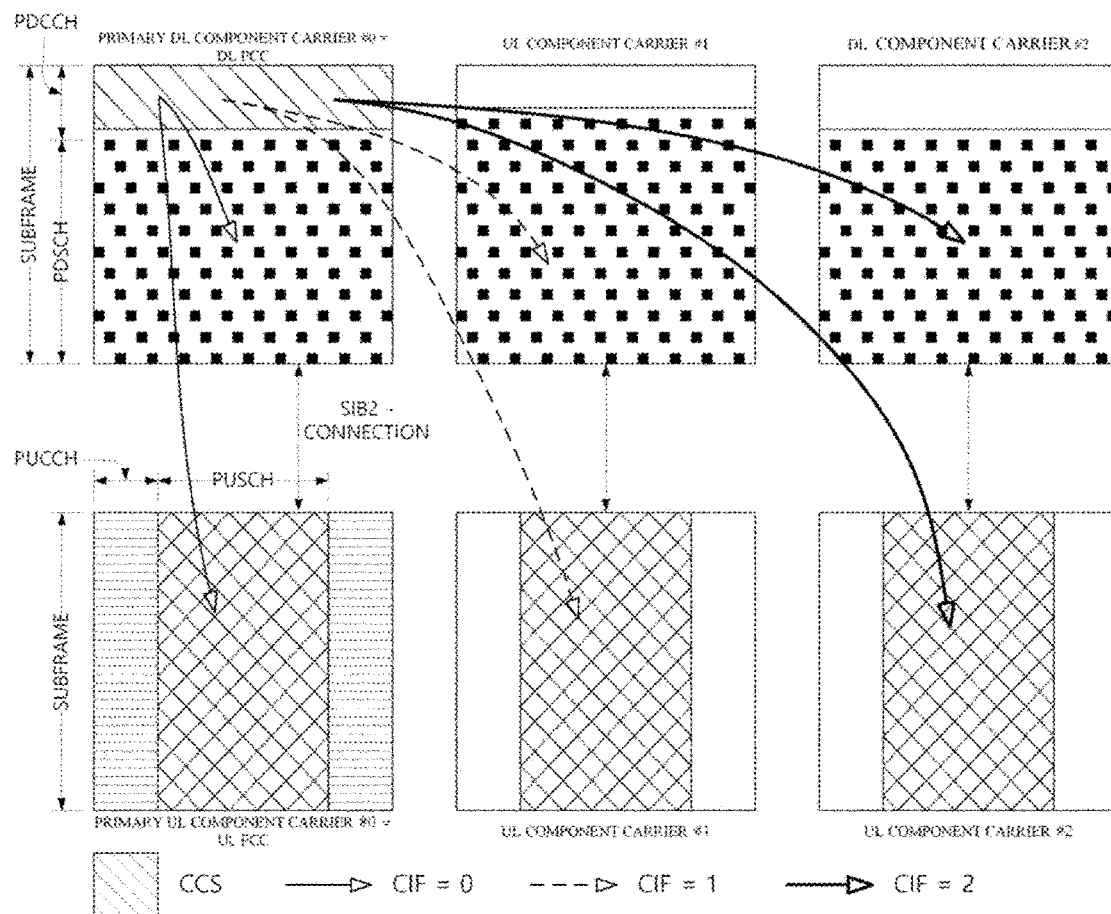
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
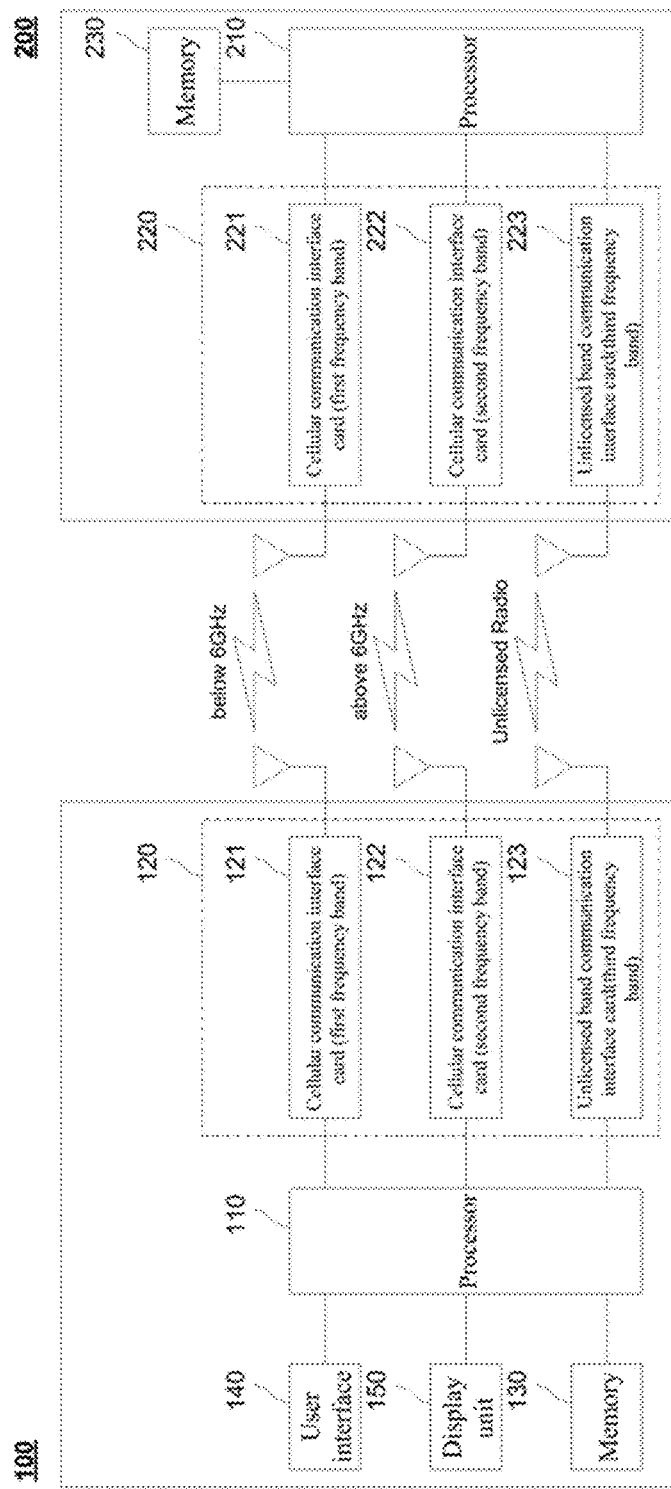
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

FIG. 12 illustrates a method of scheduling a physical uplink shared channel in a time domain according to an embodiment of the present disclosure.

A terminal may transmit uplink data to a base station through a PUSCH. The base station may schedule (PUSCH scheduling), for the terminal, to transmit uplink data through the PUSCH. i) In a dynamic grant (DG) method, the base station may perform PUSCH scheduling via DCI included in a PDCCH. Alternatively, ii) in a configured grant (CG) method, the terminal may transmit uplink data to the base station through a PUSCH according to a resource and a transmission method preconfigured for the terminal by the base station.

In this case, DCI included in a PDCCH may include PUSCH scheduling information. For example, the DCI may include time domain information (time-domain resource assignment (TDRA)) and frequency domain information (frequency-domain resource assignment (FDRA)). The terminal may receive DCI transmitted in a control resource set and a search space, and may perform operations (e.g., uplink data transmission through the PUSCH) indicated via the DCI. In this case, a DCI format for PUSCH scheduling may be DCI formats 0_0, 0_1, and 0_2. DCI of DCI formats 0_0, 0_1, and 0_2 may include a TDRA field including time domain information of the PUSCH. In this case, the time domain information may include K2, which is an offset value between a slot in which the PDCCH is transmitted from the base station and a slot in which the terminal transmits the PUSCH. In addition, the DCI may include a start and length indication value (SLIV) which is a joint-coded value of a starting symbol index (S) of the PUSCH and a symbol length (L, number) of the PUSCH in a slot indicated by K2. If the terminal receives the DCI in slot n, a slot in which the PUSCH is scheduled may be a floor $(n*2^{\mu PUSCH}/n*2^{\mu PDCCH})+K2$ slot. μPUSCH and μPDCCH may refer to a subcarrier spacing (SCS) of a cell in which the PUSCH is scheduled and a cell in which the terminal receives the PDCCH, respectively. floor(x) is a function that returns a largest integer among integers equal to or smaller than x. In the present specification, slot n may refer to a slot indexed with index n.

Referring to FIG. 12(a), a subcarrier spacing of a cell in which the terminal receives a PDCCH and a cell in which a PUSCH is scheduled may be the same. In this case, if the terminal receives the PDCCH in slot n and is indicated that K2 is 4, a slot in which the PUSCH is scheduled may be slot n+K2, that is, slot n+4. 11711 As for a PUSCH scheduling type, there may be two mapping types of PUSCH mapping type A and PUSCH mapping type B. Depending on a PUSCH mapping type, the range of possible values for a starting symbol index and an SLIV of the PUSCH may vary. In PUSCH mapping type A, only resource allocation including a DMRS symbol is possible, and the DMRS symbol may be located in a third or fourth symbol of a slot according to a value indicated by a higher layer. That is, in the case of PUSCH mapping type A, an index (S) of a starting symbol of the PUSCH may be 0, and a length (L) of the PUSCH may have one of values from 4 to 14 (12 for an extended CP) according to a DMRS symbol position. In PUSCH mapping type B, a first symbol of the PUSCH may be a DMRS symbol. Accordingly, S may have a value from 0 to 13 (11 for an extended CP), and L may have one of values from 1 to 14 (12 for an extended CP). In addition, since one PUSCH cannot cross a slot boundary, the sum of S and L should be smaller than or equal to 14 (12 for an extended CP).

Referring to FIG. 12(b), the base station may schedule PUSCH mapping type A in which a third symbol is a DMRS symbol, an index (S) of a starting symbol is 0, and a length (L) is 7, may schedule PUSCH mapping type A in which a fourth symbol is a DMRS symbol, an index (S) of a starting symbol is 0, and a length (L) is 7, and may schedule PUSCH mapping type B in which a first symbol is a DMRS symbol, an index (S) of a starting symbol is 5, and a length (L) is 5. In this case, frequency domain information of the PUSCH indicated in the FDRA field of DCI format 0_0, 0_1, or 0_2 may be divided into two types according to frequency resource allocation types.

FIG. 13 illustrates a method of scheduling a physical uplink shared channel in a frequency domain according to an embodiment of the present disclosure.

Hereinafter, a frequency resource allocation type will be described with reference to FIG. 13.

i) Frequency resource allocation type 0 which is a first type may be a type in which an RBG is configured by bundling a certain number of PRBs according to the number of RBs included in a BWP configured (set) for a terminal, and whether to use the RBG is indicated via a bitmap in units of RBGs. That is, the terminal may determine whether to use a corresponding RBG via a bitmap transmitted from a base station. The number of PRBs included in one RBG may be set (configured) from a higher layer, and as the larger the number of RBs included in a BWP are set (configured) for the terminal, the more PRBs may be set (configured). Referring to FIG. 13(a), a BWP size set (configured) for the terminal may be 72 PRBs, and one RBG may include 4 PRBs. In this case, the terminal may determine four PRBs as one RBG in ascending order from PRB 0, and each RBG may be indexed from 0. That is, an RBG including PRBs 0 to PRB 3 may be indexed as RBG 0, and an RBG including PRBs 4 through PRB 7 may be indexed as RBG 1. Up to RBG 17 may be indexed in the same manner, wherein the base station may transmit 1 bit (0 or 1) per RBG, i.e., a total of 18 bits, to the terminal, and the terminal may determine, based on the received 18 bits, whether to use PRBs constituting a corresponding RBG. In this case, if a bit value is 0, the terminal may determine that a PUSCH is not scheduled for any PRB among the PRBs constituting the corresponding RBG. If the bit value is 1, the terminal may determine that a PUSCH is scheduled for all PRBs in the corresponding RBG. In this case, the bit value may be applied in reverse.

ii) Frequency resource allocation type 1 which is a second type may be a type indicating information on consecutive PRBs allocated according to a size of an active BWP or an initial BWP of the terminal. The information on consecutive PRBs may be a resource indication value (RIV) value in which a start index (S) and a length (L) of the consecutive PRBs are jointly coded. Referring to FIG. 13(b), when a BWP size is 50 PRBs, and a PUSCH is scheduled for the terminal from PRB 2 to PRB 11 among the 50 PRBs, a start index of consecutive PRBs may be 2 and a length may be 10. That is, the terminal may determine the start index and the length of consecutive PRBs in which the PUSCH is scheduled, based on an RIV value received from the base station. Specifically, the RIV may be calculated by $N^{size}_{BWP}*(L-1)+S$. $N^{size}_{BWP}$ may be the size of BWP configured for the terminal. For example, if the RIV value received by the terminal is 452, calculation of 452 is based on 452=50*(10−1)+2, and therefore the terminal may determine that the start index of consecutive PRBs in which the PUSCH is scheduled is 2 and the length is 10.

Via DCI of DCI format 0_1 or 0_2 for scheduling of the PUSCH, the terminal may be configured, from a higher layer, to use only one of the aforementioned two frequency resource allocation types or dynamically use both the two types. If the terminal is configured to dynamically use the two types, the terminal may determine a type to be used, via 1 bit of a most significant bit (MSB) of an FDRA field of the DCI.

There may be an uplink shared channel transmission method based on a configured grant for URLLC transmission, etc. The uplink shared channel transmission method based on a configured grant may be described as grant-free transmission. The uplink shared channel transmission method based on a configured grant may be a method in which, if the base station configures, for the terminal, available resources for uplink transmission via a higher layer (i.e., RRC signaling), the terminal may transmit an uplink shared channel by using the configured resources. The uplink shared channel transmission method based on a configured grant may be classified into two types depending on whether DCI indicates activation and release. i) Type 1 of the uplink shared channel transmission method based on a configured grant may be a method of configuring a transmission method and resources in advance via a higher layer. ii) Type 2 of the uplink shared channel transmission method based on a configured grant may be a method of configuring configured grant-based transmission via a higher layer, and configuring, via DCI, a method and resources for actual transmission.

The uplink transmission method based on a configured grant may support URLLC transmission. Accordingly, uplink transmission may be repeatedly performed on multiple slots to ensure high reliability. In this case, a redundancy version (RV) sequence may be one of {0, 0, 0, 0}, {0, 2, 3, 1}, and {0, 3, 0, 3}, and an RV corresponding to a (mod(n−1, 4)+1)th value may be used in an nth repeated transmission. That is, an RV corresponding to a value obtained by adding 1 to a remainder of dividing n−1 by 4 may be used. In addition, the terminal configured to repeatedly transmit an uplink channel may start repeated transmission only in a slot having an RV value of 0. However, if an RV sequence is {0, 0, 0, 0} and an uplink channel is configured to be repeatedly transmitted in 8 slots, the terminal may not start repeated transmission in an 8th slot. The terminal may terminate repeated transmission when a UL grant having the same HARQ process ID is received or when the number of repeated transmissions configured via a higher layer is reached or a periodicity is exceeded. The UL grant may refer to DCI for PUSCH scheduling.

As described above, in order to improve PUSCH transmission/reception reliability between a base station and a terminal in a wireless communication system, the base station may configure for the terminal to repeatedly transmit a PUSCH.

FIG. 14 illustrates repeated transmission of a physical uplink shared channel according to an embodiment of the present disclosure. In FIG. 14 to FIG. 27, actual #n refers to an actual PUSCH or PUCCH of index n, and combined #n refers to a combined PUSCH or PUCCH of index n.

Repeated PUSCH transmission performed by a terminal may be of two types. i) First, repeated PUSCH transmission type A will be described. When a terminal receives DCI of DCI format 0_1 or 0_2 included in a PDCCH for PUSCH scheduling from a base station, the terminal may repeatedly transmit a PUSCH on K consecutive slots. A K value may be configured from a higher layer or may be a value included in a TDRA field of the DCI so as to be configured for the terminal. For example, referring to FIG. 14A, the terminal may receive the PDCCH for PUSCH scheduling in slot n, and a K2 value may be configured from DCI included in the received PDCCH. In this case, if the K2 value is 2 and the K value is 4, the terminal may start repeated PUSCH transmission in slot n+K2, and may repeatedly transmit a PUSCH until slot n+K2+K−1. That is, the terminal starts repeated PUSCH transmission in slot n+2 and repeatedly transmits a PUSCH until slot n+5. In this case, time and frequency domain resources in which the PUSCH is transmitted in each slot may be the same as those indicated in the DCI. That is, the PUSCH may be transmitted in the same symbol and PRB(s) within a slot. ii) Next, repeated PUSCH transmission type B will be described. Repeated PUSCH transmission type B may be a type used for the terminal to perform low-latency repeated PUSCH transmission in order to satisfy URLLC requirements, etc. The terminal may be configured with a symbol (S) in which repeated PUSCH transmission starts and a length (L) of the repeated PUSCH transmission, via the TDRA field of the DCI transmitted by the base station. In this case, the starting symbol (S) and the length (L) may be for a temporarily obtained nominal PUSCH rather than an actual PUSCH actually transmitted by the terminal. A separate symbol may not exist between nominal PUSCHs configured to be repeatedly transmitted. That is, nominal PUSCHs may be consecutive in the time domain. The terminal may determine an actual PUSCH from the nominal PUSCHs. One nominal PUSCH may be determined to be one or multiple actual PUSCHs. The base station may configure, for the terminal, symbols unavailable for repeated PUSCH transmission type B. Symbols unavailable for repeated PUSCH transmission type B may be described as invalid symbols. The terminal may exclude invalid symbols from among resources configured to transmit nominal PUSCHs. As described above, nominal PUSCHs are configured to be repeatedly transmitted on consecutive symbols, but if invalid symbols are excluded, resources for nominal PUSCH transmission become inconsecutive. An actual PUSCH may be configured to be transmitted on consecutive symbols configured for one nominal PUSCH transmission except for invalid symbols. In this case, if consecutive symbols cross a slot boundary, an actual PUSCH actually transmitted based on the slot boundary may be divided. Invalid symbols may include downlink symbols configured for the terminal by the base station. Referring to FIG. 14B, the terminal may be scheduled with PUSCH transmission having a length of 5 symbols starting from a 12th symbol of a first slot (slot n), and may be configured with 4 times of type B repeated transmission. In this case, resources scheduled for a first nominal PUSCH (nominal #1) may include symbol (n,11), symbol (n,12), symbol (n,13), symbol (n+1,0), and symbol (n+1,1). Resources scheduled for a second nominal PUSCH (nominal #2) may include symbol (n+1,2), symbol (n+1,3), symbol (n+1,4), symbol (n+1,5), and symbol (n+1,6). Resources scheduled for a third nominal PUSCH (nominal #3) may include symbol (n+1,7), symbol (n+1,8), symbol (n+1,9), symbol (n+1,10), and symbol (n+1,11). Resources scheduled for a fourth nominal PUSCH (nominal #4) may include symbol (n+1, 12), symbol (n+1,13), symbol (n+2,0), symbol (n+2,1), and symbol (n+2,2). In this case, symbol (n,k) represents symbol k of slot n. That is, k may be a value starting from 0 to 13 for a normal CP, and may be a value from 0 to 11 for an extended CP. Invalid symbols may be configured to be symbols 6 and 7 of slot n+1. In this case, in order to determine an actual PUSCH, a last symbol of the second nominal PUSCH (nominal #2) may be excluded, and a first symbol of the third nominal PUSCH (nominal #3) may be excluded. The first nominal PUSCH (nominal #1) may be divided into two actually transmitted actual PUSCHs (actual #1 and actual #2) by a slot boundary. Each of the second nominal PUSCH (nominal #2) and the third nominal PUSCH (nominal #3) may be distinguished into one actual PUSCH (actual #3 and actual #4) by combining consecutive symbols except for an invalid symbol. Finally, the fourth nominal PUSCH (nominal #4) is divided into two actually transmitted (actual) PUSCHs (actual #5 and actual #6) by a slot boundary. The terminal finally transmits actually transmitted (actual) PUSCHs. One actual PUSCH should include at least one DMRS symbol. Accordingly, when repeated PUSCH transmission type B is configure, if a total length of the actual PUSCH is one symbol, the actual PUSCH may be omitted without being transmitted. This is because the actual PUSCH with one symbol may not include information other than a DMRS.

In order to obtain diversity gain in the frequency domain, frequency hopping may be configured for uplink channel transmission.

For repeated PUSCH transmission type A, one of intra-slot frequency hopping, in which frequency hopping is performed within a slot, and inter-slot frequency hopping, in which frequency hopping is performed in each slot, may be configured for the terminal. If intra-slot frequency hopping is configured for the terminal, the terminal may divide the PUSCH in half in the time domain in a slot for transmitting the PUSCH and transmit one half of the PUSCH in a scheduled PRB, and may transmit the other half in a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

For repeated PUSCH transmission type B, one of inter-repetition frequency hopping, in which frequency hopping is performed at a nominal PUSCH boundary, and inter-slot frequency hopping, in which frequency hopping is performed in every slot, may be configured for the terminal. If inter-repetition frequency hopping is configured for the terminal, the terminal may transmit actual PUSCH(s) corresponding to an odd-numbered nominal PUSCH on a scheduled PRB, and the terminal may transmit actual PUSCH(s) corresponding to an even-numbered nominal PUSCH on a PRB obtained by adding an offset value to the scheduled PRB. In this case, two or four offset values may be configured according to an active BWP size via a higher layer, and one of the values may be configured for (indicated to) the terminal via DCI. If inter-slot frequency hopping is configured for the terminal, the terminal may transmit the PUSCH in a scheduled PRB in a slot having an even-numbered slot index, and may transmit the PUSCH in a PRB obtained by adding an offset value to the scheduled PRB in an odd-numbered slot.

When the terminal performs repeated PUSCH transmission, if a symbol scheduled for PUSCH transmission in a specific slot overlaps with a semi-statically configured DL symbol or a symbol configured for reception of an SS/PBCH block, the terminal may not transmit an overlapping PUSCH on a slot including the overlapping symbol. In addition, the overlapping PUSCH may be delayed and may not be transmitted even on a subsequent slot.

If the terminal receives DCI of DCI format 1_0, 1_1, or 1_2 for PUCCH scheduling, the terminal needs to transmit a PUCCH to the base station. In this case, the PUCCH may include uplink control information (UCI), and UCI may include at least one of HARQ-ACK, a scheduling request (SR), and channel state information (CSI). HARQ-ACK may be HARQ-ACK indicating whether the terminal has successfully received two types of channels. A first type may be HARQ-ACK for a PDSCH when the terminal is scheduled with the PDSCH via DCI of DCI format 1_0, 1_1, or 1_2. A second type may be HARQ-ACK for DCI when the DCI of DCI format 1_0, 1_1, or 1_2 is DCI indicating release of a semi-persistently scheduled (SPS) PDSCH. For PUCCH transmission including HARQ-ACK, a "PDSCH-to-HARQ_feedback timing indicator" field of DCI may indicate K1 which is information (value) for a slot in which the scheduled PUCCH is transmitted. Here, K1 may be a non-negative integer value. DCI of DCI format 1_0 may indicate one of {0, 1, 2, 3, 4, 5, 6, 7} as a K1 value. The K1 value that can be indicated in DCI of DCI format 1_1 or 12 may be set (configured) from a higher layer.

A method of determining a slot in which a PUCCH including a first type HARQ-ACK is transmitted will be described. An uplink slot overlapping with a last symbol in which a PDSCH corresponding to HARQ-ACK is transmitted may exist. In this case, if an index of the overlapping uplink slot is m, the terminal may transmit a PUCCH including HARQ-ACK on slot m+K1. The index of the uplink slot may be a value determined based on a subcarrier spacing of a BWP in which the PUCCH is transmitted. If the terminal is configured with downlink slot aggregation, a last symbol in which a PDSCH is transmitted may refer to a last scheduled symbol within a last slot among slots in which the PDSCH is transmitted.

FIG. 15 illustrates a method of scheduling a physical uplink control channel according to an embodiment of the present disclosure.

Referring to FIG. 15, a subcarrier spacing of a DL BWP in which a PDCCH is received, a subcarrier spacing of a DL BWP scheduled for a PDSCH, and a subcarrier spacing of a UL BWP in which a PUCCH is transmitted may be the same. A terminal may receive a PDCCH for scheduling of a PUCCH and a PDSCH from a base station in slot n. In this case, a K0 value and a K1 value may be configured (indicated) to be 2 and 3 respectively, by DCI included in the PDCCH received in slot. For example, if a last symbol in which the PDSCH is transmitted is symbol n+K0 (i.e., symbol n+2), the terminal may transmit HARQ-ACK for the PDSCH on slot n+2+K1 (i.e., slot n+5). In this case, HARQ-ACK for the PDSCH may be included in the PUCCH.

Figure 16:
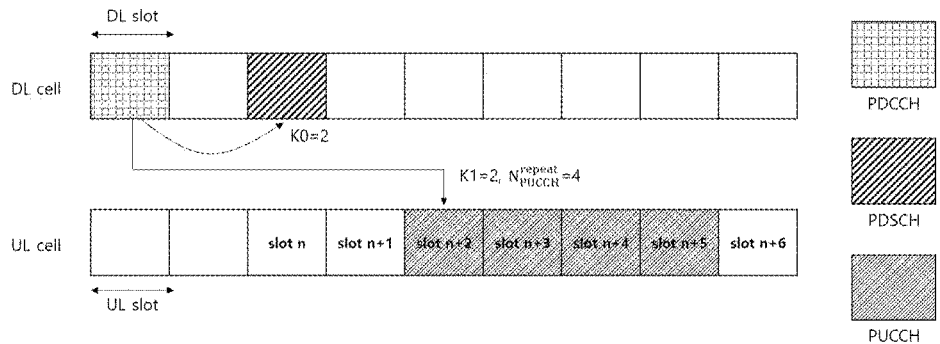
FIG. 16 illustrates repeated transmission of a physical uplink control channel according to an embodiment of the present disclosure.

FIG. 16 illustrates repeated transmission of a physical uplink control channel according to an embodiment of the present disclosure.

In order to secure wide coverage in the NR system, a terminal may repeatedly transmit along PUCCH on 2, 4, or 8 slots. In this case, a format of the long PUCCH may be PUCCH format 1, 3, or 4. If the terminal repeatedly transmits the PUCCH, the same UCI may be repeatedly transmitted in every slot. Referring to FIG. 16, when PDSCH reception is terminated in slot n, and a K1 value is 2, the terminal may transmit the PUCCH on slot n+K1 (i.e., slot n+2). When a base station configures the number of repeated PUCCH transmission to be 4 ($N^{repeat}_{PUCCH}=4$), the terminal may repeatedly transmit the PUCCH from slot n+2 to slot n+5. In this case, symbol configurations of repeatedly transmitted PUCCHs may be the same. That is, repetitively transmitted PUCCHs may start from the same symbol in each slot and may include the same number of symbols.

Even for PUCCH transmission, frequency hopping may be applied to obtain diversity gain in the frequency domain. If intra-slot frequency hopping is applied, the terminal may divide the time domain of a slot for transmitting the PUCCH in half and transmit a half of the PUCCH on a first PRB and may transmit the other half of the PUCCH on a second PRB. The first PRB and the second PRB may be configured via a higher layer for configuration of PUCCH resources. If inter-slot frequency hopping is applied, the terminal may transmit the PUCCH on a first PRB of a slot having an even-numbered slot index and may transmit the PUCCH on a second PRB of a slot having an odd-numbered slot index. In addition, when the terminal performs repeated PUCCH transmission, if a symbol of a specific slot scheduled for PUCCH transmission overlaps with a semi-statically configured DL symbol or a symbol configured for reception of an SS/PBCH block, the terminal may not transmit the PUCCH on a slot including the overlapping symbol. The terminal may delay transmission of an untransmitted PUCCH so as to transmit the same on a subsequent slot. In this case, if a symbol of a slot for delayed PUCCH transmission does not overlap with a semi-statically configured DL symbol or a symbol configured for reception of an SS/PBCH block, the terminal may transmit the PUCCH.

In the present specification, a problem related to repeated PUSCH or PUCCH transmission of a terminal for improving coverage performance may be described as a PUSCH or PUCCH coverage problem.

Figure 17:
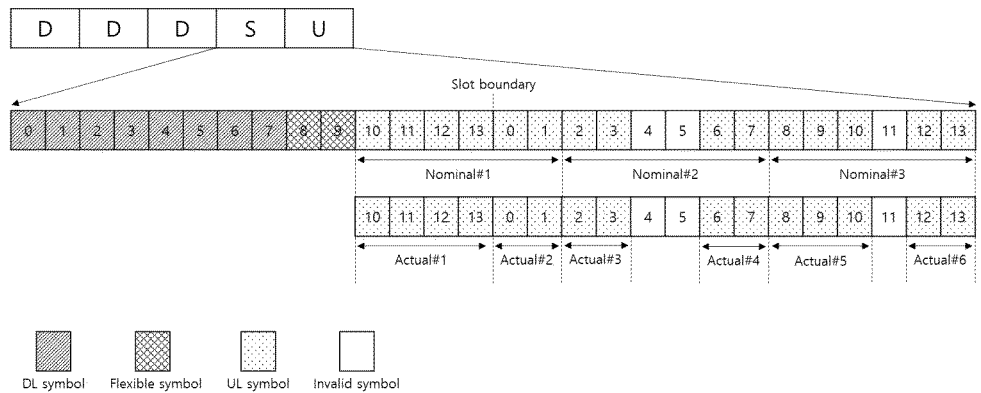
FIG. 17 illustrates a problem that occurs when a terminal repeatedly transmits a PUSCH in a TDD situation according to an embodiment of the present disclosure.

FIG. 17 illustrates a problem that occurs when a terminal repeatedly transmits a PUSCH in a TDD situation according to an embodiment of the present disclosure.

Referring to FIG. 17, in a TDD situation, slot "D" may be a slot including all symbols that are downlink symbols, slot "U" may be a slot including all symbols that are uplink symbols, and slot "S" may be a slot other than slot "D" and slot "U". In this case, slot "S" may include at least one flexible symbol. Repeated PUSCH transmission type B may be configured for slot "S" and slot "U". Even if a base station configures for (indicates to) a terminal that a length of a nominal PUSCH is 6 symbols, a length of an actual PUSCH may be 2, 3, or 4 symbols due to a slot boundary and an invalid symbol. Each repeatedly transmitted actual PUSCH may include one DMRS symbol. If one DMRS symbol is mapped per actual PUSCH, a data symbol transmitted in the actual PUSCH may have a length of 1, 2, or 3 symbols. Compared to 6-symbol PUSCH transmission, the terminal needs to use a higher code rate when transmitting a transport block (TB) of the same number of bits. Therefore, even if repeated transmission is configured to improve coverage performance, because a high code rate is used, there is a problem in securing coding gain. That is, the terminal repeatedly transmitting a PUSCH according to repeated PUSCH transmission type B does not solve a coverage problem. In addition, since a PUSCH including a small number of symbols should include at least one DMRS symbol, a DMRS overhead becomes greater as the number of symbols constituting an actual PUSCH becomes fewer, and therefore coverage performance for an uplink channel and signal transmitted by a terminal located at a cell-edge may be degraded.

Figure 18:
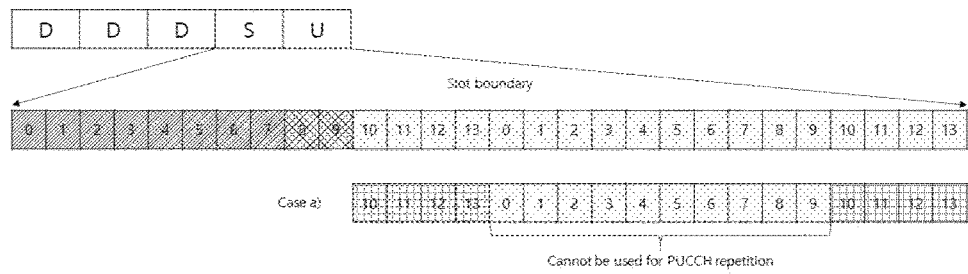
FIG. 18 illustrates a problem that occurs when a terminal repeatedly transmits a PUCCH in a TDD situation according to an embodiment of the present disclosure.

FIG. 18 illustrates a problem that occurs when a terminal repeatedly transmits a PUCCH in a TDD situation according to an embodiment of the present disclosure.

Referring to case a of FIG. 18, repeated PUCCH transmission in a TDD situation may be configured on slot "S" and a slot "U". A PUCCH having a total symbol length of 4 from symbol 10 to symbol 13 within a slot may be configured, and repeated PUCCH transmissions having the same position and length may be performed over two slots. That is, a first repeated PUCCH transmission may be performed on symbol 10 to symbol 13 in a first slot, and a second repeated PUCCH transmission may be performed on symbol 10 to symbol 3 in a second slot. In this case, a zeroth symbol to a ninth symbol in the second slot may not be used for repeated PUCCH transmission. Therefore, when a UL symbol available for repeated PUCCH transmission is restricted, a coverage problem may occur. For repeated PUCCH transmission with high reliability, a restricted UL symbol (symbol unavailable for repeated PUCCH transmission) needs to be used.

Hereinafter, a solution for improving coverage performance according to repeated PUSCH transmission type B and repeated PUCCH transmission described with reference to FIG. 17 and FIG. 18 will be described.

In order to solve a coverage problem that occurs during repeated PUSCH transmission, multiple actual PUSCHs may be combined and transmitted. Hereinafter, for convenience of description, an actual PUSCH may not be actually transmitted, and a PUSCH determined according to a method described below may be actually transmitted.

One or multiple actual PUSCHs may be combined to constitute combined actual PUSCH(s), and the combined actual PUSCH(s) may be transmitted. Actual PUSCHs consecutive in the time domain may be combined to constitute one combined actual PUSCH. Being consecutive in the time domain may refer to a case in which there is no symbol between two consecutive actual PUSCHs. When the terminal combines and transmits repeatedly transmitted PUSCHs, the total number of symbols of PUSCHs including repetition transmission should not exceed a preconfigured number of symbols. That is, the total number of symbols of a combined actual PUSCH transmitted for coverage improvement may not exceed a preconfigured number of symbols. The preconfigured number of symbols may be a value configured for the terminal by the base station. In addition, the preconfigured number of symbols may be a maximum number of symbols constituting a slot. The maximum number of symbols constituting a slot may be 14 for a normal CP and may be 12 for an extended CP.

FIG. 19 illustrates a method of combining repeatedly transmitted PUSCHs according to an embodiment of the present disclosure.

Referring to FIG. 19(a), a preconfigured number of symbols may be 14. Actual PUSCH #1 to actual PUSCH #3 may be combined to constitute combined PUSCH #1, and actual PUSCH #4 and actual PUSCH #5 may be combined to constitute combined PUSCH #2. Actual PUSCH #1 to actual PUSCH #6 include a total of 15 symbols. Accordingly, a second symbol (symbol 13 in a second slot) is a symbol exceeding 14 symbols, i.e., the preconfigured number of symbols, and may be thus dropped. Therefore, a first symbol (symbol 12 in the second slot) of actual PUSCH #6 includes one symbol, and may be thus dropped according to PUSCH mapping type B. Referring to FIG. 19(b), the number of symbols constituting a PUSCH may not be restricted. Therefore, two symbols (symbols 12 and 13 in the second slot) of actual PUSCH #6 are consecutive symbols and may be combined to constitute combined PUSCH #3, and a terminal may also transmit combined PUSCH #3 to a base station.

FIG. 20 illustrates a method of combining repeatedly transmitted PUSCHs according to an embodiment of the present disclosure.

When configuring the described combined PUSCH, actual PUSCHs may be combined in consideration of a slot boundary. Referring to FIG. 20A, a preconfigured number of symbols may be 14. Consecutive symbols from symbol 10 of a first slot, in which actual PUSCHs are transmitted, may be combined, wherein the symbols may be combined based on slot boundaries. That is, actual PUSCH #1 may constitute combined PUSCH #1, subsequent actual PUSCH #2 and actual PUSCH #3 may constitute combined PUSCH #2, and actual PUSCH #4 and actual PUSCH #5 may constitute combined PUSCH #3. Unlike FIG. 19, since a slot boundary exists between actual PUSCH #1 and actual PUSCH #2, combined PUSCH #1 may include only actual #1. A second symbol (symbol 13 in a second slot) of actual PUSCH #6 is a symbol exceeding 14 symbols, i.e., the preconfigured number of symbols, and may be thus dropped. Therefore, a first symbol (symbol 12 in the second slot) of actual PUSCH #6 includes one symbol, and may be thus dropped according to PUSCH mapping type B. Referring to FIG. 20B, the number of symbols constituting a PUSCH may not be restricted. Therefore, two symbols (symbols 12 and 13 in the second slot) of actual PUSCH #6 are consecutive symbols and may be combined to constitute combined PUSCH #4, and a terminal may also transmit combined PUSCH #4 to a base station. In this case, the number of symbols constituting the combined PUSCH may be restricted. For example, the restricted number of symbols may be 2 to 14.

After generating one combined PUSCH by combining actual PUSCHs of a specific unit, the terminal may transmit the combined PUSCH. The specific unit may be at least one of a set of symbols, a slot, or a set of slots, for example, when the specific unit is a slot, actual PUSCHs in the slot may be combined to constitute one combined PUSCH. If the specific unit is a set of N symbols, the terminal may determine the set of symbols and combine actual PUSCHs in the set of symbols so as to configure one combined PUSCH. The set of symbols may be sequentially grouped by N symbols from a first symbol of a 10 ms radio frame or a slot. N may be a divisor of the number of symbols constituting a slot. For example, N may be 7 for a normal CP and may be 6 for an extended CP.

The base station may configure (indicate), for the terminal, the number of actual PUSCHs constituting a combined PUSCH. A combined PUSCH may be configured by combining actual PUSCHs according to the configured number. For example, if the configured number is K, a combined PUSCH may be configured by combining K actual PUSCHs starting from a first actual PUSCH. If the total number of actual PUSCHs is not a multiple of K, one of combined PUSCHs may include actual PUSCHs of the number corresponding to a remainder obtained by dividing the total number of actual PUSCHs by K. Actual PUSCHs may be indexed according to a time sequence.

A combined PUSCH may be configured by combining actual PUSCHs corresponding to (or included in) one nominal PUSCH. One nominal PUSCH may be divided into one or multiple actual PUSCHs due to a slot boundary or an invalid symbol. Multiple actual PUSCHs obtained by division of one nominal PUSCH may be combined to constitute one combined PUSCH. i) When multiple actual PUSCHs obtained by division of one nominal PUSCH are combined to constitute one combined PUSCH, a slot boundary may be considered. That is, a combined PUSCH may be configured by combining only actual PUSCHs in the same slot. In other words, actual PUSCHs in different slots constitute different combined PUSCHs. ii) When multiple actual PUSCHs obtained by division of one nominal PUSCH are combined to constitute one combined PUSCH, time continuity may be considered. That is, a combined PUSCH may be configured by only consecutive actual PUSCHs. In this case, actual PUSCHs consecutive in the time domain included in different slots may be combined to constitute one combined PUSCH. That is, actual PUSCHs inconsecutive in the time domain constitute different combined PUSCHs. If actual PUSCHs consecutive in the time domain constitute one combined PUSCH regardless of a slot boundary, the number of symbols constituting the combined PUSCH may be restricted. For example, the number of symbols constituting a combined PUSCH may be restricted to a maximum number of symbols constituting one slot or the number of symbols constituting a slot required for coverage extension.

The base station may configure (indicate), for the terminal, a minimum number of symbols constituting a combined PUSCH. The base station may determine the minimum number of symbols constituting a combined PUSCH by considering at least one of a DMRS overhead, a TB size, and a code rate. That is, a combined PUSCH may be configured by combining actual PUSCHs so as to have a length greater than or equal to the minimum number. For example, when the minimum number is M and lengths of actual PUSCHs are A1, A2, and A3, respectively, if A1 is smaller than M, since the minimum number of symbols constituting a combined PUSCH is not satisfied, the actual PUSCH of length A1 may be combined with the actual PUSCH of length A2 to constitute the combined PUSCH. If A1+A2 is still smaller than M, a combined PUSCH may be configured by combining the actual PUSCH of length A3. In other words, if a length of an actual PUSCH or a length of a combined PUSCH is greater than or equal to M, additional actual PUSCH may not be combined.

The base station may configure (indicate), for the terminal, a maximum number of symbols constituting a combined PUSCH. The base station may determine the maximum number of symbols constituting a combined PUSCH by considering at least one of a DMRS overhead, a TB size, and a code rate. In this case, the maximum number may be 14 symbols. That is, a combined PUSCH may be configured by combining actual PUSCHs so as to have a length smaller than or equal to the maximum number. For example, when the maximum number is M and lengths of actual PUSCHs are A1, A2, and A3, respectively, if A1 is smaller than M, but A1+A2 is greater than M, since A1+A2 exceeds the maximum number of symbols, the actual PUSCH of length A1 may not be combined with the actual PUSCH of length A2. If A1+A2 is smaller than M, since A1+A2 does not exceed the maximum number of symbols, the actual PUSCH of length A1 may be combined with the actual PUSCH of length A2 to constitute a combined PUSCH. Whether to combine the actual PUSCH of length A3 may also be determined in the same manner. Accordingly, the length of the combined PUSCH may be maintained below a certain symbol length. In other words, the terminal may not transmit a combined PUSCH exceeding a certain length.

The base station may configure (indicate), for the terminal, a minimum length of an actual PUSCH to be coupled. For example, for repeated PUSCH transmission type B, an actual PUSCH having a length of one symbol may be dropped or omitted without being transmitted. Therefore, the actual PUSCH that is dropped or omitted may be transmitted in combination with another actual PUSCH. For example, if a minimum length of an actual PUSCH is M and lengths of actual PUSCHs are A1, A2, and A3, an actual PUSCH having a length smaller than M from among A1, A2, and A3 may be combined with another adjacent actual PUSCH to constitute a combined PUSCH. In this case, the number of combined actual PUSCHs may be two. i) An actual PUSCH having a length smaller than the minimum length may be combined with an actual PUSCH having a shorter length from among two adjacent actual PUSCHs. For example, actual PUSCH #2 of FIG. 17 may be combined with actual PUSCH #3 having a shorter length from among actual PUSCH #1 and actual PUSCH #3. The terminal may efficiently use a dropped or omitted resource by combining a dropped or omitted actual PUSCH with another actual PUSCH and transmitting the same. In addition, by combining actual PUSCHs, a DMRS overhead may be reduced, resulting in an increase in a data transmission rate. ii) An actual PUSCH having a length smaller than the minimum length may be combined with an actual PUSCH having a longer length among two adjacent actual PUSCHs. For example, actual PUSCH #2 of FIG. 17 may be combined with actual PUSCH #1 having a longer length among actual PUSCH #1 and actual PUSCH #3. A PUSCH may be transmitted in a resource of a longer time domain, and this is effective in extending coverage. iii) An actual PUSCH having a length smaller than the minimum length may be combined with an actual PUSCH located earlier in time among two adjacent actual PUSCHs. Since a PUSCH is transmitted for a long time from an earlier time domain resource, coverage is extended and delay is reduced. iv) An actual PUSCH having a length smaller than the minimum length may be combined with an actual PUSCH located later in time among two adjacent actual PUSCHs. For PUSCH transmission that is not sensitive to a delay, a PUSCH may be transmitted on a long time resource, which is advantageous for coverage extension.

A combined PUSCH may be configured by combining symbols included in nominal PUSCH(s). In this case, the described procedure of dividing nominal PUSCH(s) into actual PUSCHs may be omitted. That is, a combined PUSCH may be generated directly from nominal PUSCH(s). i) The base station may configure (indicate), for the terminal, a minimum number of symbols constituting a combined PUSCH. The terminal may determine the number of symbols included in nominal PUSCH(s). In this case, an invalid symbol may be excluded. A combined PUSCH may include the minimum number of symbols among symbols included in the nominal PUSCH(s). Since it is the minimum number, the combined PUSCH may include more symbols than the minimum number. A combined PUSCH may be configured in consideration of consecutive symbols and/or a slot boundary. Specifically, a combined PUSCH is configured by the minimum number of symbols among symbols included in nominal PUSCH(s), and if there are consecutive symbols subsequent to a last symbol among the minimum number of symbols, the combined PUSCH may be configured by additionally combining consecutive symbols. In this case, if the consecutive symbols cross a slot boundary, slots crossing the slot boundary may not be combined. That is, additionally combined symbols may be symbols within the same slot. ii) The base station may configure (indicate), for the terminal, a maximum number of symbols constituting a combined PUSCH. That is, if the number of symbols constituting a combined PUSCH exceeds the maximum number, an additional combined PUSCH may be newly configured. For example, the maximum number may be 14 or may be a maximum number of symbols constituting X slots. iii) The base station may configure (indicate), for the terminal, the number of configurable combined PUSCHs. The terminal may determine the number of symbols constituting nominal PUSCH(s). In this case, an invalid symbol may be excluded. For example, if the number of symbols constituting nominal PUSCH(s) is S and the number of configurable combined PUSCHs is Y, a combined PUSCH may include floor(S/Y) or ceil(S/Y) symbols. floor(x) is a function that returns a largest integer among integers equal to or smaller than x. floor(x) is a function that returns a smallest integer among integers equal to or larger than x.

Hereinafter, a frequency hopping method for obtaining diversity gain when the terminal combines and transmits multiple actual PUSCHs will be described.

i) The terminal may transmit an odd-numbered combined PUSCH in a first PRB(s) and may transmit an even-numbered combined PUSCH in a second PRB(s). The base station may configure, for the terminal, an offset value for a PRB interval of the first PRB(s) and the second PRB(s), and the terminal may transmit a combined PUSCH, based on the offset value. ii) The terminal may divide a combined PUSCH into two or more parts in the time domain, and may transmit the divided combined PUSCH via frequency hopping. For example, the combined PUSCH may be divided into two parts in the time domain. If the divided two parts are referred to as a first hop and a second hop, a difference between symbols constituting the first hop and the second hop may be configured to be minimum. If the number of symbols of the combined PUSCH is $N^{PUSCH}_{symb}$, the number of symbols constituting the first hop may be floor($N^{PUSCH}_{symb}/2$), and the number of symbols constituting the second hop may be $N^{PUSCH}_{symb}$-floor($N^{PUSCH}_{symb}/2$). Alternatively, the number of symbols constituting the first hop may be ceil($N^{PUSCH}_{symb}/2$), and the number of symbols constituting the second hop may be $N^{PUSCH}_{symb}$-ceil($N^{PUSCH}_{symb}/2$). In this case, the first hop may be transmitted on the first PRB(s), and the second hop may be transmitted on the second PRB(s). The base station may configure, for the terminal, an offset value for a PRB interval of the first PRB(s) and the second PRB(s), and the terminal may transmit a combined PUSCH, based on the offset value. iii) The base station may configure, for the terminal, a minimum number of symbols per hop for transmission of a combined PUSCH. The terminal may transmit a combined PUSCH via frequency hopping by comparing the number of symbols constituting the combined PUSCH with the minimum number of symbols per hop. For example, if the number of symbols of the combined PUSCH is fewer than or equal to the minimum number of symbols per hop, the terminal may transmit the combined PUSCH without frequency hopping. Conversely, if the number of symbols of the combined PUSCH is more than the minimum number of symbols per hop, the terminal may transmit the combined PUSCH via divided two or more hops. In this case, a method of transmitting the divided two or more hops may be the same as ii) described above. Division may be performed into two or more hops, based on the minimum number of symbols per hop. That is, hops may be configured by bundling symbols constituting a combined PUSCH as many symbols as the minimum number of symbols. If the number of symbols in a combined PUSCH is not a multiple of the minimum number of symbols per hop, the number of symbols constituting any one of the divided hops may be equal to a remainder obtained by dividing the number of symbols constituting the combined PUSCH by the minimum number of symbols per hop.

Frequency hopping described below may be applied regardless of a combined PUSCH.

FIG. 21 to FIG. 26 illustrate a frequency hopping method of a repeatedly transmitted PUSCH, according to an embodiment of the present disclosure.

Figure 21:
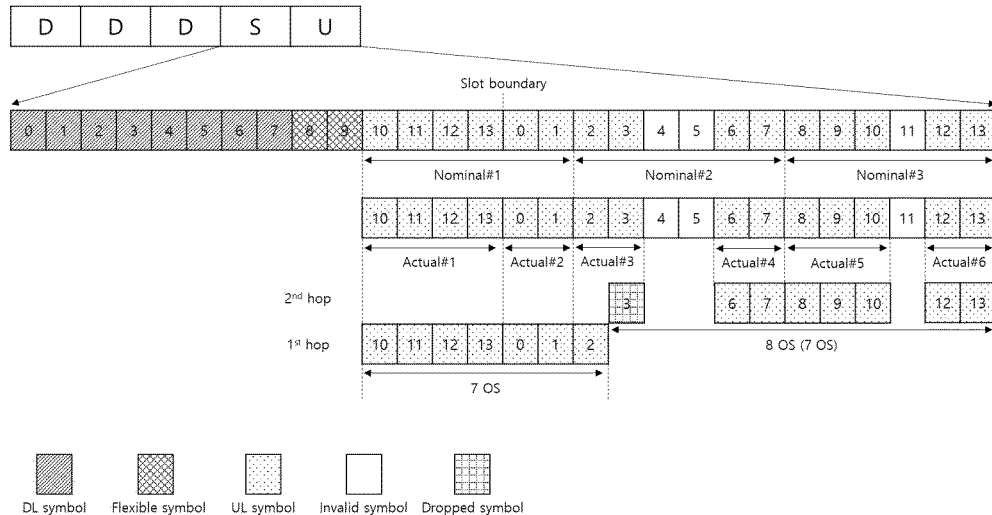
Figure 22:
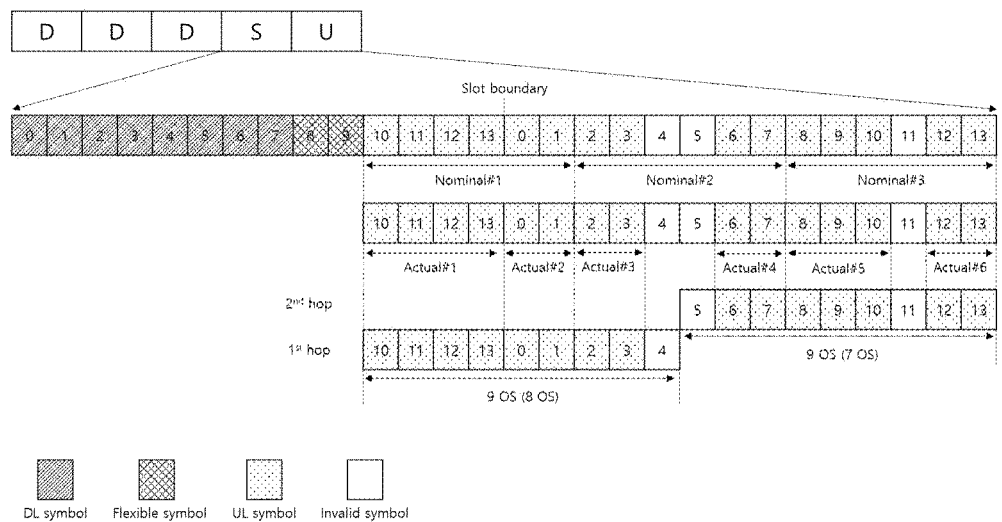

Frequency hopping may be performed by dividing a total length of a repeatedly transmitted PUSCH in half in the time domain. i) A hopping boundary for frequency hopping may be determined by dividing a total length of a repeatedly transmitted PUSCH in half, and the repeated PUSCH may be transmitted based on the determined hopping boundary. If the total length of the repeatedly transmitted PUSCH is $N^{PUSCH}_{symb}$, the number of PUSCH symbols constituting a first hop is floor($N^{PUSCH}_{symb}/2$), and the number of PUSCH symbols constituting a second hop may be $N^{PUSCH}_{symb}$-floor($N^{PUSCH}_{symb}/2$) (Method a). Alternatively, the number of PUSCH symbols constituting a first hop may be ceil($N^{PUSCH}_{symb}/2$), and the number of PUSCH symbols constituting a second hop may be $N^{PUSCH}_{symb}$-ceiling($N^{PUSCH}_{symb}/2$) (method b). For example, the total length of repeatedly transmitted PUSCHs may be the sum of lengths of respective actual PUSCHs. Referring to FIG. 21, if repeated PUSCH transmission type B is configured, a length of all actual PUSCHs, which is obtained by adding lengths of respective actual PUSCHs, may be 15 (i.e., the sum of a length of actual PUSCH #1 to a length of actual PUSCH #6). If described method a is applied, the number of symbols constituting a first hop may be 7 (from symbol 10 in a first slot to symbol 2 in a second slot). The number of symbols constituting a second hop may be 8 (symbol 3 in the second slot, symbols 6 to 10 in the second slot, and symbols 12, 13 in the second slot). In this case, if a scheme of repeated PUSCH transmission type B is applied to the second hop, as described above, for a PUSCH including one symbol, the symbol is a DMRS symbol, and therefore the terminal may not transmit the PUSCH (a first symbol of the second hop) including one symbol. If described method b is applied, the first hop may include 8 symbols and the second hop may include 7 symbols. Accordingly, the terminal may transmit a PUSCH without a dropped symbol. As another example, if the base station and the terminal know about all of symbol configuration information, a configuration of an invalid symbol, etc., the terminal may determine a hopping boundary so that a PUSCH including one symbol is not generated. That is, referring to FIG. 21, if the terminal and the base station know about a symbol configuration, the terminal may configure the first hop with 8 symbols and configure the second hop with 7 symbols by applying method b, so as to transmit the PUSCH without a dropped symbol. In addition, a total length of a repeatedly transmitted PUSCH may be the same as a total length of a nominal PUSCH. Referring to FIG. 22, a total length of nominal PUSCHs may be 18 symbols (Nominal #1 to Nominal #3). A first hop may include 9 symbols (from symbol 10 in a first slot to symbol 4 in a second slot), and a second hop may include 9 symbols (from symbol 5 in the second slot to symbol 13 in the second slot). The terminal may transmit the first hop and the second hop via frequency hopping. ii) The total length of the repeatedly transmitted PUSCH in i) may be a length of one nominal PUSCH or a length of an actual PUSCH having a longest length from among actual PUSCHs. The first hop obtained by division via described i) and ii) may be transmitted on a first PRB(s), and the second hop may be transmitted on a second PRB(s). In the present specification, a PUSCH/PUCCH symbol or a PUSCH/PUCCH symbol may refer to a symbol in which a PUSCH/PUCCH is transmitted.

Figure 23:
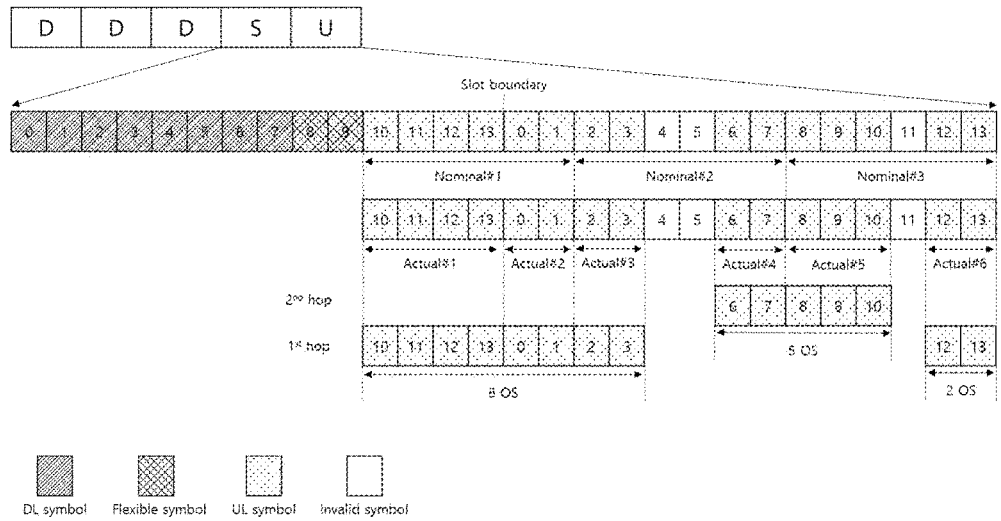

Consecutive PUSCH symbols may constitute an identical hop. If the base station configures repeated PUSCH transmission for the terminal, symbols to which consecutive actual PUSCHs are allocated may constitute one hop. In this case, the number of symbols constituting one hop may be a variable value rather than a fixed value. Referring to FIG. 23, eight consecutive symbols (symbol 10 in a first slot to symbol 3 in a second slot) from a starting symbol (symbol 10 in the first slot) to an invalid symbol (symbol 4 in the second slot) of a repeatedly transmitted PUSCH may constitute one hop (first hop). Five consecutive symbols (symbol 6 in the first slot to symbol 10 in the second slot) from a symbol (symbol 6 in the second slot) of a subsequent repeatedly transmitted PUSCH to a subsequent invalid symbol (symbol 11 in the second slot) may constitute another hop (second hop). Two consecutive symbols starting from a symbol (symbol 12 in the second slot) of a subsequent repeatedly transmitted PUSCH may constitute another hop (a third hop). In this case, the first hop and the third hop may be transmitted on the same frequency domain resource or may be transmitted on different frequency domain resources. Even if consecutive symbols are included in different slots, the consecutive symbols are included in one hop so that a DMRS overhead is reduced compared to a case in which one hop includes only symbols in the same slot. However, the number of hops may be increased due to inclusion of an invalid symbol in one slot, and a DMRS overhead may be increased if a DMRS needs to be assigned for each hop. However, in a situation where a channel delay spread and a channel change on the time axis are not large within one slot, frequency domain resources in which odd-numbered hops (e.g., a first hop, a third hop, etc.) are transmitted may be configured to be always the same, and frequency domain resources in which even-numbered hops (e.g., a second hop, a fourth hop, etc.) are transmitted may be configured to be always the same. By configuring frequency domain resources, in which odd-numbered/even-numbered hops are transmitted, to be always the same, a problem that a DMRS overhead is increased due to an increase in hops can be solved.

Figure 24:
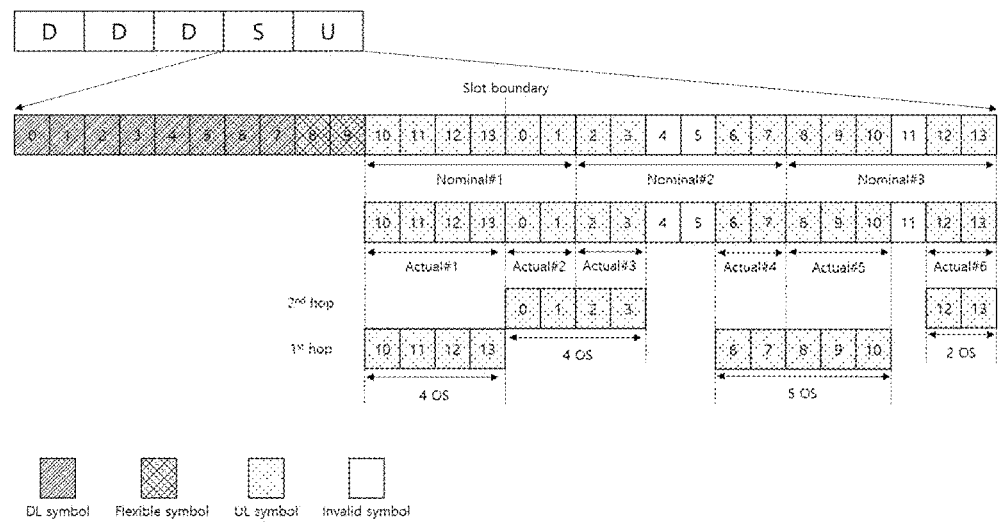

Based on a slot boundary, consecutive PUSCH symbols may constitute one hop. Referring to FIG. 24, four consecutive symbols (symbol 10 to symbol 13 in a first slot) from a starting symbol (symbol 10 in the first slot) of a repeatedly transmitted PUSCH to a slot boundary may constitute a first hop, four consecutive symbols (symbol 0 to symbol 3 in a second slot) from a subsequent PUSCH symbol (symbol 0 in the second slot) to an invalid symbol (symbol 4 in the second slot) may constitute a second hop, five consecutive symbols (symbol 6 to symbol 10 in the second slot) from a subsequent PUSCH symbol (symbol 6 in the second slot) to a subsequent invalid symbol (symbol 11 in the second slot) may constitute a third hop, and two consecutive symbols (symbol 12 and symbol 13 in the second slot) from a subsequent PUSCH symbol (symbol 12 in the second slot) may constitute a fourth hop. As described above, the odd-numbered hops may be transmitted on the same frequency domain resource, and the even-numbered hops may be transmitted on the same frequency domain resource. This is effective in terms of compatibility because characteristics of NR, in which a transmission unit is configured and scheduling is performed in units of slots, can be maintained.

Figure 25:
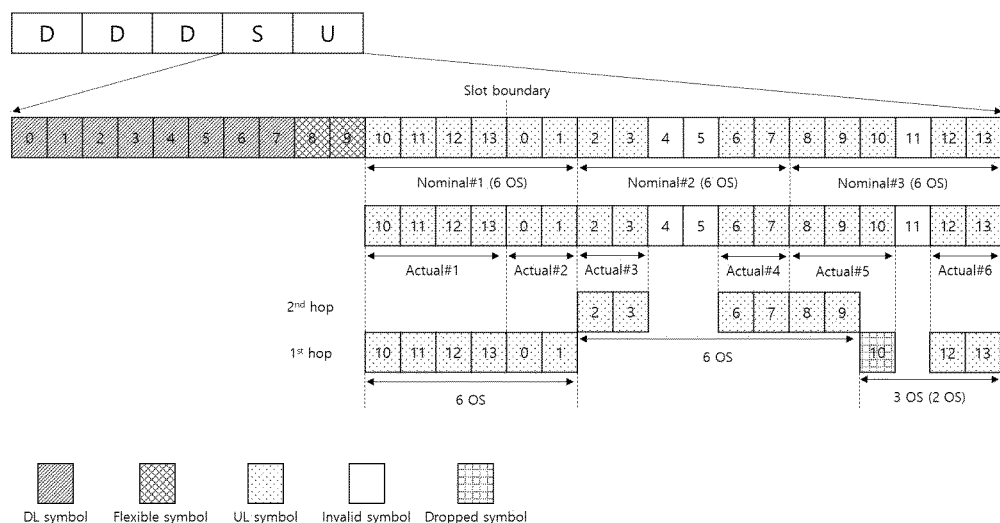

One frequency hop may include a predetermined specific number of symbols. In this case, the specific number of symbols may be a maximum number that may constitute one hop. In other words, if the number of consecutive symbols is fewer than the specific number of symbols, one hop may include the number of consecutive symbols fewer than the specific number of symbols. In this case, the preconfigured specific number may be a value configured for the terminal by the base station. The predetermined specific number may be equal to a length of a nominal PUSCH. Since the length of the nominal PUSCH is fixed, one hop may include the same number of symbols as that of the nominal PUSCH in chronological order. In this case, a downlink symbol or an invalid symbol may be excluded from symbols constituting one hop. Referring to FIG. 25, the number of symbols of one nominal PUSCH is 6 symbols. If PUSCH symbols consecutive in chronological order in the time domain constitute one hop, a first hop may include 6 symbols (symbol 10 in a first slot to symbol 1 in a second slot), a second hop may include subsequent 6 symbols (symbols 2, 3, 6, 7, 8, and 9 in the second slot), and a third hop may include the remaining symbols (symbols 12 and 13 in the second slot). In this case, since consecutive symbols may be transmitted via one hop, symbol 10 in the second slot has no neighboring symbol to be grouped with in one hop. Accordingly, if repeated PUSCH transmission type B is applied, since symbol 10 in the second slot corresponds to a PUSCH having a length of one symbol, the PUSCH may not be transmitted. In this case, the first hop and the third hop may be transmitted in the same frequency domain resource. As another example, the preconfigured specific number may be any one of divisors of the total number of symbols of a repeatedly transmitted PUSCH. The total number of symbols of actual PUSCHs is N, and N may be a natural number that is not a prime number. The number of symbols constituting one hop may be a number except for 1 and N among divisors of N. That is, one hop may include the specific number of consecutive or inconsecutive symbols. In addition, after configuring a hop with the specific number of consecutive symbols, if a PUSCH having one symbol exists, the PUSCH having one symbol may be dropped. Specifically, the specific number of symbols may be i) a largest number among the divisors of N, except for 1 and N. By determining the largest number as the number of symbols constituting one hop, a PUSCH may be transmitted for a longer period of the time domain via the same PRB, so that coverage can be extended. Referring to FIG. 26(a), when the total number (N) of symbols of actual PUSCHs is 15, 5 which is a largest number of the divisors except for 1 and 15 may be determined as the number of symbols constituting one hop. That is, the terminal may configure one hop with five consecutive or inconsecutive PUSCH symbols in chronological order from a symbol (symbol 10 in a first slot) in which a repeatedly transmitted PUSCH starts. ii) The specific number of symbols may be a smallest number of the divisors of N, except for 1 and N. By determining the smallest number as the number of symbols constituting one hop, a hopping period may be shortened, and therefore transmission of hops on different PRBs may be performed frequently for a short period of the time domain. Referring to FIG. 26(b), when the total number (N) of symbols of actual PUSCHs is 15, 3 which is a smallest number of the divisors of 15 except for 1 and 15 may be determined as the number of symbols constituting one hop. That is, the terminal may configure one hop with three consecutive or inconsecutive PUSCH symbols in chronological order from a symbol (symbol 10 in a first slot) in which a repeatedly transmitted PUSCH starts. In this case, since symbol 6 and symbol 10 in the second slot correspond to PUSCHs having a length of one symbol, so that the PUSCHs may not be transmitted. In other words, after configuring one hop with the specific number of symbols regardless of whether the symbols are consecutive or not, a PUSCH having a symbol length of one and having no consecutive symbol may not be transmitted.

The base station may configure (indicate), for the terminal, a specific unit based on which frequency hopping may be performed. That is, PUSCH symbols included in the specific unit may constitute one hop, and frequency hopping may be performed based on a boundary of the specific unit. The specific unit may be at least one of a symbol set, a slot set, a symbol set determined according to a nominal PUSCH, and a slot set determined according to a nominal PUSCH.

If the specific unit is a symbol set, the base station may configure (indicate), for the terminal, the number (N) of symbols constituting the symbol set. The terminal may generate a symbol set by grouping N symbols starting from a first symbol of a radio frame. Scheduled PUSCHs that are repeatedly transmitted may constitute one hop according to the symbol set. That is, a length of one symbol set may be a length of one hop. PUSCHs included in an odd-numbered symbol set may be transmitted on a first PRB(s), and PUSCHs included in an even-numbered symbol set may be transmitted on a second PRB(s).

If the specific unit is a symbol set determined according to a nominal PUSCH, the number (N) of symbols constituting the symbol set may be equal to the length of the nominal PUSCH. The terminal may generate a symbol set by grouping N symbols starting from a first symbol scheduled for the nominal PUSCH. In this case, the base station may configure (indicate), for the terminal, a natural number value (K) for adjustment of the number of symbols constituting the symbol set. The terminal may generate a symbol set by grouping N*K symbols starting from the first symbol scheduled for the nominal PUSCH. That is, the natural number K may extend the number of symbols included in the symbol set to a multiple of the length of the nominal PUSCH. Scheduled PUSCHs may constitute one hop according to the symbol set. That is, a length of one symbol set may be a length of one hop. PUSCHs included in an odd-numbered symbol set may be transmitted on a first PRB(s), and PUSCHs included in an even-numbered symbol set may be transmitted on a second PRB(s).

If the specific unit is a slot set, the base station may configure (indicate), for the terminal, the number (N) of slots constituting the slot set. The terminal may generate a slot set by grouping N slots starting from a first slot of a radio frame. Scheduled PUSCHs may constitute one hop according to the slot set. That is, a length of one slot set may be a length of one hop. PUSCHs included in an odd-numbered symbol set may be transmitted on a first PRB(s), and PUSCHs included in an even-numbered symbol set may be transmitted on a second PRB(s).

If the specific unit is a slot set determined according to a nominal PUSCH, the base station may configure (indicate), for the terminal, the number (N) of slots constituting the slot set. The terminal may generate a slot set by grouping N slots starting from a first slot scheduled for the nominal PUSCH. Scheduled PUSCHs may constitute one hop according to the slot set. That is, a length of one slot set may be a length of one hop. PUSCHs included in an odd-numbered symbol set may be transmitted on a first PRB(s), and PUSCHs included in an even-numbered symbol set may be transmitted on a second PRB(s). Likewise, the first hop may be transmitted on the first PRB(s), and the second hop may be transmitted on the second PRB(s).

i) Frequency hopping may be determined based on the number of slots scheduled for a nominal PUSCH. If the number of slots scheduled for the nominal PUSCH is $N^{PUSCH}_{slot}$, the number of slots constituting the first hop may be floor($N^{PUSCH}_{slot}/2$), and the number of slots constituting the second hop may be $N^{PUSCH}_{slot}$ − floor($N^{PUSCH}_{slot}/2$). Alternatively, the number of slots constituting the first hop may be ceil($N^{PUSCH}_{slot}/2$), and the number of slots constituting the second hop may be $N^{PUSCH}_{slot}$ − ceil($N^{PUSCH}_{slot}/2$). In this case, the first hop may be configured starting from the slot scheduled for the nominal PUSCH.

ii) Frequency hopping may be determined based on the number of slots scheduled for actual PUSCHs. If the number of slots scheduled for actual PUSCHs is $N^{PUSCH}_{slot}$, the number of slots constituting the first hop and the number of slots constituting the second hop may be determined in the same manner as i) described above. In this case, although a nominal PUSCH is scheduled, a slot from which all nominal PUSCH symbols have been excluded due to an invalid symbol may not be included in the $N^{PUSCH}_{slot}$. In this case, the first hop may be configured starting from the slot scheduled for the nominal PUSCH.

iii) Frequency hopping may be determined based on the number of longest consecutive symbols among symbols consecutive in the time domain of actual PUSCHs. The actual PUSCH may be one or multiple repeatedly transmitted actual PUSCHs. That is, if the terminal is configured with repeated PUSCH transmission from the base station, frequency hopping may be determined based on actual PUSCHs. In this case, an actual PUSCH having the number of symbols fewer than the number of symbols configured for one hop by the terminal may not be hopped. For example, the terminal may configure one hop with as many symbols as the number of longest consecutive symbols of a PUSCH in the time domain. If the number of the longest PUSCH symbols is $N^{PUSCH}_{symb,max}$, the numbers of symbols constituting the first hop and the second hop may be $N^{PUSCH}_{symb,max}$. That is, the terminal may transmit, on the first PRB(s), PUSCHs transmitted in $N^{PUSCH}_{symb,max}$ symbols starting from the symbol scheduled for the PUSCH, and may transmit, on the second PRB(s), PUSCHs transmitted in subsequent $N^{PUSCH}_{symb,max}$ symbols. As another example, one hop may be configured with as many symbols as a certain number of symbols, the certain number being obtained by equally dividing the number of the longest PUSCH symbols in the time domain. If the number of the longest symbols is $N^{PUSCH}_{symb,max}$, the number of symbols constituting the first hop is floor ($N^{PUSCH}_{symb,max}/2$), and the number of symbols constituting the second hop is $N^{PUSCH}_{symb,max}$–floor ($N^{PUSCH}_{symb,max}/2$) Alternatively, the number of symbols constituting the first hop may be ceil ($N^{PUSCH}_{symb,max}/2$), and the number of symbols constituting the second hop may be $N^{PUSCH}_{symb,max}$–ceil ($N^{PUSCH}_{symb,max}/2$). In this case, the first hop may be configured starting from a symbol scheduled for an actual PUSCH.

iv) Frequency hopping may be determined based on the number of shortest consecutive symbols among symbols consecutive in the time domain of actual PUSCHs. There may be one actual PUSCH. That is, if the terminal is configured with PUSCH transmission from the base station, the terminal may determine frequency hopping based on actual PUSCHs. If the number of the shortest consecutive symbols is $N^{PUSCH}_{symb,min}$ the numbers of symbols constituting the first hop and the second hop may be $N^{PUSCH}_{symb,min}$. In this case, the first hop may be configured starting from a symbol scheduled for a PUSCH.

Hereinafter, a method of determining the number and positions of symbols to which a DMRS symbol of a combined PUSCH is mapped will be described. A DMRS symbol described in the present specification may refer to a symbol to which a DMRS is mapped.

FIG. 27 illustrates a method of determining a position of a symbol to which a DMRS included in a repeatedly transmitted PUSCH is mapped, according to an embodiment of the present disclosure.

A terminal may determine a position of a DMRS symbol by considering, as one transmission group, all or some of consecutive PUSCH symbols constituting a combined PUSCH. In this case, by applying only PUSCH mapping type B, the terminal may always map a DMRS to a first symbol among consecutive PUSCH symbols constituting one transmission group. If abase station configures (indicates) additional DMRS symbols for the terminal, the base station may configure, for the terminal, the number of additional DMRS symbols. A position of an additional DMRS symbol may be determined according to a PUSCH mapping type. One transmission group may be consecutive PUSCH symbols or hops. Referring to FIG. 27(a), the numbers of symbols of combined PUSCH #1, combined PUSCH #2, and combined PUSCH #3, each of which is one transmission group, may be 8, 5, and 2, respectively. The terminal may map the additional DMRS to the position of the symbol according to the PUSCH mapping type, based on the number of additional DMRSs configured by the base station. In this case, the number of additional DMRSs may be configured via a higher layer. For example, if the number of additional DMRS symbols is 0, a DMRS is mapped to only a first symbol of each transmission group. If the number of additional DMRS symbols is 1, a first symbol and a seventh symbol of combined PUSCH #1, a first symbol and a fifth symbol of combined PUSCH #2, and a first symbol of combined PUSCH #3 may be DMRS symbols. If the number of additional DMRS symbols is 2, a first symbol, a fourth symbol, and a seventh symbol of combined PUSCH #1, a first symbol and a fifth symbol of combined PUSCH #2, and a first symbol of combined PUSCH #3 may be DMRS symbols. If the number of additional DMRS symbols is 3, a first symbol, a fourth symbol, and a seventh symbol of combined PUSCH #1, a first symbol and a fifth symbol of combined PUSCH #2, and a first symbol of combined PUSCH #3 may be DMRS symbols. A PUSCH having a length of 1 in the time domain may not be transmitted. Referring to FIG. 27(b), if repeated PUSCH transmission via frequency hopping is configured, the number of symbols constituting one hop (transmission group) may be up to seven. Accordingly, a position of a DMRS symbol may be determined regardless of whether frequency hopping is configured. That is, a DMRS symbol may be located in the same manner as in the case where frequency hopping is not configured (see FIG. 27(a)).

Hereinafter, descriptions will be provided for a method of performing new repeated PUCCH transmission in order to solve a coverage problem (a problem that the number of UL symbols available for repeated transmission is restricted) occurring when repeated PUCCH transmission is performed. A PUCCH format used for repeated PUCCH transmission described below may be PUCCH format 1, 3, or 4 including 4 or more symbols.

Figure 28:
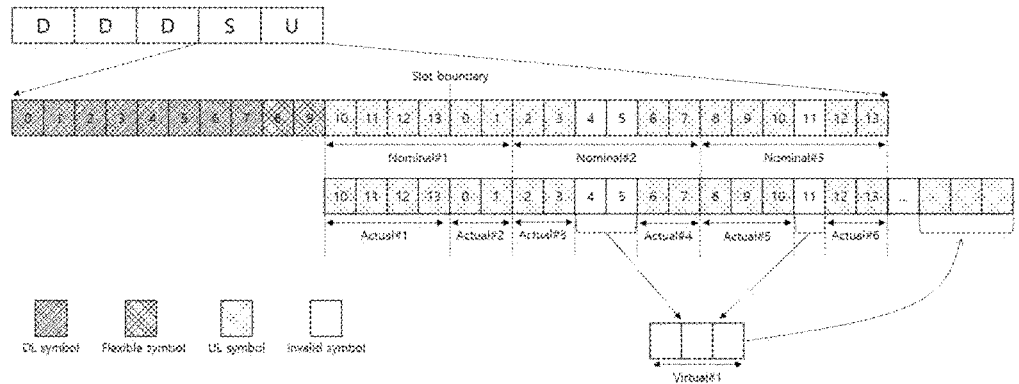
FIG. 28 to FIG. 30 illustrate a repeated PUCCH transmission method according to an embodiment of the present disclosure.
Figure 29:
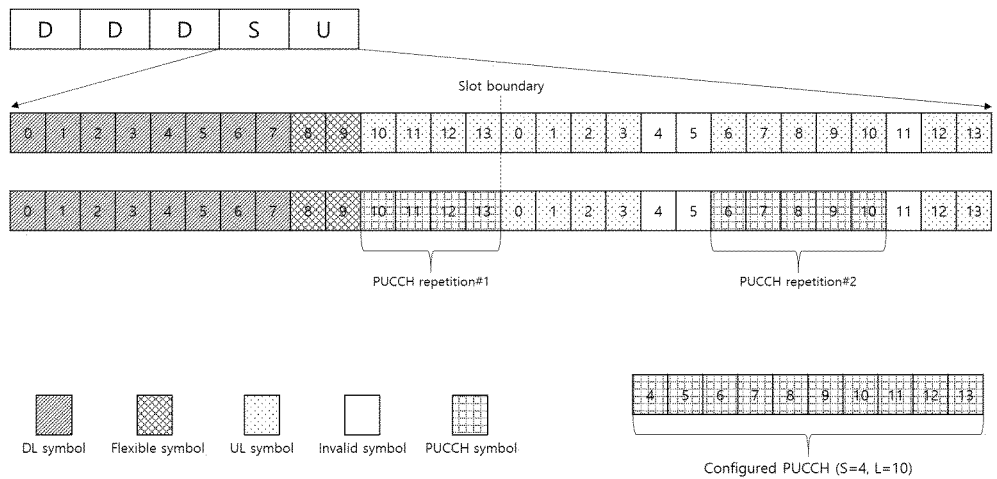
Figure 30:
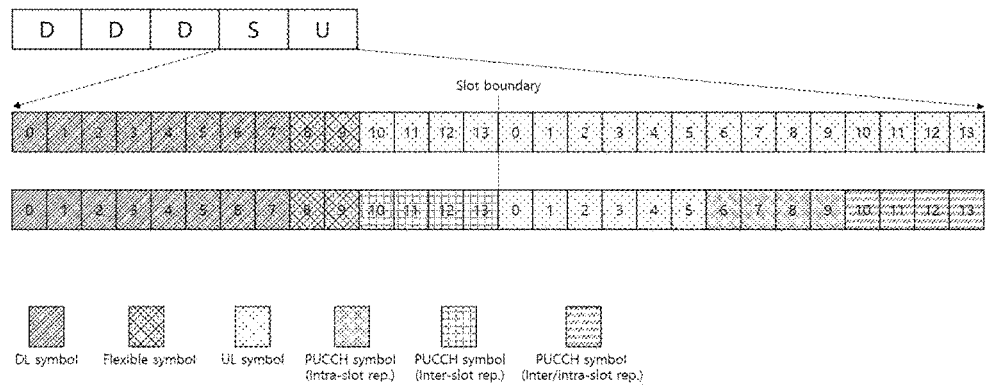

FIG. 28 to FIG. 30 illustrate a repeated PUCCH transmission method according to an embodiment of the present disclosure. In FIG. 28, actual #n refers to an actual PUCCH of index n, and virtual #n refers to a virtual PUCCH of index n.

A PUCCH may be repeatedly transmitted regardless of a slot boundary. That is, a PUCCH may be repeatedly transmitted on multiple slots as well as on one slot. In other words, a PUCCH may be repeatedly transmitted in symbols including a slot boundary. Based on the number of repeated PUCCH transmissions and the number of symbols for a PUCCH, which are configured from the base station, the terminal may determine a time domain (window) in which a nominal PUCCH is transmitted. A determined nominal PUCCH may be divided into actual PUCCHs, based on a slot boundary, a DL symbol, and an invalid symbol. Unlike repeated PUSCH transmission type B, in order to guarantee repeated PUCCH transmission as much as possible, invalid symbols in a nominal PUCCH may include a virtual symbol, and the included virtual symbol may be transmitted in a UL symbol immediately subsequent to a symbol enabling PUCCH transmission. Referring to FIG. 28, nominal PUCCHs may be divided into actual PUCCH #1 to actual PUCCH #6, based on slot boundaries, DL symbols, and invalid symbols. In this case, invalid symbols (symbols 4, 5, and 11 in a second slot) in the nominal PUCCHs include virtual PUCCH #1, and virtual PUCCH #1 may be transmitted on an earliest symbol of subsequent transmittable UL symbols. An actual PUCCH may include fewer than 4 symbols. Therefore, the terminal needs to generate a combined PUCCH having a length of at least 4 symbols by combining each of actual PUCCHs. This is because a PUCCH format used for repeated PUCCH transmission should include 4 to 14 symbols. For example, if a first actual PUCCH has a length fewer than 4 symbols and there is a second actual PUCCH adjacent to the first actual PUCCH in the time domain, the first actual PUCCH and the second actual PUCCH may be combined. In this case, being adjacent refers to being consecutive, and refers to a case where no symbol exists between the first actual PUCCH and the second actual PUCCH. Referring to FIG. 28, actual PUCCH #2 and actual PUCCH #3 are adjacent. Since two invalid symbols (symbols 4 and 5 in the second slot) exist between actual PUCCH #3 and actual PUCCH #4, actual PUCCH #3 and actual PUCCH #4 are not adjacent. There may be two adjacent actual PUCCHs. Referring to FIG. 28, actual PUCCH #2 is adjacent to actual PUCCH #1 and actual PUCCH #3. Therefore, the terminal may select one PUCCH to be combined from among two adjacent actual PUCCHs.

i) An actual PUCCH having a shorter length among two adjacent actual PUCCHs may be selected. Referring to FIG. 28, actual PUCCH #2 may be combined with actual PUCCH #3 having a shorter length among actual PUCCH #1 and actual PUCCH #3. An actual PUCCH including 3 or fewer symbols may be dropped, but may be transmitted via being combined, without being dropped. In addition, due to a short actual PUCCH being combined, a PUCCH DMRS overhead can be reduced and a data transmission rate can be thus increased. ii) A longer actual PUCCH may be selected from among two adjacent actual PUCCHs. Referring to FIG. 28, actual PUCCH #2 may be combined with actual PUCCH #1 having a longer length among actual PUCCH #1 and actual PUCCH #3. Since a longer actual PUCCH is selected and combined, a PUCCH can be transmitted in a longer time resource, resulting in extending coverage. iii) An actual PUCCH earlier in time among two adjacent actual PUCCHs may be selected. Referring to FIG. 28, actual PUCCH #2 may be combined with actual PUCCH #1 earlier in time among actual PUCCH #1 and actual PUCCH #3. Since PUCCH transmission is possible for a longer time from a preceding time resource, coverage can be extended and a delay for UCI transmission including HARQ-ACK can be reduced. iv) An actual PUCCH subsequent in time among two adjacent actual PUCCHs may be selected. Referring to FIG. 28, actual PUCCH #2 may be combined with actual PUCCH #3 subsequent in time among actual PUCCH #1 and actual PUCCH #3. In a case of PUCCH transmission including UCI that is not sensitive to delay, combining with an actual PUCCH that is subsequent in time enables PUCCH transmission in a longer time resource, so that coverage can be extended.

A length of a combined PUCCH configured by combining the first actual PUCCH and the second actual PUCCH may be 14 or fewer symbols. The first actual PUCCH and the second actual PUCCH are not combined in a way resulting in the number of symbols exceeding 14 symbols. In other words, if the actual PUCCH selected via i) to iv) is the second actual PUCCH, and a combined PUCCH configured by combining the first actual PUCCH and the second actual PUCCH exceeds 14 symbols, the third actual PUCCH, which is the other adjacent actual PUCCH to be combined with the first actual PUCCH, may be selected. In this case, if the length of the first actual PUCCH is 3 symbols or fewer, and there is no adjacent third actual PUCCH, the terminal may drop the first actual PUCCH without transmitting the same. When the terminal repeatedly transmits a PUCCH including a slot boundary, the length of the repeatedly transmitted PUCCH may not exceed a preconfigured number of symbols. The preconfigured number of symbols may be a value configured for the terminal by the base station. The configured number of symbols may be a value that the base station may configure for the terminal or a maximum number of symbols constituting a slot. As another embodiment, when a PUCCH is transmitted on a resource including a slot boundary, the length of the PUCCH may not be restricted. That is, the terminal may transmit the PUCCH to the base station on a resource including a slot boundary with no restriction on the number of symbols. However, if the number of symbols is from 4 to 14 both inclusive, the PUCCH may be transmitted using the described long PUCCH format. In addition, when the PUCCH is configured with a resource including a slot boundary, the number of symbols available for PUCCH transmission may exceed 14. In this case, since the existing PUCCH format includes only 14 or fewer symbols, a new PUCCH format using more than 14 consecutive symbols is required (hereinafter, described as an extended PUCCH format). That is, the terminal may transmit, to the base station, a PUCCH configured in a form of an extended PUCCH format. Since a DMRS symbol and a subsequent symbol in which UCI is transmitted are consecutive in existing PUCCH format 1, an extended PUCCH format may be configured by partially modifying existing PUCCH format 1. For example, a PUCCH including 15 symbols may have a structure in which, in addition to 1 symbol to which a DMRS is mapped in the existing PUCCH format 1, a DMRS is additionally mapped to a symbol consecutive to the 1 symbol. A PUCCH including 16 symbols may have a structure in which 1 symbol of a DMRS and 1 symbol for UCI transmission are added to the existing PUCCH format 1. In the extended PUCCH format partially modified from existing PUCCH format 3 or PUCCH format 4, a position of a symbol to which a DMRS is mapped may be determined according to an increased number of symbols. For example, if 1 to 3 symbols are increased, the increased symbols may be configured by being mapped in the order of a UCI symbol, a DMRS symbol, and a UCI symbol. That is, if one symbol is increased, the increased symbol may be a UCI symbol, if two symbols are increased, the increased symbols may be a UCI symbol and a DMRS symbol, and if three symbols are increased, the increased symbol may be a UCI symbol, a DMRS symbol, and a UCI symbol. If four or more symbols are increased, the same configuration as that for existing PUCCH format 3 or PUCCH format 4 including 4 to 14 symbols may be applied to the increased symbols.

The base station may configure a resource area for transmission of a repeatedly transmitted PUCCH, wherein multiple starting symbols and multiple lengths may be configured in the resource area. For example, two starting symbols (S1 and S2) and two lengths (L1 and L2) may be configured in one resource area in which a PUCCH is transmitted. The terminal may determine, from S1 and L1, symbols in which a first repetition PUCCH is transmitted. The terminal may determine, from S2 and L2, symbols in which a second repetition PUCCH is transmitted. In this case, UCI may be included in the first repetition PUCCH and the second repetition PUCCH. In addition, the base station may also additionally configure information on a slot index. In this case, a slot indicated by the slot index may be a slot in which multiple starting symbols and multiple lengths are configured. In this case, the first repetition PUCCH may be transmitted on a first slot, and the second repetition PUCCH may be transmitted on a second slot. If information on the slot index is not configured, the first repetition PUCCH may be transmitted on the first slot determined based on a K1 value, and the second repetition PUCCH may be transmitted on the second slot subsequent to the first slot. In this case, the second slot may be a slot immediately after the first slot. In addition, the second slot may be an earliest slot, in which PUCCH transmission is possible, after the first slot. That is, if the slot immediately after the first slot does not include a UL resource available for PUCCH transmission, the second PUCCH may be transmitted in a slot including a UL resource. As described above, the K1 value may be a value indicated by DCI.

The base station may configure multiple PUCCH resources for the terminal, and one starting symbol and one length may be configured in each PUCCH resource. The terminal may determine symbols corresponding to the one starting symbol and one length from among the symbols of each slot in which a PUCCH is repeatedly transmitted, and may determine whether the determined symbols are available for PUCCH transmission. Repeated PUCCH transmission may be performed in a period having a longest consecutive symbol period from among the symbols available for PUCCH transmission. Referring to FIG. 29, a base station may configure, for a terminal, a starting symbol (S) of 4 and a length (L) of 10, and may configure the terminal to repeatedly transmit a PUCCH during two slots. In other words, the base station configures PUCCH transmission to be performed using symbols 4 to 13. However, there may be a case in which a PUCCH cannot be transmitted during a symbol period based on the starting symbol and length in the slot, which are configured by the base station. Symbol 0 to symbol 9 of a first slot are unavailable for PUCCH transmission. In this case, a first repetition PUCCH may be transmitted on symbols 10 to 13 which are longest consecutive symbols among the consecutive symbols available for PUCCH transmission within the configured symbol period. If a flexible symbol is also available for PUCCH transmission, the first repetition PUCCH may be transmitted on symbols 8 to 13. In the same way, a second repetition PUCCH may be transmitted in symbols 6 to 10 of a second slot. If there is no symbol available for PUCCH transmission in a specific slot or if an available symbol period is less than 4 symbols, the specific slot is not used for repeated PUCCH transmission. That is, the number of repeated PUCCH transmissions is not deducted.

Repeated PUCCH transmission may be performed simultaneously on an inter-slot and an intra-slot. If the base station configures, for the terminal, repeated PUCCH transmission on an inter-slot and repeated PUCCH transmission on an intra-slot, a resource of a PUCCH a repeatedly transmitted in an intra-slot and a resource of a PUCCH a repeatedly transmitted in an inter-slot may be configured. Alternatively, an additional PUCCH resource may be configured in addition to a PUCCH resource configured for an intra-slot. That is, a PUCCH transmitted in an intra-slot is a first repeatedly transmitted PUCCH, and an intra-slot resource for a second repeatedly transmitted PUCCH may be additionally configured. In this case, a start position of the second repeatedly transmitted intra-slot resource may be determined by "a starting symbol position of inter-slot PUCCH—the number of symbols of inter-slot PUCCH", and the number of symbols may be configured to be equal to that of inter-slot PUCCH. Referring to FIG. 30, a PUCCH with a starting symbol of symbol 10 and a length of 4 symbols may be configured for inter-slot repeated transmission. In this case, since intra-slot repeated transmission of an inter-slot repeated transmission PUCCH is possible from symbol 6 in a second slot, inter-slot repeated PUCCH transmission and intra-slot repeated PUCCH transmission may be performed simultaneously on the second slot.

Hereinafter, descriptions will be provided for a frequency hopping method for acquiring diversity gain when repeated PUCCH transmission is performed to solve a coverage problem.

The terminal may determine, based on a specific boundary, a frequency hopping boundary for performing of repeated PUCCH transmission. Information for determination of a specific boundary is as follows. i) A specific boundary may be determined based on a boundary of repeated PUCCH transmission. The terminal may transmit each repeatedly transmitted PUCCH via frequency hopping. Referring to FIG. 28, a hopping boundary may be a boundary of a nominal PUCCH, a boundary of an actual PUCCH, or a boundary of a combined PUCCH boundary. A PUCCH may be repeatedly transmitted by hopping for each of one nominal PUCCH, one actual PUCCH, or one combined PUCCH. Referring to FIG. 29, the terminal may transmit PUCCH repetition #1 of the first slot and PUCCH repetition #2 of the second slot via frequency hopping in different frequency domains. Referring to FIG. 30, repeated PUCCH transmission boundaries between inter-slots and between intra-slots may be frequency hopping boundaries. The terminal may transmit a PUCCH of a first slot and a PUCCH of a second slot in different frequency domains. In this case, an intra-slot repeated transmission PUCCH added in the second slot may be configured with the same hop as that for an inter-slot repeated transmission PUCCH in the second slot, so as to be transmitted in the same frequency domain. Alternatively, the intra-slot repeated transmission PUCCH in the second slot may be configured with the same hop as that for the inter-slot repeated transmission PUCCH in the first slot, so as to be transmitted in the same frequency domain. That is, each of multiple repeatedly transmitted PUCCHs transmitted in one slot may be transmitted in different frequency domains. In other words, the intra-slot PUCCH and the inter-slot PUCCH of the second slot may be transmitted in different frequency domains. ii) A slot boundary may be determined based on a semi-statically configured DL symbol, and an invalid symbol. Symbols available for consecutive/inconsecutive repeated PUCCH transmissions up to a slot boundary, a semi-static DL symbol, or an invalid symbol may be configured with the same hop. In other words, symbols available for consecutive/inconsecutive repeated PUCCH transmissions before a slot boundary, a semi-static DL symbol, or an invalid symbol and symbols available for consecutive/inconsecutive repeated PUCCH transmissions after the slot boundary, the semi-static DL symbol, or the invalid symbol may be configured with different hops. Referring to FIG. 28, actual PUCCH #1, actual PUCCH #2, and actual PUCCH #3 configured with resources before symbol 4 of the second slot, which is an invalid symbol, may be configured with a first hop. Actual PUCCH #4 and actual PUCCH #5 configured with consecutive symbols available for repeated PUCCH transmission after symbol 4 of the second slot may be configured with a second hop. In the same way, actual PUCCH #6 may be configured with the first hop. Referring to FIG. 29, since a slot boundary and an invalid symbol exist between PUCCH repetition #1 and PUCCH repetition #2, PUCCH repetition #1 and PUCCH repetition #2 are configured with different hops. Referring to FIG. 30, the inter-slot repeated transmission PUCCH of the first slot may be configured with a first hop, and the intra-slot repeated transmission PUCCH and inter-slot repeated transmission PUCCH of the second slot may be configured with a second hop. Different hops may be transmitted in different frequency domains.

A hopping boundary may be determined based on a preconfigured number of symbols. That is, each of multiple hops may include the same number of symbols. The preconfigured number of symbols may be acquired based on PUCCH configuration information configured by the base station. i) Hops may be configured based on a value obtained by equally dividing the total number of symbols of repeatedly transmitted actual PUCCHs. Specifically, the number of symbols constituting the first hop may be floor($N^{repeat}_{PUCCH}/2$) or ceil($N^{repeat}_{PUCCH}/2$), and the number of symbols constituting the second hop may be $N^{repeat}_{PUCCH}/2$-floor($N^{repeat}_{PUCCH}/2$) or $N^{repeat}_{PUCCH}/2$-ceil($N^{repeat}_{PUCCH}/2$). $N^{repeat}_{PUCCH}$ refers to the total number of symbols of actual PUCCHs. Referring to FIG. 28, since the total number of symbols of actual PUCCHs is 15, the first hop may include 7 symbols (symbol 10 in the first slot to symbol 2 in the second slot), and the second hop may include 8 symbols (symbols 3, 6 to 10, and 12 and 13 in the second slot). Referring to FIG. 29, since the total number of symbols constituting a PUCCH is 9, the first hop may include 4 symbols (symbol 10 to symbol 13 in the first slot) and the second hop may include 5 symbols (symbol 6 to symbol 10 in the second slot). Referring to FIG. 30, since the total number of symbols constituting a PUCCH is 12, the first hop may include 6 symbols (symbol 10 to symbol 13 in the first slot and symbols 6 and 7 in the second slot), and the second hop may include 6 symbols (symbol 8 to symbol 13 in the second slot). Alternatively, if a length of consecutive symbols included in one hop is two or fewer, the consecutive symbols of two or fewer may be included in another hop. In this case, another hop including the two or fewer symbols may include symbols adjacent to the two or fewer consecutive symbols, and may be a hop transmittable in the same frequency domain. Referring to FIG. 30, symbols 6 and 7 in the second slot of the first hop may be included in the second hop and transmitted. ii) One hop may be configured based on the number of fewest consecutive symbols among all symbols of repeatedly transmitted PUCCHs. Referring to FIG. 28, the number of fewest consecutive symbols is 2 (actual PUCCH #2, #3, #6). Therefore, one hop may include two symbols. Referring to FIG. 29, the number of fewest consecutive symbols is 4 (PUCCH repetition #1). Therefore, the first hop may include 4 symbols (symbols 10 to 13 in the first slot), and the second hop may include 4 symbols (symbol 6 to symbol 9 in the second slot). If the first hop and the second hop are configured in this way, symbol 10 of the second slot remains, and the terminal may not transmit a PUCCH including one symbol. That is, the terminal may drop symbol 10 of the second slot. Referring to FIG. 30, the number of fewest consecutive symbols is 4. Therefore, the first hop may include 4 symbols (symbols 10 to 13 in the first slot), the second hop may include 4 symbols (symbols 6 to 9 in the second slot), and the third hop may include 4 symbols (symbols 10 to 13 in the second slot). iii) One hop may be configured with a preconfigured number of symbols. In this case, the preconfigured number of symbols may be a value configured for the terminal by the base station. Alternatively, the preconfigured number of symbols may be the number of symbols constituting one PUCCH, that is, the number of symbols of a repeatedly transmitted PUCCH. Referring to FIG. 28, the preconfigured number of symbols may be 6. Therefore, the first hop may include 6 symbols (symbol 10 in the first slot to symbol 1 in the second slot), the second hop may include 6 symbols (symbols 2, 3, and 6 to 9 in the second slot), and the third hop may include 3 symbols (symbols 10, 12, and 13 in the second slot). In this case, the first hop and the third hop may be transmitted on the same frequency domain resource or may be transmitted on different frequency domain resources. Referring to FIG. 29, the preconfigured number of symbols may be the number of symbols of a first configured PUCCH (10 in FIG. 29). Accordingly, all symbols of PUCCH repetition #1 and PUCCH repetition #2 may be configured in one hop. Referring to FIG. 30, the preconfigured number of symbols may be the number of symbols of one PUCCH (4 in FIG. 30). Therefore, the first hop may include 4 symbols (symbols 10 to 13 in the first slot), the second hop may include 4 symbols (symbols 6 to 9 in the second slot), and the third hop may include 4 symbols (symbols 10 to 13 in the second slot). In this case, the first hop and the third hop may be transmitted on the same frequency domain resource or may be transmitted on different frequency domain resources. iv) One hop may be configured based on the number of longest consecutive symbols among all symbols of repeatedly transmitted PUCCHs. For example, a value calculated by equally dividing the number of longest consecutive symbols may be the number of symbols constituting one hop. Specifically, the number of symbols constituting the first hop may be floor($N^{repeat}_{PUCCH}/2$) or ceil($N^{repeat}_{PUCCH}/2$), and the number of symbols constituting the second hop may be $N^{repeat}_{PUCCH}$-floor($N^{repeat}_{PUCCH}/2$) or $N^{repeat}_{PUCCH}$-ceil($N^{repeat}_{PUCCH}/2$). $N^{repeat}_{PUCCH}$ may be the number of longest consecutive symbols. A value corresponding to min(floor($N^{repeat}_{PUCCH}/2$), $N^{repeat}_{PUCCH}$-floor($N^{repeat}_{PUCCH}/2$)) or max(floor($N^{repeat}_{PUCCH}/2$), $N^{repeat}_{PUCCH}$-floor($N^{repeat}_{PUCCH}/2$)) may be the number of symbols constituting one hop. A value corresponding to min(ceiling($N^{repeat}_{PUCCH}/2$), $N^{repeat}_{PUCCH}$-ceiling($N^{repeat}_{PUCCH}/2$)) or max(ceiling($N^{repeat}_{PUCCH}/2$), $N^{repeat}_{PUCCH}$-ceiling($N^{repeat}_{PUCCH}/2$)) may be the number of symbols constituting one hop. max(a, b) is a function that returns a larger of a and b, and min(a, b) is a function that returns a smaller of a and b. Referring to FIG. 28, the number of longest consecutive symbols is 8 which is the sum of the number of symbols of actual PUCCH #1 and the number of symbols of actual PUCCH #2. Therefore, 4 which is a value obtained by equally dividing 8 may be the number of symbols constituting one hop. Referring to FIG. 29, the number of longest consecutive symbols is 5 which is the number of symbols of PUCCH repetition #2. Therefore, 2 or 3 may be the number of symbols constituting one hop.

If the number of consecutive symbols is fewer than the number of symbols constituting one hop, corresponding symbols are not hopped.

Hereinafter, methods for solving a coverage problem without combining multiple PUSCHs will be described.

Figure 31:
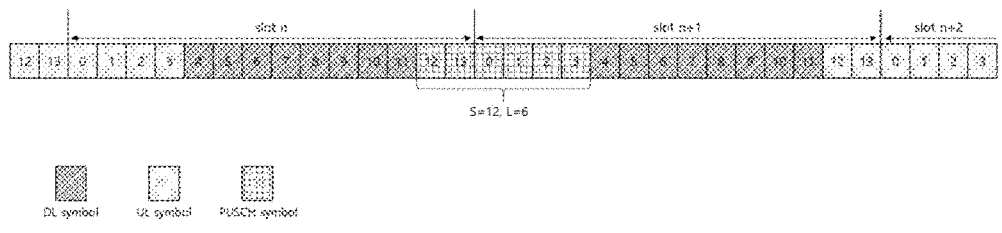
FIG. 31 and FIG. 32 illustrate a method of frequency hopping of a repeatedly transmitted PUSCH according to an embodiment of the present disclosure.
Figure 32:
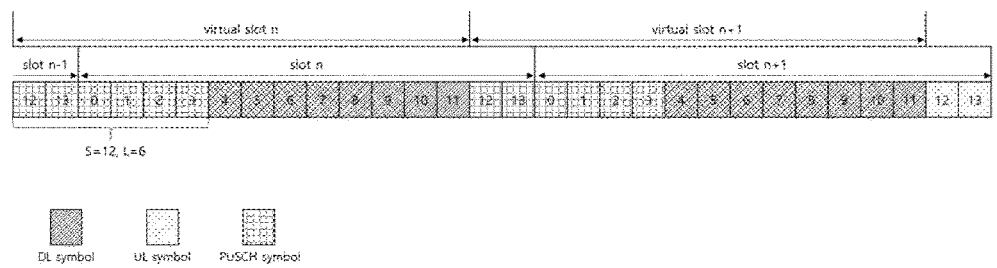

FIG. 31 and FIG. 32 illustrate a method of repeated PUSCH transmission according to an embodiment of the present disclosure.

A PUSCH may be transmitted on resources including a slot boundary. Resources including a slot boundary may be configured not to have lengths exceeding a predetermined length. That is, a PUSCH transmitted on resources including a slot boundary may be transmitted on resources with the number of symbols equal to or fewer than the preconfigured number of symbols. The preconfigured length may be a value configured for a terminal by a base station. Alternatively, the preconfigured length may be a maximum number of symbols constituting a slot. The length of resources including a slot boundary may not be restricted. That is, the terminal may transmit a PUSCH with no restriction on the number of symbols. In this case, the base station may configure a position of a DMRS included in the PUSCH. For example, if the length of resources including a slot boundary is 14 symbols or fewer, DMRS mapping may be performed in the same way as in the existing PUSCH structure. If the length of resources including a slot boundary exceeds 14 symbols, the existing PUSCH structure including 1 to 14 symbols may be equally applied to a symbol exceeding 14 symbols. That is, if the length of resources including a slot boundary is 15 or 28 symbols, and PUSCH mapping type B is applied, a front-loaded DMRS may be mapped to a first symbol (i.e., a 15th symbol) among symbols exceeding 14 symbols. In addition, if an additional DMRS is further configured, the additional DMRS may be mapped by equally applying a DMRS position, which is applied to the existing PUSCH structure including 2 to 14 symbols, to symbols exceeding 14 symbols.

The base station may configure the terminal to repeatedly transmit a PUSCH on resources including a slot boundary. In this case, the terminal may repeatedly transmit a PUSCH, based on a specific boundary. i) A specific boundary may be a slot boundary. That is, the terminal may repeatedly transmit a PUSCH by determining a slot boundary as a basis for repeated transmission. Referring to FIG. 31, a PUSCH may be repeatedly transmitted on 6 symbols including a slot boundary. If 6 symbols starting from symbol 12 of slot n include a slot boundary, a PUSCH may be repeatedly transmitted in symbol 12 of slot n to symbol 3 of slot n+1. ii) A specific boundary may be a virtual slot boundary. A virtual slot boundary is a slot boundary newly defined regardless of an existing slot boundary, and may be defined when a PUSCH is transmitted on resources including the existing slot boundary. Referring to FIG. 32, the base station may configure the terminal to repeatedly transmit a PUSCH having a length of 6 symbols from symbol 12 of slot n−1 during 2 slots. In this case, a first symbol (symbol 12 in slot n−1) of the repeatedly transmitted PUSCH may be a start point of a virtual slot boundary. In addition, the PUSCH may be transmitted as many times as a configured number of repeated transmissions. That is, a symbol in which PUSCH transmission starts may be the first symbol of the virtual slot. The maximum number of symbols constituting a virtual slot may be greater than or equal to 14 for a normal CP and 12 for an extended CP.

In order to improve coverage of a PUCCH and a PUSCH, DMRSs included in different PUCCHs that are repeatedly transmitted and different PUSCHs that are repeatedly transmitted may be jointed and used for channel estimation.

Conventionally, a DMRS included in a repeatedly transmitted 1st PUCCH is used for channel estimation for decoding the 1st PUCCH, and a DMRS included in a repeatedly transmitted second PUCCH is used for channel estimation for decoding the second PUCCH. That is, DMRSs included in different PUCCHs are used only to decode the PUCCHs including the respective DMRSs. Hereinafter, descriptions will be provided for a method in which the base station performs channel estimation (hereinafter, it may be described as joint channel estimation) by jointing DMRSs included in different PUCCHs/PUSCHs. The method described below is described based on a PUCCH for convenience of description, but it is obvious that the method is also applicable to a PUSCH.

Joint Channel Estimation Conditions

Same starting PRB index: Start positions of PRBs to which DMRSs included in different repeatedly transmitted PUCCHs are mapped should be the same in the frequency domain.

Same number of PRBs: The number of PRBs to which DMRSs included in different repeatedly transmitted PUCCHs are mapped should be the same in the frequency domain.

Phase continuity: DMRSs included in different repeatedly transmitted PUCCHs need to maintain the same phase.

Same beamforming: DRMSs included in different repeatedly transmitted PUCCHs should be configured with the same beamforming.

Same transmit power: DMRSs included in different repeatedly transmitted PUCCHs should be transmitted with the same transmit power.

Same quasi-co-location (QCL): DMRSs included in different repeatedly transmitted PUCCHs need to have the same quasi-co-location (QCL).

A first DMRS included in a repeatedly transmitted first PUCCH and a second DMRS included in a second PUCCH may be mapped to and transmitted on different symbols. That is, the first DMRS may be mapped to one of symbols scheduled for transmission of the first PUCCH, and the second DMRS may be mapped to one of symbols scheduled for transmission of the second PUCCH. In order for the base station to perform channel estimation by combining the first DMRS and the second DMRS, the above conditions should be satisfied. The base station may perform channel estimation by jointing the first DMRS and the second DMRS, and may receive the first PUCCH and the second PUCCH repeatedly transmitted based on a channel estimation result.

Joint Channel Estimation Methods

Hereinafter, a detailed method for joint channel estimation will be described.

Figure 33:
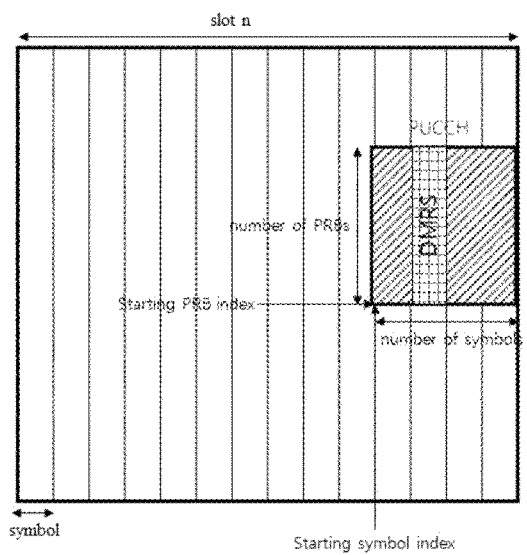
FIG. 33 illustrates a method of configuring a resource in which a PUCCH is repeatedly transmitted, according to an embodiment of the present disclosure.

FIG. 33 illustrates a method of configuring a resource in which a PUCCH is repeatedly transmitted, according to an embodiment of the present disclosure.

Referring to FIG. 33, a base station may transmit the following information in order to configure a resource in which a PUCCH is transmitted.

Starting symbol index: An index of a symbol in which PUCCH transmission starts in the time domain.

Number of symbols: The number of symbols used for PUCCH transmission in the time domain. PUCCH format 0 or 2 is a format for PUCCH transmission in 1 symbol or 2 symbols. PUCCH format 1, 3, or 4 is a format for PUCCH transmission in 4 to 14 symbols. PUCCH format 0 or 2 may be described as a short PUCCH, and PUCCH format 1, 3, or 4 may be described as a long PUCCH.

Starting PRB index: An index of a PRB in which PUCCH transmission starts in the frequency domain.

Number of PRBs: The number of PRBs used for PUCCH transmission in the frequency domain. PUCCH format 0, 1, or 4 is a format for PUCCH transmission in 1 PRB. PUCCH format 2 is a format for PUCCH transmission in 1 PRB to 16 PRBs. PUCCH format 3 is a format for PUCCH transmission in 1 PRB and 2, 3, 4, 5, 6, 8, 9, 10, 12, 15, and 16 PRBs.

Max code rate: A maximum code rate available for PUCCH. The terminal is unable to transmit a PUCCH including UCI exceeding the maximum code rate.

The terminal needs to determine the number of PRBs to be used in a PUCCH format for PUCCH transmission. First, the terminal may determine the number of bits (O bits) of UCI included in the PUCCH. UCI may include a cyclic redundancy code (CRC). In addition, the terminal may determine the number (N) of REs to which UCI is mapped per PRB. The UE may determine the number of REs except for a RE to which a DMRS is mapped. When a PUCCH is transmitted on M PRBs, a code rate may be calculated using $O/(M*N*Q)$. Where Q may refer to a modulation order used for PUCCH transmission. In this case, the calculated code rate should be equal to or lower than the maximum code rate. That is, $O/(M*N*Q) \leq$ a maximum code rate should be satisfied. In PUCCH format 2 or 3 enabling use of multiple PRBs, the number of PRBs may be adjusted so that the code rate is equal to or lower than the maximum code rate. That is, among the number (M) of possible PRBs, a smallest number of PRBs satisfying $O/(M*N*Q) \leq a$ maximum code rate may be selected. In this case, a minimum value of selectable PRBs may be preconfigured, and the number of PRBs that are not fewer than the minimum value may be selected. The number (N) of REs may be determined based on the number of symbols used for PUCCH transmission. As the number of symbols used for PUCCH transmission increases, the number of REs may increase. Specifically, N may be given as a product of $N_{sc,ctrl}$ and $N_{symb-UCI}$. $N_{sc,ctrl}$ is the number of REs for transmitting UCI in one symbol corresponding to 1 PRB. $N_{symb-UCI}$ is the number of symbols for transmitting UCI. For PUCCH format 2, $N_{sc,ctrl}$ may be 8, and for PUCCH format 3, $N_{sc,ctrl}$ may be 12. For PUCCH format 2, $N_{symb-UCI}$ may be the number of symbols used for PUCCH transmission, and for PUCCH format 3, $N_{symb-UCI}$ may be the number of symbols used for PUCCH transmission, except for a symbol to which a DMRS is mapped.

Figure 34:
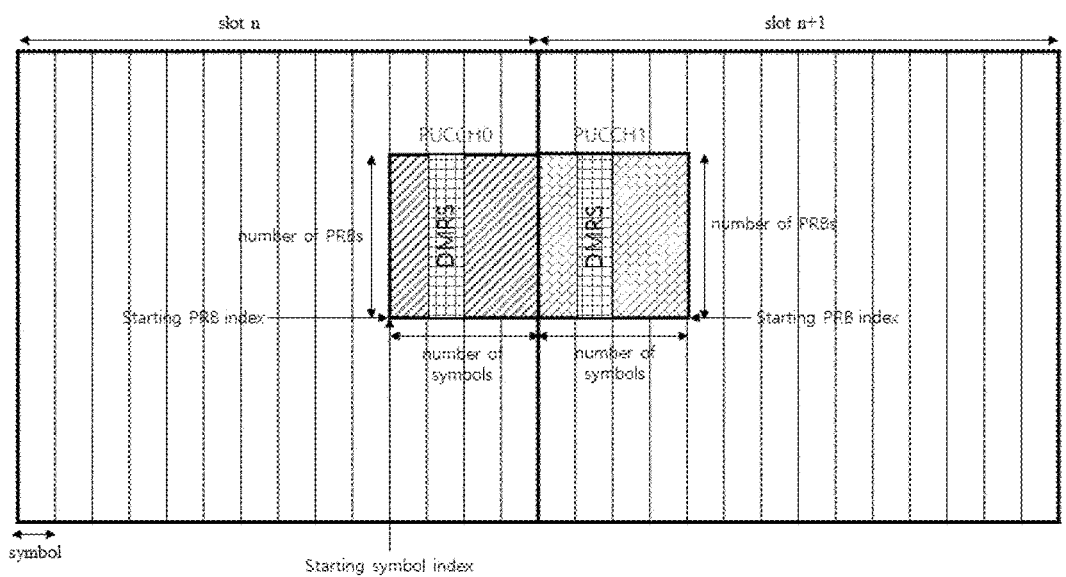
FIG. 34 illustrates that respective repeatedly transmitted PUCCHs are transmitted in the same symbol, according to an embodiment of the present disclosure.
Figure 35:
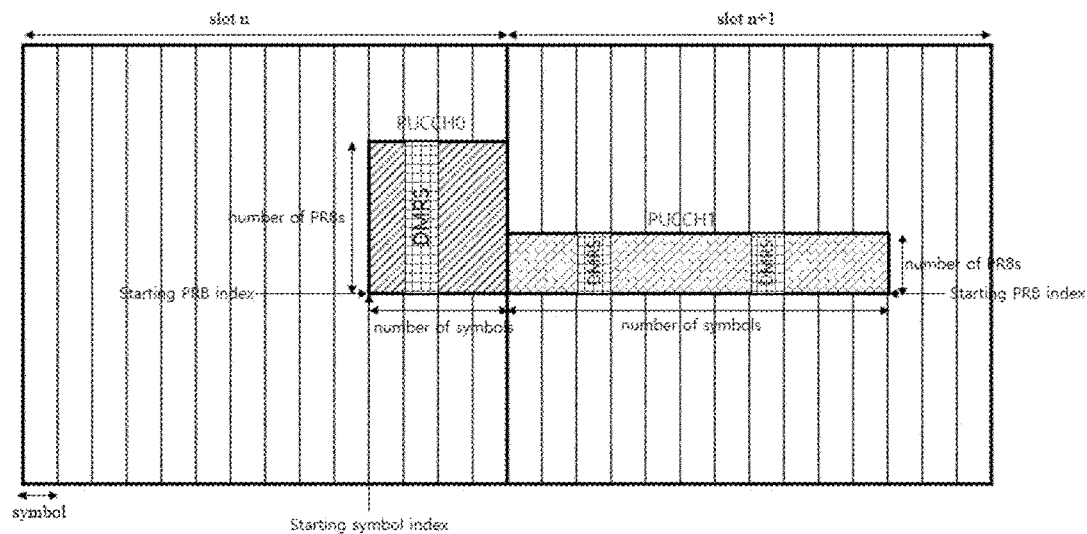
FIG. 35 to FIG. 37 illustrate that respective repeatedly transmitted PUCCHs are transmitted in different symbols according to an embodiment of the present disclosure.
Figure 36:
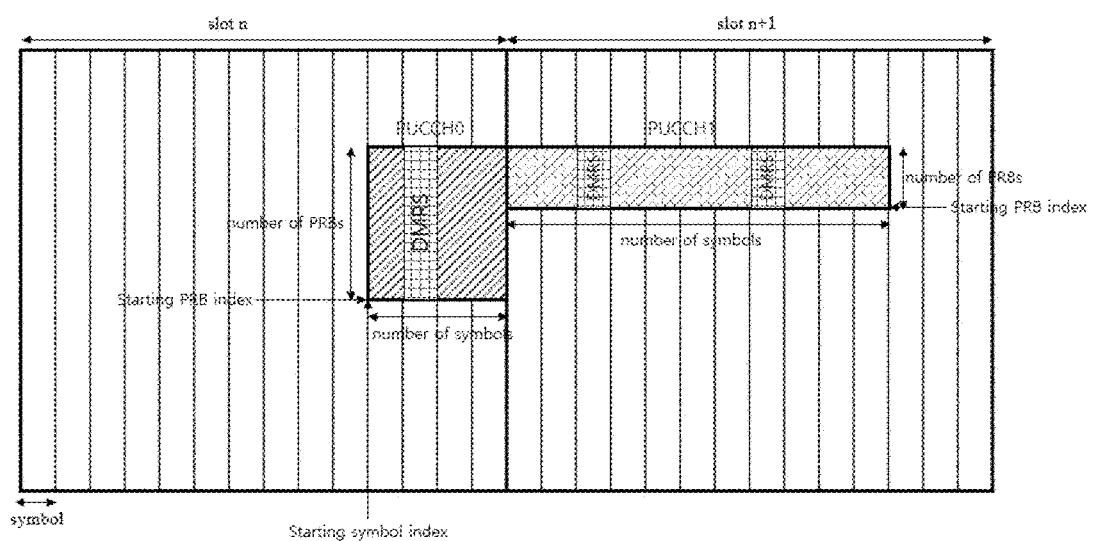
Figures 37, 38:
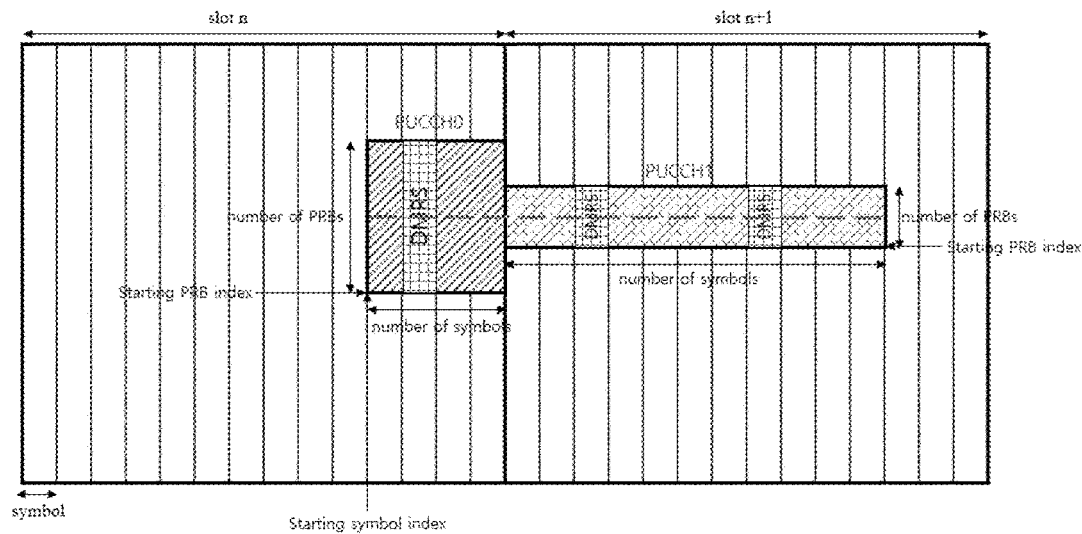
FIG. 38 illustrates a case in which the same number of PRBs are configured for respective repeatedly transmitted PUCCHs according to an embodiment of the present disclosure.

FIG. 34 illustrates that respective repeatedly transmitted PUCCHs are transmitted in the same symbol length (number of symbols), according to an embodiment of the present disclosure. FIG. 35 to FIG. 37 illustrate that respective repeatedly transmitted PUCCHs are transmitted in different symbol lengths according to an embodiment of the present disclosure.

Referring to FIG. 34, each of PUCCH0 and PUCCH1 may include the same UCI. In this case, a length (number of symbols) of a resource in which PUCCH 0 is transmitted may be the same as a length of a resource in which PUCCH1 is transmitted. PUCCH0 and PUCCH1 may occupy the same PRB. The number of PRBs may be determined by the method described above. Each of PUCCH0 and PUCCH1 may include a symbol for transmitting a DMRS. A base station may perform channel estimation by jointing a DMRS of PUCCH0 (mapped to a 12th symbol of slot n) and a DMRS of PUCCH1 (mapped to a second symbol of slot n+1). In addition, the base station may receive UCI transmitted on PUCCH0 and PUCCH1 via joint channel estimation. Referring to FIG. 35, each of PUCCH0 and PUCCH1 may include the same UCI. In this case, a length of a resource in which PUCCH0 is transmitted may be different from a length of a resource in which PUCCH1 is transmitted. PUCCH0 may be transmitted on 4 symbols, and PUCCH1 may be transmitted on 11 symbols. Since the lengths of resources in which PUCCH 0 and PUCCH 1 are transmitted are different, the number of PRBs occupied by PUCCH0 and PUCCH1 may be different from each other. For example, PUCCH0 transmitted on 4 symbols may occupy more PRBs compared to PUCCH1 transmitted on 11 symbols. The number of PRBs may be determined by the method described above. In overlapping PRBs among PRBs occupied by PUCCH0 and PUCCH1, channel estimation may be possible by jointing DMRSs. However, since the DMRS for PUCCH1 is not transmitted in non-overlapping PRBs, joint channel estimation may be impossible. Therefore, the base station may estimate different channels according to PRBs, and an error may occur in a channel estimation value. A method for overcoming this error will be described below. The method to be described later may not be applied when repeated PUCCH transmission is performed via frequency hopping.

The number of PRBs of respective repeatedly transmitted PUCCHs may be calculated independently of each other. That is, the number of PRBs may be determined based on the number of symbols allocated to each repeatedly transmitted PUCCH.

Method of Determining the Number of PRBs

Method 1 i) A starting PRB index of each repeatedly transmitted PUCCH may be the same as a starting PRB index of a first repeatedly transmitted PUCCH. Referring to FIG. 35, PUCCH0 and PUCCH1 include different numbers of PRBs, but a starting PRB index of PUCCH1 is the same as a starting PRB index of PUCCH0. If a starting PRB index of a repeatedly transmitted PUCCH is determined to be a starting PRB index of a first transmitted PUCCH, there is a problem that joint channel estimation is possible for PRBs corresponding to a low frequency domain, but joint channel estimation is not possible for PRBs corresponding to a high frequency domain. ii) A last PRB index of each repeatedly transmitted PUCCH may be the same as a last PRB index of a first repeatedly transmitted PUCCH. A last PRB index is an index of a PRB corresponding to a highest frequency domain occupied by a PUCCH in the frequency domain, and may be calculated as the sum of a starting PRB index and the number of PRBs. Referring to FIG. 36, PUCCH0 and PUCCH1 may include different numbers of PRBs. In this case, a last PRB index of PUCCH1 is a last PRB index of PUCCH0. If a last PRB index of a repeatedly transmitted PUCCH is determined to be a last PRB index of a first transmitted PUCCH, there is a problem that joint channel estimation is possible for PRBs corresponding to a high frequency domain, but joint channel estimation is not possible for PRBs corresponding to a low frequency domain. iii) In the frequency domain of resources of respective repeatedly transmitted PUCCHs, center resources may match. Referring to FIG. 37, PUCCH0 and PUCCH1 may have different starting symbol indices. In this case, the center of resources constituting PUCCH0 in the frequency domain and the center of resources constituting PUCCH1 in the frequency domain may be configured to match as much as possible. For example, the number of PRBs configured for PUCCH0 may be M0, and a starting symbol index may be S0. In addition, the number of PRBs configured for PUCCH1 may be M1, and a starting symbol index may be S1. In this case, S1 may be obtained by the sum of S0 and a value returned after applying, to a preconfigured function, a value obtained by dividing, by 2, a difference between PRBs respectively configured for PUCCH0 and PUCCH1. That is, S1 may be calculated as shown in Equation 1.

$$S1=S0+f((M0-M1)/2) \quad \text{[Equation 1]}$$

In this case, f(x) may be one of ceil(x), floor(x), and round(x). round(x) may return an integer value rounded to x. In this case, if M0 is greater than M1, S1 may be a negative number, so that S1 may be restricted to be an integer greater than or equal to 0. That is, S1 may be calculated with max{0, S0+f((M0-M1)/2)}. Since a resource starting from S1, in which PUCCH1 is transmitted, may cross an active UL BWP boundary, S1 may be restricted to be a value at which a last PRB index of PUCCH 1 is located within the active UL BWP. That is, S1 may be calculated with min{$N_{RB}$-M1, S0+f((M0-M1)/2)}. $N_{RB}$ may be the number of PRBs included in the active UL BWP. iv) The base station may configure an offset value for the terminal. S1 may be calculated by S0+offset. That is, a staring PRB index may be determined using an offset within one frequency hop.

When method 1 is used, joint channel estimation is not possible and only separate estimation is possible, for a PUCCH repeatedly transmitted in a non-overlapping PRB area.

Method 2

The number of PRBs corresponding to respective repeatedly transmitted PUCCHs may be the same.

FIG. 38 illustrates a case in which the same number of PRBs are configured for respective repeatedly transmitted PUCCHs according to an embodiment of the present disclosure.

i) The same number of PRBs as the number of PRBs configured for a first repeatedly transmitted PUCCH may be configured for the remaining repeatedly transmitted PUCCHs. That is, the number of PRBs allocated to the repeatedly transmitted PUCCH may be determined based on the number of symbols configured for the first repeatedly transmitted PUCCH. In this case, the determined number of PRBs may be independent of the number of symbols allocated to each of repetitively transmitted PUCCHs. Referring to FIG. 38, the number of PRBs allocated to PUCCH0 may be determined based on 4 symbols used for PUCCH0 transmission. The same number of PRBs as the number of PRBs allocated to PUCCH0 may be allocated to PUCCH1. In this case, since the number of PRBs is determined in consideration of a maximum code rate for PUCCH0, it may not be suitable for a maximum code rate for PUCCH1. For example, if the number of symbols allocated to the first repeatedly transmitted PUCCH, which is earliest in time, is large, the maximum code rate may be satisfied even if the number of PRBs is small. Accordingly, if the number of symbols of a PUCCH repeatedly transmitted after the first repeated transmission is small, the maximum code rate may not be satisfied. ii) As described above, the same number of PRBs as the number of PRBs configured for the first repeatedly transmitted PUCCH may be configured for the remaining repeatedly transmitted PUCCHs. In this case, a code rate may be calculated for each repeatedly transmitted PUCCH. If a calculated code rate is greater than the maximum code rate, the terminal may not transmit a corresponding PUCCH. Resources configured for PUCCHs that are not transmitted may be used for repeated transmission of other adjacent PUCCHs. iii) A PRB configured for a repeatedly transmitted PUCCH may be determined using the number of PRBs configured for a PUCCH, to which a smallest number of symbols are allocated, from among repeatedly transmitted PUCCHs. That is, the terminal may identify the number of symbols allocated to each repeatedly transmitted PUCCH, and may determine the number of PRBs, based on the PUCCH to which the smallest number of symbols are allocated. The determined number of PRBs may be applied regardless of the number of symbols allocated to the repeated PUCCH transmission. Referring to FIG. 38, 4 symbols (3 symbols are used for UCI transmission) may be allocated to PUCCH0, and 11 symbols (9 symbols are used for UCI transmission) may be allocated to PUCCH1. Accordingly, the number of PRBs of PUCCH0 to which the smallest number of symbols are allocated may be the number of PRBs of PUCCH1. In this case, when the small number of symbols are determined, symbols mapped with a DMRS are excluded, and only symbols used for UCI transmission may be used. iv) A largest number of PRBs from among PRBs configured for each PUCCH may be used for all repeated PUCCH transmissions. Referring to FIG. 38, if the number of PRBs configured for PUCCH0 is M0 and the number of PRBs configured for PUCCH1 is M1, a larger value in M0 and M1 may be selected. PRBs corresponding to the selected value may be configured for PUCCH0 and PUCCH1. v) The same number of PRBs may be configured for each repeatedly transmitted PUCCH. That is, when scheduling repeated PUCCH transmission, the base station may perform scheduling so that the numbers of PRBs configured for respective repeatedly transmitted PUCCHs to be the same.

Method 3

Figure 39:
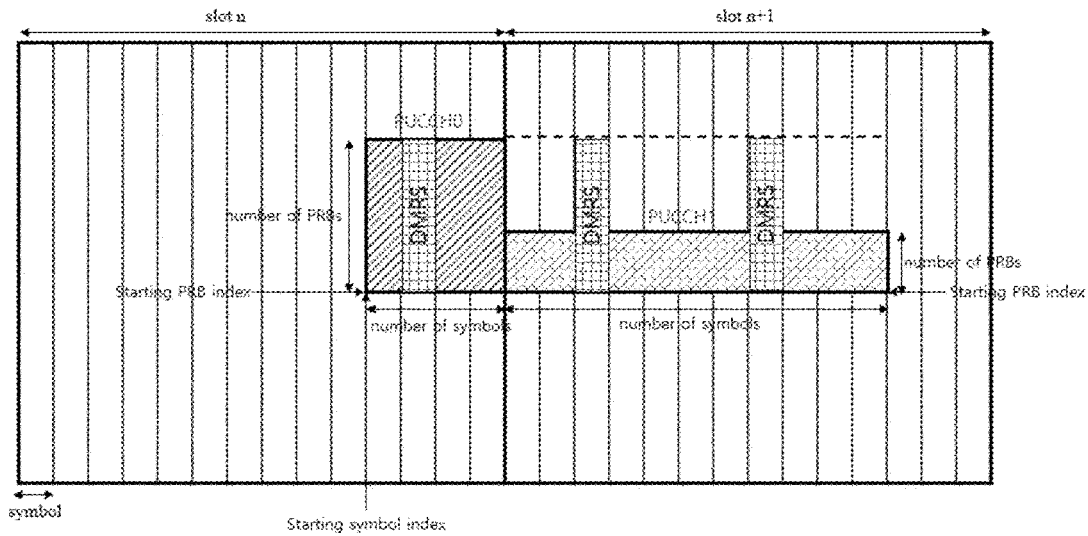
FIG. 39 and FIG. 40 illustrate PRBs for DMRS transmission, configured for each repeatedly transmitted PUCCH according to an embodiment of the present disclosure.
Figure 40:
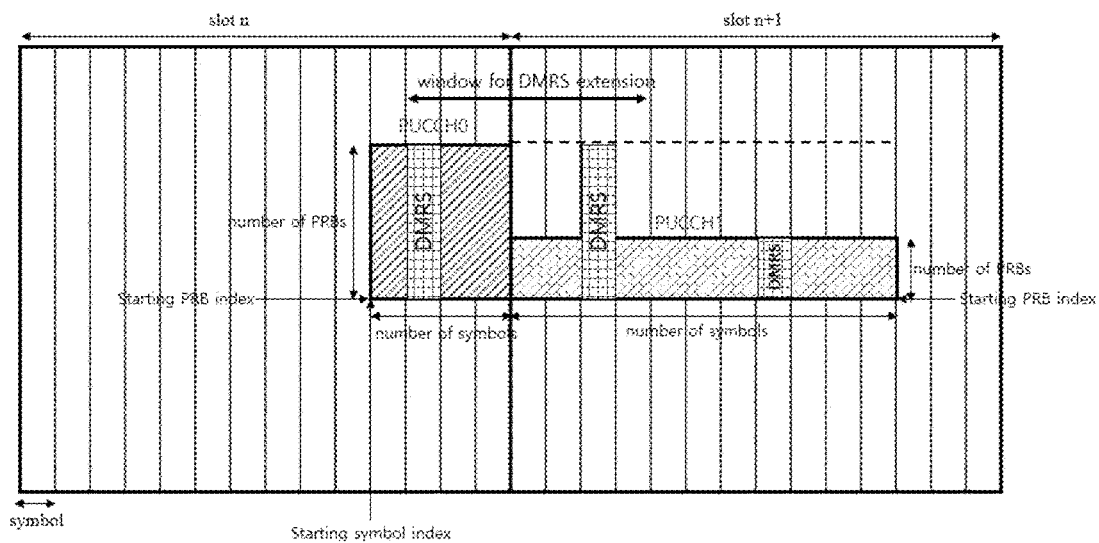

FIG. 39 and FIG. 40 illustrate PRBs for DMRS transmission, configured for each repeatedly transmitted PUCCH according to an embodiment of the present disclosure. In this case, the number of PRBs for DMRS transmission, which is configured for each repeatedly transmitted PUCCH may be the same.

i) Referring to FIG. 39, the number of PRBs, which does not exceed a maximum code rate, may be calculated for each repeatedly transmitted PUCCH. When the number of PRBs required for transmission of PUCCH0 is M0 and the number of PRBs required for transmission of PUCCH1 is M1, PRBs corresponding to a larger value in M0 and M1 may be used for DMRS transmission. That is, a DMRS included in PUCCH1 may be transmitted via M0 PRBs. In other words, all DRMSs included in respective repeatedly transmitted PUCCHs may be transmitted via the same number of PRBs. In this case, UCI may be transmitted on PRBs required for each PUCCH transmission. UCI included in PUCCH1 may be transmitted via M1 PRBs.

ii) The number of PRBs for DMRS transmission, included in some PUCCHs among repeatedly transmitted PUCCHs may be the same. In this case, some PUCCHs may be PUCCHs adjacent in time. For example, the number of PRBs, which is configured to be the same, may be a larger number in the numbers of PRBs configured for two adjacent PUCCHs. As another example, the number of PRBs, which is configured to be the same, may be determined based on a time interval between symbols to which DMRSs are mapped. Referring to FIG. 40, an interval between a DMRS symbol (a $12^{th}$ symbol in slot n) included in PUCCH0 and a first DMRS symbol (a $3^{rd}$ symbol in slot n+1) included in PUCCH1 may be equal to or greater than a certain value (window for DMRS extension). In this case, the number of PRBs to which the DMRSs included in PUCCH0 and PUCCH1 are to be mapped may be a larger value of the number of PRBs configured for PUCCH0 and the number of PRBs configured for PUCCH1.

In order for DMRSs included in a repeatedly transmitted PUCCH or PUSCH to be jointed and used for channel estimation, transmission power should be the same. Hereinafter, a method of equally configuring transmission power (transmit power control) will be described.

According to 3GPP standards, a transmission power of a PUSCH may be determined as shown in Table 4.

TABLE 4

If a UE transmits a PUSCH on active UL BWP b of carrier f of serving cell c using parameter set configuration with index j and PUSCH power control adjustment state with index l, the UE determines the PUSCH transmission power $P_{PUSCH,b,f,c}(i, j, q_d, l)$ in PUSCH transmission occasion i as TABLE 4-continued $$P_{PUSCH,b,f,c}(i, j, q_d, l) = \min \begin{Bmatrix} P_{CMAX,f,c}(i), \\ P_{O\_PUSCH,b,f,c}(j) + 10\log_{10}(2^\mu \cdot \\ M_{RB,b,f,c}^{PUSCH}(i)) + \alpha_{b,f,c}(j) \cdot PL_{b,f,c}(q_d) + \\ \Delta_{TF,b,f,c}(i) + f_{b,f,c}(i, l) \end{Bmatrix}$$

That is, if the terminal transmits a PUSCH in an active UL BWP (b) of a carrier (f) of a serving cell (c), a transmission power may be determined as shown in Equation 2.

[Equation 2]

$$P_{PUSCH,b,f,c}(i, j, q_d, l) = \\ \min \begin{Bmatrix} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{Bmatrix}$$

In this case, $\Delta_{TF,b,f,c}(i)$ may be determined as shown in Equation 3.

$$\Delta_{TF,b,f,c}(i) = 10\log_{10}((2^{BPRE \cdot K_s} - 1) \cdot \beta_{offset}^{PUSCH})$$ [Equation 3]

$K_s$ may be 1.25 or 0. If a PUSCH includes $\beta_{offset}^{PUSCH}$ may be 0. BPRE may be determined as shown in Equation 4.

$$BPRE = \sum_{r=0}^{C-1} K_r / N_{RE}$$ [Equation 4]

C is the number of code blocks transmitted by a PUSCH, and Kr is the size (number of bits) of an r-th code block. $N_{RE}$ is the number of REs allocated to a PUSCH and may be calculated as shown in Equation 5.

$$N_{RE} = M_{RB,b,f,c}^{PUSCH}(i) \cdot \sum_{j=0}^{N_{symb,b,f,c}^{PUSCH}(i)-1} N_{sc,data}^{RB}(i, j)$$ [Equation 5]

$N_{symb, b, f, c}^{PUSCH}(i)$ is the number of symbols allocated to an i-th PUSCH of an active UL BWP (b) of a carrier (f) of a cell (c). i is an index configured to a PUSCH. $N_{sc,data}^{RB}(i,j)$ is a number obtained by excluding a subcarrier, in which a DMRS or a phase tracking reference signal (PTRS) is mapped to a j-th symbol of the i-th PUSCH, from the number of subcarriers constituting an RB. $M_{RB, b, f, c}^{PUSCH}(i)$ is the number of PRBs allocated to the i-th PUSCH of the active UL BWP (b) of the carrier (f) of the cell (c).

$N_{RE}$ may be changed according to $N_{symb,b,f,c}^{PUSCH}(i)$. According to $N_{RE}$, $\Delta_{TF,b,f,c}(i)$ may be changed, and a PUSCH transmission power may be changed.

Hereinafter, descriptions will be provided for a method of constantly maintaining a PUSCH transmission power for joint channel estimation using a DMRS.

Method of Determining PUSCH Transmission Power i) The terminal may calculate a transmission power of a first repeatedly transmitted PUSCH. NE of Equation 5 may be calculated using the number of symbols for transmission of the first repeatedly transmitted PUSCH. That is, $N_{symb, b, f, c}^{PUSCH}(i)$ may be the number of symbols for transmission of the first repeatedly transmitted PUSCH. The transmission power of the first repeatedly transmitted PUSCH may be equally applied to all or some of the remaining repeatedly transmitted PUSCHs. That is, the transmission power of the first repeatedly transmitted PUSCH is applied regardless of the number of symbols for transmission of the remaining repeatedly transmitted PUSCHs. Some PUSCHs may be PUSCHs which are adjacent in time to the first repeatedly transmitted PUSCH and transmitted on the same PRB (i.e., the same hop). Alternatively, some PUSCHs may be PUSCHs including a DMRS, in which joint channel estimation using the DMRS is possible.

ii) The terminal may calculate a transmission power of a PUSCH transmitted on the smallest number of symbols among repeatedly transmitted PUSCHs. In this case, the calculated transmission power of the PUSCH may be used as the transmission power of all or some of the remaining repeatedly transmitted PUSCHs. Specifically, $N_{RE}$ of Equation 5 may be calculated using the number of symbols of the PUSCH transmitted on the smallest number of symbols. That is, $N_{symb,b,f,c}^{PUSCH}(i)$ may be the number of symbols of the PUSCH transmitted on the smallest number of symbols.

iii) The terminal may calculate a transmission power, based on an average of $N_{RE}$s. In this case, $N_{RE}$ may be the number of symbols for transmission of each repeatedly transmitted PUSCH.

iv) The terminal may separately calculate transmission powers of respective repeatedly transmitted PUSCHs. In this case, a largest value among the calculated respective transmission powers may be the transmission power of all repeatedly transmitted PUSCHs.

According to 3GPP standards, a transmission power of a PUCCH may be determined as shown in Equation 6.

[Equation 6]

$$P_{PUCCH,b,f,c}(i, q_u, q_d, l) = \\ \min \begin{Bmatrix} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{Bmatrix}$$

$M_{RB,b,f,c}^{PUCCH}(i)$ is the number of PRBs determined for PUCCH transmission, and may be a value that varies according to the number of symbols in which a PUCCH is transmitted. $\Delta_{TF,b,f,c}(i)$ may be determined according to the number of symbols in which a repeatedly transmitted PUCCH is transmitted. Specifically, $\Delta_{TF,b,f,c}(i)$ may be determined as shown in Equation 7 if a PUCCH format is PUCCH format 0 or 1, and may be determined as shown in Equation 8 or 9 in a case of PUCCH format 2, 3, or 4.

$$\Delta_{TF,b,f,c}(i) = 10\log_{10}\left(\frac{N_{ref}^{PUCCH}}{N_{symb}^{PUCCH}(i)}\right) + \Delta_{UCI}(i)$$ [Equation 7]

$$\Delta_{TF,b,f,c}(i) = \\ 10\log_{10}(K_1 \cdot (n_{HARQ-ACK}(i) + O_{SR}(i) + O_{CSI}(i))/N_{RE}(i))$$ [Equation 8]

$$\Delta_{TF,b,f,c}(i) = 10\log_{10}(2^{K_2 \cdot BPRE(i)} - 1)$$ [Equation 9]

$N_{symb}^{PUCCH}(i)$ of Equation 7 is the number of symbols in which an i-th PUCCH is transmitted, and $N_{ref}^{PUCCH}$ is 2 in a case of PUCCH format 0, and may be the number of symbols constituting one slot in a case of PUCCH format 1. $\Delta_{UCI}(i)$ is 0 for PUCCH format 0, and may be calculated by 10 log$_{10}$(O$_{UCI}$(i)) for PUCCH format 1, where O$_{UCI}$(i) may be the number of bits of UCI.

Equation 8 applied to PUCCH formats 2, 3, and 4 may be applied if the number of bits of UCI is fewer than or equal to 11 bits, where K$_1$ in Equation 8 may be 6. N$_{HARQ-ACK}$(i)+O$_{SR}$(i)+O$_{CSI}$(i) in Equation 8 may be the number of bits of UCI transmitted by a PUCCH, where N$_{RE}$(i) indicating the number of REs may be calculated as shown in Equation 10.

Equation 9 applied to PUCCH formats 2, 3, and 4 may be applied if the number of bits of UCI is greater than or equal to 11 bits, where K$_2$ in Equation 9 may be 2.4. BPRE(i)= (O$_{ACK}$(i)+O$_{SR}$(i)+O$_{CSI}$(i)+O$_{CRC}$(i))/N$_{RE}$(i) in Equation 9 may be satisfied, and O$_{ACK}$(i)+O$_{SR}$(i)+O$_{CSI}$(i)+O$_{CRC}$(i) may be the number of bits of UCI transmitted by a PUCCH, where N$_{RE}$(i) indicating the number of REs may be calculated as shown in Equation 10.

$$N_{RE}(i) = M_{RB,b,f,c}^{PUCCH}(i) \cdot N_{sc,ctrl}^{RB}(i) \cdot N_{symb-UCI,b,f,c}^{PUCCH}(i) \quad \text{[Equation 10]}$$

N$_{sc,ctrl}$ and N$_{symb-UCI}$ have been described above, and descriptions thereof are thus omitted. According to Equation 10, N$_{RE}$ may be a value proportional to N$_{symb-UCI}$. That is, if the numbers of symbols in which respective repeatedly transmitted PUCCHs are different, transmission powers may be determined differently. A transmission power of a PUCCH may be determined according to the number of symbols in which the PUCCH is transmitted. Therefore, a method of, when the numbers of symbols in which respective repeatedly transmitted PUCCHs are different, determining transmission powers to be the same, for joint channel estimation of DMRSs included in respective PUCCHs is required.

Method of Determining PUCCH Transmission Power i) The terminal may calculate a transmission power of a first repeatedly transmitted PUCCH. When calculating the transmission power, the terminal may use the number of symbols and the number of PRBs for the first repeatedly transmitted PUCCH. That is, if a PUCCH format is PUCCH format 0 or 1, N$_{symb}^{PUCCH}$(i) may be the number of symbols of the first repeatedly transmitted PUCCH. If the PUCCH format is PUCCH format 2, 3, or 4, N$_{symb-UCI}$ may be the number of symbols of the first repeatedly transmitted PUCCH, and M$_{RB,b,f,c}^{PUCCH}$(i) may be the number of PRBs determined for transmission of the first repeatedly transmitted PUCCH. The transmission power of the first repeatedly transmitted PUCCH may be equally applied to all or some of the remaining repeatedly transmitted PUCCHs. That is, the transmission power of the first repeatedly transmitted PUCCH is applied regardless of the number of symbols for transmission of the remaining repeatedly transmitted PUCCHs. Some PUCCHs may be PUCCHs which are adjacent in time to the first repeatedly transmitted PUCCH and transmitted on the same PRB (i.e., the same hop). Alternatively, some PUCCHs may be PUCCHs including a DMRS, in which joint channel estimation using the DMRS is possible.

ii) The terminal may separately calculate transmission powers of respective repeatedly transmitted PUCCHs. In this case, a largest value among the calculated respective transmission powers may be the transmission power of all repeatedly transmitted PUCCHs.

Hereinafter, a method of interpreting a frequency hopping flag bit will be described. The base station may configure, for the terminal, a repeated PUSCH transmission mode of PUSCH repetition type-A or PUSCH repetition type-B.

PUSCH repetition type-A may include i) inter-slot hopping and ii) intra-slot hopping. In inter-slot hopping, a PUSCH is transmitted on a different frequency hop in every slot, and intra-slot hopping indicates that the terminal divides a PUSCH configured in each slot in half and transmits the divided PUSCHs on a first frequency hop and a second frequency hop, respectively. The terminal may be configured with either inter-slot hopping or intra-slot hopping from the base station.

PUSCH repetition type-B may include i) inter-slot hopping and ii) inter-repetition hopping. In inter-slot hopping, a PUSCH is transmitted on a different frequency hop in every slot, and inter-repetition hopping indicates that the terminal transmits repeated nominal PUSCHs on different frequency hops, respectively. The terminal may be configured with either inter-slot hopping or inter-repetition hopping from the base station.

A frequency hopping flag with a size of 1 bit may exist in DCI for PUSCH scheduling. The terminal may identify whether to perform frequency hopping, based on the frequency hopping flag.

If the base station configures inter-slot hopping of PUSCH repetition type-A for the terminal, the frequency hopping flag may indicate to the terminal whether to perform inter-slot hopping. However, if the number of repeated PUSCH transmissions is 1, the terminal may transmit a PUSCH only on one slot. That is, inter-slot hopping is not performed regardless of the frequency hopping flag. In other words, when inter-slot hopping is configured, if the number of repeated PUSCH transmissions is 1, whether to perform inter-repetition hopping may be determined according to a bit value of the frequency hopping flag.

If the base station configures inter-slot hopping of PUSCH repetition type-B for the terminal, the frequency hopping flag may indicate to the terminal whether to perform inter-slot hopping. However, if repeatedly transmitted PUSCHs are transmitted only on the same slot, inter-slot hopping is not performed regardless of the frequency hopping flag. In other words, when inter-slot hopping is configured, if repeatedly transmitted PUSCHs are transmitted only on the same slot, whether to perform inter-repetition hopping may be determined according to a value of the frequency hopping flag.

If the base station configures inter-repetition hopping of PUSCH repetition type-B for the terminal, the frequency hopping flag may indicate whether to perform inter-repetition hopping. However, if the number of repeated PUSCH transmissions is 1, the terminal may transmit only a repeated nominal PUSCH. In inter-repetition hopping, hopping is performed based on a repeated nominal PUSCH, so that, if the number of repeated PUSCH transmissions is 1, inter-repetition hopping is not performed regardless of a value of the frequency hopping flag. That is, if the number of repeated PUSCH transmissions is 1, whether to perform inter-slot hopping may be determined according to a value of the frequency hopping flag.

When performing uplink transmission (e.g., PUSCH and PUCCH), the terminal may use frequency hopping in order to obtain diversity gain in the frequency domain. In an NR system, uplink transmission may be performed via up to 2 hops. Hops may refer to different frequency bands. Hereinafter, a method of determining a hop to obtain diversity gain in the frequency domain will be described.

Hop Determination Method

If intra-slot hopping is configured, the base station may configure (indicate), for the terminal, an index of a symbol in which uplink transmission starts and the number of consecutive symbols for the uplink transmission. Based on the index of the starting symbol and the number of consecutive symbols, the terminal may determine the number of symbols of a first hop and the number of symbols of a second hop.

i) Specifically, if the number of consecutive symbols is N, the number of symbols of the first hop may be floor(N/2), and the number of symbols of the second hop may be N-floor(N/2). That is, the first hop may include floor(N/2) consecutive symbols from a symbol indicated by the index of the starting symbol, and the second hop may include N-floor(N/2) consecutive symbols subsequent to a last symbol of the first hop. The terminal may perform uplink transmission by configuring more hops than two hops in order to obtain diversity in a higher frequency domain. Specifically, in the following, descriptions will be provided for a method in which the terminal determines four hops when intra-slot hopping is configured.

If the number of symbols configured for uplink transmission is N, the numbers of symbols included in the first hop, second hop, third hop, and fourth hop may be determined based on N. First, N may be divided into the number ($N_{12}$) of symbols included in the first and second hops and the number ($N_{34}$) of symbols included in the third and fourth hops. $N_{12}$ may be calculated with floor(N/2), and $N_{34}$ may be calculated with N-floor(N/2). Based on $N_{12}$, the number ($N_1$) of symbols included in the first hop and the number ($N_2$) of symbols included in the second hop may be determined. Similarly, based on $N_{34}$, the number ($N_3$) of symbols included in the third hop and the number ($N_4$) of symbols included in the fourth hop may be determined. Specifically, $N_1$ to $N_4$ may be calculated as shown in Equation 11.

$N_1$=floor($N_{12}$/2)

$N_2$=$N_{12}$-floor($N_{12}$/2)

$N_3$=floor($N_{34}$/2)

$N_4$=$N_{34}$-floor($N_{34}$/2)  [Equation 11]

Equation 11 may be expressed as Equation 12.

$N_1$=floor(floor(N/2)/2)

$N_2$=floor(N/2)-floor(floor(N/2)/2)

$N_3$=floor((N-floor(N/2))/2)

$N_4$=N-floor(N/2)-floor((N-floor(N/2))/2)  [Equation 12]

Table 5 shows the number of symbols included in the first to fourth hops according to the number N of symbols.

TABLE 5

| # of symbols (N) | 1st hop ($N_1$) | 2nd hop ($N_2$) | 3rd hop ($N_3$) | 4th hop ($N_4$) |
|---|---|---|---|---|
| 8 | 2 | 2 | 2 | 2 |
| 9 | 2 | 2 | 2 | 3 |
| 10 | 2 | 3 | 2 | 3 |
| 11 | 2 | 3 | 3 | 3 |
| 12 | 3 | 3 | 3 | 3 |
| 13 | 3 | 3 | 3 | 4 |
| 14 | 3 | 4 | 3 | 4 |

According to Table 5, the numbers of symbols included in the first hop to the fourth hop may differ by at most 1 symbol according to the number N of symbols.

For example, the terminal may transmit two uplink channels with a length of 14 symbols starting from a first symbol of a slot, wherein a first uplink channel is transmitted via two hops, and a second uplink channel is transmitted via four hops. A first hop of the first uplink channel may include 7 symbols from a first symbol, and a second hop may include the remaining 7 symbols. That is, a boundary between the first hop and the second hop of the first uplink channel may be between a seventh symbol and an eighth symbol of the slot. In other words, the boundary between the first hop and the second hop of the first uplink channel may be a time point at which the seventh symbol ends and a time point at which the eighth symbol starts. A first hop of the second uplink channel may include 3 symbols from a first symbol, a second hop may include subsequent 4 symbols, a third hop may include 3 symbols subsequent to the second hop, and a fourth hop may include 4 symbols subsequent to the third hop. The second uplink channel may include the same boundary as the boundary of the first uplink channel. That is, a boundary between the second hop and the third hop of the second uplink channel is the same as the boundary between the first hop and the second hop of the first uplink channel. Therefore, frequency hopping may be performed on the same boundary, which is effective in terms of multiplexing between two uplink channels having the same length starting from the same symbol via frequency hopping.

As another example, the first uplink channel may have a length of 7 symbols starting from a first symbol of a slot, and the second uplink channel may have a length of 14 symbols starting from a first symbol of a slot. In this case, the first uplink channel may be transmitted via two hops, and the second uplink channel may include four hops. A first hop of the first uplink channel may include 3 symbols from the first symbol, and a second hop may include the remaining 4 symbols. A boundary between two hops of the first uplink channel may be between a third symbol and a fourth symbol of the slot. In other words, the boundary between the two hops of the first uplink channel may be a time point at which the third symbol ends and a time point at which the fourth symbol starts. A first hop of the second uplink channel may include 3 symbols from a first symbol, a second hop may include subsequent 4 symbols, a third hop may include 3 symbols subsequent to the second hop, and a fourth hop may include 4 symbols subsequent to the third hop. Accordingly, the second uplink channel may include the same boundary as the first uplink channel. That is, a boundary between the first hop and the second hop of the second uplink channel may be the same as the boundary between the first hop and the second hop of the first uplink channel. Therefore, frequency hopping may be performed on the same boundary, which is effective in terms of multiplexing between two uplink channels having different lengths starting from the same symbol via frequency hopping.

If an uplink channel is a PUSCH and the PUSCH is transmitted via up to 4 hops, each hop may include at least one DM-RS symbol. For example, when the PUSCH includes 14 symbols and is transmitted via 4 hops, a first hop may include 3 symbols, a second hop may include 4 symbols, a third hop may include 3 symbols, and a fourth hop may include 4 symbols, wherein each hop includes at least one symbol to which a DM-RS is mapped. In this case, if a PUSCH mapping type is PUSCH mapping type B, a DMRS may be mapped to a first symbol of each hop. However, in a case of PUSCH mapping type A, a position of a symbol to which a DMRS is mapped needs to be determined. If PUSCH mapping type A is configured, a DMRS may be mapped to the third symbol or fourth symbol of the slot. In this case, whether a DMRS is mapped to the third symbol or the fourth symbol may be indicated via a PBCH. For example, if PUSCH mapping type A is configured, the terminal may determine a hop overlapping with a symbol to which a DMRS needs to be mapped. In this case, if there is a hop overlapping with a symbol to which a DMRS needs to be mapped, a DMRS may be mapped in the corresponding hop and the PUSCH may be transmitted in the hop. That is, the DMRS may be mapped to the same position as the symbol, to which the DMRS needs to be mapped, within the overlapping hop. A position of a symbol, to which a DMRS is mapped, in a hop that does not overlap with a symbol in which a DMRS needs to be transmitted may be determined as in PUSCH mapping type B. That is, a DMRS may be mapped to a first symbol in a hop that does not overlap with a symbol to which a DMRS is mapped. Specifically, there may be a case where a PUSCH is configured by 14 symbols, a mapping type is PUSCH mapping type A, and a DMRS is mapped in a fourth symbol via a PBCH. As described above, when the PUSCH includes 4 hops, the number of symbols of the first hop may be 3. Therefore, since a fourth symbol does not exist in the first hop, a DMRS is not mapped. In this case, the terminal may consider that a length of the first hop is 4 and another hop having a length of 4 has a length of 3. For example, according to Table 5, the first hop to the fourth hop include 3, 4, 3, and 4 symbols, and the terminal may consider that the length of the first hop is 4, and the length of the second or fourth hop is 3. For example, the terminal may consider that the lengths of the first to fourth hops are 4, 3, 3, and 4. Alternatively, the terminal may estimate a length of a hop for DMRS mapping, via a permutation combination of respective hop lengths determined according to Table 5. For example, the terminal may consider that the lengths of the first to fourth hops are 4, 3, 4, and 3.

ii) If the number of symbols configured for uplink transmission is N, the numbers of symbols included in the first hop, second hop, third hop, and fourth hop may be determined based on N. Specifically, the numbers ($N_1$ to $N_4$) of symbols included in the first to fourth hops may be calculated as shown in Equation 13.

$$N_1 = \text{floor}(N/4)$$

$$N_2 = \text{floor}(N/2) - \text{floor}(N/4)$$

$$N_3 = \text{ceil}(N/4)$$

$$N_4 = N - \text{floor}(N/2) - \text{ceil}(N/4) \quad \text{[Equation 13]}$$

Table 6 shows the number of symbols included in the first to fourth hops according to the number N of symbols.

TABLE 6

| # of symbols (N) | 1st hop ($N_1$) | 2nd hop ($N_2$) | 3rd hop ($N_3$) | 4th hop ($N_4$) |
|---|---|---|---|---|
| 8 | 2 | 2 | 2 | 2 |
| 9 | 2 | 2 | 3 | 2 |
| 10 | 2 | 3 | 3 | 2 |
| 11 | 2 | 3 | 3 | 3 |
| 12 | 3 | 3 | 3 | 3 |
| 13 | 3 | 3 | 4 | 3 |
| 14 | 3 | 4 | 4 | 3 |

According to Table 6, the numbers of symbols included in the first hop to the fourth hop may differ by at most 1 symbol according to the number N of symbols. As in i) described above, the method of ii) is also effective in terms of multiplexing between two uplink channels having the same length starting from the same symbol. The method of ii) is also effective in terms of multiplexing between two uplink channels having different lengths starting from different symbols. For example, there may be a first uplink channel having a length of 5 starting from a third symbol of a slot, and a second uplink channel having a length of 9 starting from a first symbol of a slot. In this case, the first uplink channel may be transmitted in two hops, and the second uplink channel may be transmitted in four hops. A first hop of the first uplink channel may include a third symbol and a fourth symbol of the slot, and a second hop may include a fifth symbol to a seventh symbol of the slot. A boundary between the first hop and the second hop of the first uplink channel may be between the fourth symbol and the fifth symbol of the slot. A first hop of the second uplink channel may include 2 symbols from a first symbol, a second hop may include subsequent 2 symbols, a third hop may include 3 symbols subsequent to the second hop, and a fourth hop may include 2 symbols subsequent to the third hop. Accordingly, the second uplink channel may include the same boundary as the first uplink channel. That is, a boundary between the second hop and the third hop of the second uplink transmission is between a fourth symbol and a fifth symbol, and it may thus include the same boundary as the first uplink channel. Therefore, frequency hopping may be performed at the same boundary.

When the terminal transmits a PUSCH via up to two hops, if the PUSCH overlaps with a PUCCH on a certain symbol, UCI of the PUCCH may be multiplexed with the PUSCH so as to be transmitted. In this case, the UCI may be divided in half according to a UCI type, wherein one half is multiplexed in a first hop and the other half is multiplexed in a second hop. The UCI type may be HARQ-ACK, CSI part1, or CSI part2. For example, HARQ-ACK may be divided into two, $G^{ACK}(1)$ and $G^{ACK}(2)$, as follows. $G^{ACK}(1) = N_L * Q_M * \text{floor}(G^{ACK}/(2*N_L*Q_M))$, $G^{ACK}(2) = N_L * Q_M * \text{ceil}(G^{ACK}/(2*N_L*Q^M))$.

$N_L$ is the number of layers of the PUSCH, and $Q_m$ is a modulation order of the PUSCH. HARQ-ACK may be multiplexed in the first hop based on $G^{ACK}(1)$, and may be multiplexed in the second hop based on $G^{ACK}(2)$. CSI part 1 and CSI part 2 may also be multiplexed in respective hops in the same manner.

When the terminal transmits a PUSCH via up to four hops, if the PUSCH overlaps with a PUCCH on a certain symbol, UCI of the PUCCH may be multiplexed with the PUSCH so as to be transmitted.

i) The terminal may divide the UCI into four pieces and multiplex the same in the four hops of the PUSCH, respectively. In this case, according to a UCI type, the UCI may be divided into four pieces, wherein a first ¼ is multiplexed in a first hop, a second ¼ is multiplexed in a second hop, a third ¼ is multiplexed in a third hop, and the last ¼ is multiplexed in a fourth hop. Sizes of the UCI multiplexed in the respective hops may be calculated as shown in Equation 14 or Equation 15.

$$G^{ACK}(1) = N_L \cdot Q_M * \text{floor}(G^{ACK}/(4*N_L*Q_M))$$

$$G^{ACK}(2) = N_L * Q_M * \text{ceil}(G^{ACK}/(4*N_L*Q_M))$$

$$G^{ACK}(3) = N_L * Q_M * \text{floor}(G^{ACK}/(4*N_L*Q_M))$$

$$G^{ACK}(4) = N_L * Q_M * \text{ceil}(G^{ACK}/(4*N_L*Q_M)) \quad \text{[Equation 14]}$$

$$G^{ACK}(1)=N_L*Q_M*\text{floor}(\text{floor}(G^{ACK}/(2*N_L*Q_M)/2)$$

$$G^{ACK}(2)=N_L*Q_M*\text{ceil}(\text{floor}(G^{ACK}/(2*N_L*Q_M)/2)$$

$$G^{ACK}(3)=N_L*Q_M*\text{floor}(\text{ceil}(G^{ACK}/(2*N_L*Q_M)/2)$$

$$G^{ACK}(4)=N_L*Q_M*\text{ceil}(\text{ceil}(G^{ACK}/(2*N_L*Q_M)/2) \quad \text{[Equation 15]}$$

HARQ-ACK may be multiplexed in the first hop, the second hop, the third hop, and the fourth hop, based on $G^{ACK}(1)$, $G^{ACK}(2)$ $G^{ACK}(3)$, and $G^{ACK}(4)$, respectively, according to Equation 14 or Equation 15. CSI part 1 and CSI part 2 may also be multiplexed in respective hops in the same manner.

ii) The terminal may divide the UCI and multiplex the same in the four hops of the PUSCH. In this case, the UCI may be divided in half according to a UCI type, wherein a first half is multiplexed in the first hop and the second hop, and the other half is multiplexed in the third hop and the fourth hop. Alternatively, the first half may be multiplexed in the first hop and the third hop, and the other half may be multiplexed in the second hop and the fourth hop. That is, the UCI is divided in half, and divided pieces of the UCI may be repeatedly transmitted in two hops, respectively. In this case, the size of the UCI(A, B) divided in half is as follows.

$$A=N_L*Q_M*\text{floor}(G^{ACK}/(2*N_L*Q_M)),B=N_L*Q_M*\text{ceil}(G^{ACK}/(2*N_L*Q_M))$$

Dividing the UCI in half, in comparison with dividing the UCI into four, enables reuse of a method of determining a UCI size according to two hops defined in the existing NR system, and enables repeated transmission of the UCI in two different hops, so that dividing the UCI in half is effective in terms of reliability.

iii) Even if the PUSCH is configured to be transmitted via four hops, the terminal may divide the UCI and transmit the same via two hops. That is, the UCI may be multiplexed and transmitted in two hops, and may not be multiplexed in the remaining two hops. The terminal may reuse the method of determining a UCI size according to two hops defined in the existing NR system, and may not perform repeated transmission. Specifically, a method of selecting two hops from among four hops is as follows.

iii-a) The terminal may always select two hops earliest in time. That is, when the PUSCH is divided into 4 hops, the terminal may multiplex and transmit UCI in a first hop and a second hop which are the earliest in time, and may not multiplex the UCI in a third hop and a fourth hop which are later in time. The base station may receive the UCI more quickly.

iii-b) The terminal may always select last two hops. That is, when the PUSCH is divided into four hops, the terminal may multiplex and transmit UCI in a third hop and a fourth hop which are the last in time, and may not multiplex the UCI in a first hop and a second hop which are earlier in time. The terminal may secure time for multiplexing the UCI with the PUSCH. An additional processing time may be required for the terminal to multiplex the UCI with the PUSCH. In iii-b) in comparison with iii-a), since the UCI is multiplexed in the later hops, a processing time is spared, so that iii-b) can be easily implemented.

iii-c) The terminal may determine two hops, based on PUSCH hops overlapping with a PUCCH. For example, among the PUSCH hops overlapping with a PUCCH, an earliest hop and a subsequent hop may be selected. As another example, among the PUSCH hops overlapping with a PUCCH, a latest hop and a preceding hop may be selected. If two hops are selected based on the PUSCH hops overlapping with a PUCCH, a time line similar to a time line (i.e., delay) during transmission via the PUCCH may be provided.

iii-d) The terminal may select two odd-numbered hops. That is, the terminal may multiplex and transmit the UCI in a first hop and a third hop, and may not multiplex the UCI in a second hop and a fourth hop. Alternatively, the terminal may select two even-numbered hops. That is, the terminal may multiplex and transmit the UCI in the second hop and the fourth hop, and may not multiplex the UCI in the first hop and the third hop.

iii-e) The terminal may select two hops which are located farthest in the frequency domain. In the frequency domain, a distance may be calculated as a difference between lowest PRBs of respective hops. For example, when the first hop starts at PRB X1, the second hop starts at PRB X2, the third hop starts at PRB X3, and the fourth hop starts at PRB X4, a distance between an i-th hop and a j-th hop in the frequency domain is calculated with $|X_i-X_j|$, and two hops with a greatest distance may be selected based on this value. The terminal may multiplex and transmit the UCI in the selected two hops, and may not multiplex the UCI in the remaining two hops. iii-e) is effective in terms of frequency diversity.

iii-f) The terminal may select two hops including a large number of symbols. For example, when the PUSCH is of 14 symbols and the numbers of symbols constituting a first hop, a second hop, a third hop, and a fourth hop are 3, 4, 3, and 4, the terminal may multiplex and transmit the UCI in the second hop and the fourth hop, and may not multiplex the UCI in the first hop and the third hop.

iii-g) When two hops are selected via the methods of iii-a) to iii-f), hops that satisfy a specific condition may be excluded. The specific condition may be that a symbol to which a DMRS is mapped is located at a last symbol in a hop. This is because UCI cannot be multiplexed in a symbol subsequent to a symbol to which a DMRS is mapped. Alternatively, the specific condition may be a case in which, due to lack of resources in the hop, UCI cannot be multiplexed after a symbol to which a DMRS is mapped.

iii-h) The base station may configure, for the terminal, a hop in which the UCI is multiplexed. This configuration may be configured via an RRC signal, and may be configured via DCI.

Hereinafter, descriptions will be provided for a method of UCI multiplexing according to frequency hopping when a PUSCH is repeatedly transmitted. The terminal may repeatedly transmit the same TB via repeated PUSCH transmission. For coverage improvement, DMRSs between repeatedly transmitted PUSCHs/PUCCHs which are different from each other may be combined and used for channel estimation.

Figure 41:
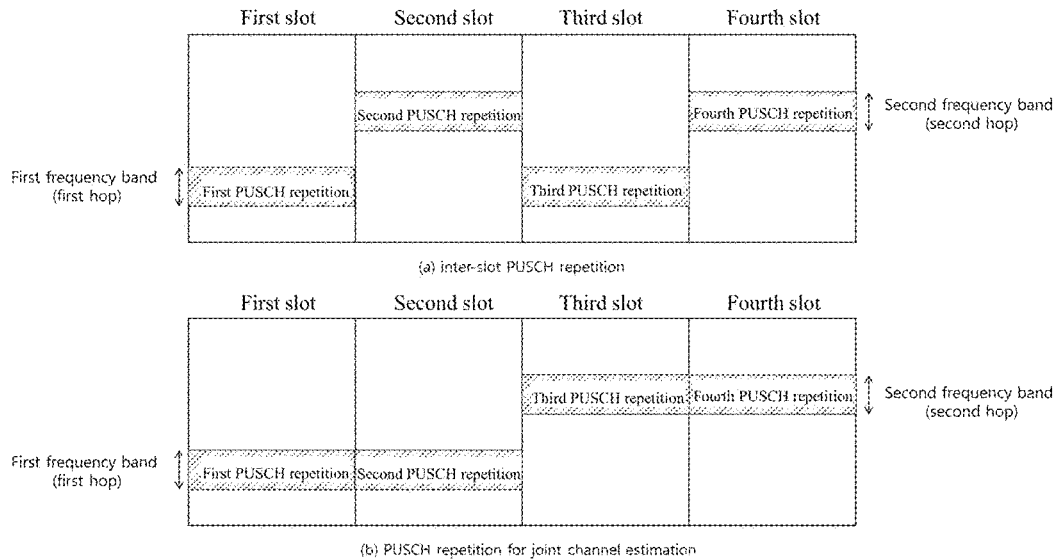
FIG. 41 illustrates a repeatedly transmitted PUSCH according to an embodiment of the present disclosure.

FIG. 41 illustrates a repeatedly transmitted PUSCH according to an embodiment of the present disclosure.

Figure 42:
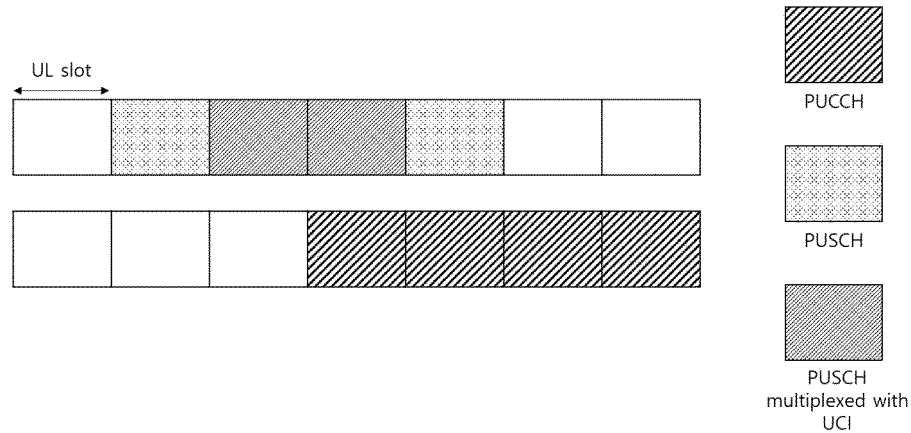
FIG. 42 and FIG. 43 illustrate a method of multiplexing a repeatedly transmitted PUSCH and UCI included in a repeatedly transmitted PUSCH according to an embodiment of the present disclosure.
Figure 43:
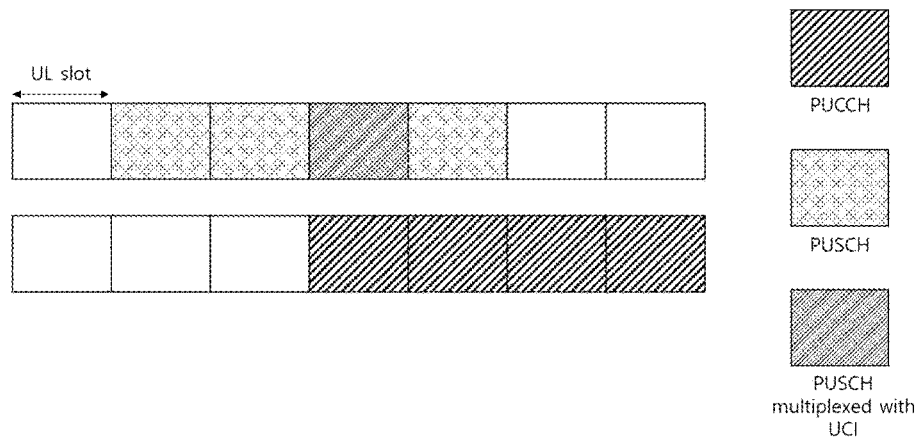

FIG. 42 and FIG. 43 illustrate a method of multiplexing a repeatedly transmitted PUSCH and UCI included in a repeatedly transmitted PUSCH according to an embodiment of the present disclosure.

A first DMRS included in a repeatedly transmitted first PUSCH and a second DMRS included in a repeatedly transmitted second PUSCH may be transmitted on different symbols. That is, the first DMRS may be transmitted on a first symbol among symbols scheduled for the first PUSCH, and the second DMRS may be transmitted on a second symbol among symbols scheduled for the second PUSCH. Phase continuity should be satisfied when the terminal transmits DMRSs on different repeatedly transmitted PUSCHs. That is, the first PUSCH and the second PUSCH may be transmitted in the same beamforming situation. In addition, the first PUSCH and the second PUSCH need to have the same quasi-co-location (QCL). In addition, a transmission power for transmission of the first PUSCH and a transmission power for transmission of the second PUSCH should be the same. The base station may perform channel estimation by jointing the first DMRS and the second DMRS, and may receive the first PUSCH and the second PUSCH repeatedly transmitted based on a channel estimation result.

Some PUSCHs among repeatedly transmitted PUSCHs may be transmitted in a first frequency band and the remaining PUSCHs may be transmitted in a second frequency band. In this case, the first frequency band may be a first hop, and the second frequency band may be a second hop. Accordingly, multiple repeatedly transmitted PUSCHs may be included in the first hop, and other multiple repeatedly transmitted PUSCHs may be included in the second hop. Referring to FIG. 41A, PUSCHs may be configured to be repeatedly transmitted in four slots. In this case, for inter-slot frequency hopping, a first PUSCH may be repeatedly transmitted in a first slot, a second PUSCH may be repeatedly transmitted in a second slot, a third PUSCH may be repeatedly transmitted in a third slot, and a fourth PUSCH may be repeatedly transmitted in a fourth slot. Here, the first frequency band and the third frequency band may be the same, and the second frequency band and the fourth frequency band may be the same. Referring to FIG. 41B, joint channel estimation may be configured. In this case, a first PUSCH repetition in a first slot and a second PUSCH repetition in a second slot may be transmitted in a first frequency band, and a third PUSCH repetition in a third slot and a fourth PUSCH repetition in a fourth slot may be transmitted in a second frequency band. In addition, a DMRS included in the first PUSCH repetition and a DMRS included in the second PUSCH repetition may be jointed and used for channel estimation of the first frequency band, and a DMRS included in the third PUSCH and a DMRS included in the fourth PUSCH may be jointed and used for channel estimation of the second frequency band.

UCI Multiplexing Method

UCI included in repeatedly transmitted PUSCHs may be multiplexed and transmitted. In this case, if the repeatedly transmitted PUSCHs are transmitted in different frequency bands (different hops), frequency diversity cannot be obtained via UCI. Hereinafter, a method of obtaining frequency diversity via UCI will be described. PUSCH repetition described in the present specification may have the same meaning as repeatedly transmitted PUSCH.

If multiple repeatedly transmitted PUSCHs are configured in each frequency band (each hop), one PUSCH may be selected for each frequency band. i) One PUSCH earliest in time may be selected in each frequency band (each hop). Referring to FIG. 41B, the first PUSCH repetition and the second PUSCH repetition may be configured in the first frequency band (first hop), wherein the first PUSCH repetition that is earlier in time among the two PUSCH repetitions may be selected. Similarly, if the third PUSCH repetition and the fourth PUSCH repetition are configured in the second frequency band (second hop), the third PUSCH repetition that is the earliest in time may be selected. Accordingly, the UCI may be multiplexed and transmitted with the first PUSCH repetition and the third PUSCH repetition. ii) In each frequency band (each hop), one PUSCH repetition that is the last in time may be selected. Referring to FIG. 41B, if the first PUSCH repetition and the second PUSCH repetition are configured in the first frequency band (first hop), the second PUSCH repetition that is the last in time may be selected. Similarly, if the third PUSCH repetition and the fourth PUSCH repetition are configured in the second frequency band (second hop), the fourth PUSCH repetition that is the last in time may be selected. Accordingly, the UCI may be multiplexed and transmitted with the second PUSCH repetition and the fourth PUSCH repetition. Compared to UCI multiplexing in a preceding PUSCH repetition, the method of UCI multiplexing in a subsequent PUSCH repetition can secure a time required for UCI multiplexing. The PUSCH repetitions including UCI according to the methods of i) and ii) described above may not be PUSCH repetitions that are consecutive in time. Accordingly, the base station may be required to store UCI included in one PUSCH repetition and wait for another PUSCH repetition. Therefore, additional hardware for UCI storage may be required. A method of transmitting UCI in consecutive PUSCHs will be described. iii) One PUSCH repetition located last in time may be selected in a frequency band (hop) ahead in time, and one PUSCH repetition located earliest in time may be selected in a frequency band (hop) later in time. Referring to FIG. 41B, among the first PUSCH repetition and the second PUSCH repetition configured in the first frequency band (first hop), the second PUSCH repetition that is later in time may be selected. Similarly, in the second frequency band (second hop), the third PUSCH repetition that is earlier in time may be selected. Accordingly, the UCI may be multiplexed and transmitted with the second PUSCH repetition and the third PUSCH repetition. That is, the UCI may be multiplexed and transmitted with the second PUSCH and the third PUSCH which are consecutive PUSCHs in time. iv) The base station may configure an index of PUSCH repetition in which the UCI is multiplexed. The terminal may multiplex and transmit the UCI with a PUSCH repetition determined according to the index configured by the base station.

DMRSs included in PUSCHs repeatedly transmitted in the same PRB in the frequency domain may be jointed and used for channel estimation (joint channel estimation). In order to reduce DMRS overhead, increase channel estimation accuracy, and transmit a large amount of data for joint channel estimation, it is necessary to reduce the density of symbols to which a DMRS is mapped or to perform DMRS-less repeated PUSCH transmission. The following shows information configured for the terminal by the base station in order to configure the number of symbols to which a DMRS included in a PUSCH is mapped. Hereinafter, repeatedly transmitted PUSCHs transmitted in the same PRB may be described as a PUSCH-bundle.

Time domain resource allocation (TDRA): Resource allocation information of the time domain. A PUSCH mapping type in the time domain and a PUSCH starting symbol index and length may be included.

Frequency hopping flag: A flag indicating whether to perform frequency hopping of PUSCH, which is indicated with a size of 1 bit in DCI of DCI format 0_1 or 0_2 included in a PDCCH.

dmrs-AdditionPosition: Information on the number of symbols and symbol positions to which a DMRS is mapped, the DMRS being added according to the number of symbols constituting a PUSCH configured from a higher layer.

If PUCCHs and PUSCHs overlap in the time domain, the terminal may multiplex UCI with an earliest PUSCH in the time domain from among overlapping PUSCHs and may transmit no PUCCH. When the UCI is multiplexed with the PUSCH, in order to secure reliability, HARQ-ACK may be mapped from a symbol immediately subsequent to a symbol to which a DMRS of the PUSCH is mapped. CSI-part1 and CSI-part2 may be mapped after the symbol to which HARQ-ACK is mapped. In this case, if the HARQ-ACK is 2 bits or smaller, the HARQ-ACK may be punctured, and if the HARQ-ACK exceeds 2 bits, the HARQ-ACK may be rate-matched. However, if a PUCCH and a PUSCH-bundle overlap, there may not be a symbol to which a DMRS is mapped in PUSCHs, and the UCI may not be multiplexed. Hereinafter, descriptions will be provided for a method of, via UCI multiplexing, guaranteeing reliability of UCI and obtaining PUSCH coverage gain.

In order to guarantee reliability of UCI, the terminal may multiplex the UCI only in a PUSCH having a symbol to which a DMRS is mapped. For joint channel estimation, a PUSCH in which UCI is multiplexed may be selected based on information to be described later. Based on first information, if a PUSCH overlapping with a PUCCH has a symbol to which a DMRS is mapped, the terminal may select the overlapping PUSCH for UCI multiplexing. In other words, adjacent PUSCHs of the same PRB as that for the overlapping PUSCH are not considered when UCI is multiplexed. Based on second information, a PUSCH having a symbol to which a DMRS is mapped is selected from among PUSCHs which are consecutive in the time domain and are in the same PRB in the frequency domain, and UCI may be multiplexed. The terminal may segment UCI and multiplex the same not only in a PUSCH overlapping with a PUCCH but also in all PUSCHs having a symbol to which a DMRS is mapped from among PUSCHs consecutively and repeatedly transmitted in the same PRB as that for the overlapping PUSCH. Based on third information, if a PUSCH overlapping with a PUCCH does not have a symbol to which a DMRS is mapped, the terminal may multiplex UCI in k PUSCHs most adjacent to the overlapping PUSCH and transmit the multiplexed UCI. Based on fourth information, if a PUSCH overlapping with a PUCCH has a symbol to which a DMRS is mapped, the terminal may multiplex UCI in k PUSCHs most adjacent to the overlapping PUSCH and transmit the multiplexed UCI. In the third and fourth information, the adjacent PUSCHs should be PUSCHs that satisfy the aforementioned UCI multiplexing conditions, and a k value may be a value configured by the base station.

The terminal may select a PUSCH in which UCI is multiplexed, regardless of whether a repeatedly transmitted PUSCH includes a DMRS. i) UCI may be equally segmented and multiplexed in repeatedly transmitted PUSCHs. The terminal may segment the UCI into pieces having the same size as possible and multiplex the same in all PUSCHs within a PUSCH-bundle overlapping with a PUCCH. For example, the UCI may be multiplexed only in the PUSCHs within the PUSCH-bundle overlapping with the PUCCH. As another example, the terminal may multiplex the UCI not only in a PUSCH-bundle overlapping with a PUCCH but also in a PUSCH-bundle configured in different hops in the frequency domain. Multiplexing of UCI may be effective in extending coverage via frequency diversity gain, in addition to joint channel estimation. ii) UCI may be multiplexed in a specific PUSCH among repeatedly transmitted PUSCHs. The UCI may be multiplexed in a PUSCH corresponding to an odd-numbered or even-numbered index within a PUSCH-bundle overlapping with a PUCCH. iii) UCI may be multiplexed in as many PUSCHs as the number configured (indicated) by the base station from a PUSC-bundle overlapping with a PUCCH. The base station may configure (provide), for the terminal, information (value) on an offset and a periodicity for a PUSCH in which UCI is to be multiplexed. Referring to FIG. 42, the base station may configure (indicate) an offset of 1 and a periodicity of 2 for the terminal. The terminal may multiplex and transmit UCI in a first PUSCH and a fourth PUSCH in a PUSCH-bundle overlapping with a PUCCH. In addition, the base station may configure (provide), for the terminal, information (value) on an index of the PUSCH in which the UCI is to be multiplexed. Referring to FIG. 43, if the base station configures an index of 2 for the terminal, the terminal may multiplex and transmit UCI in a third PUSCH of the PUSCH-bundle. iv) UCI may be multiplexed in a PUSCH earliest in the time domain in the PUSCH-bundle overlapping with a PUCCH. The terminal may multiplex the UCI in an earliest PUSCH for fast feedback, such as HARQ-ACK. In the described i) to iv), if inter-slot frequency hopping is configured, the terminal may multiplex UCI only in a PUSCH-bundle including a PUSCH earliest in the time domain from among PUSCHs overlapping with a PUCCH. Alternatively, the terminal may multiplex UCI in the same symbol position as that of a PUSCH-bundle including a PUSCH earliest in the time domain from among overlapping PUSCHs in all frequency hops. In an embodiment in which the terminal multiplexes UCI in a PUSCH that does not include a DMRS, the terminal may multiplex UCI in a PUSCH that does not include a DMRS symbol, according to a new rule. The PUSCH overlapping with a PUCCH in i) to iv) described above may refer to all repeated PUSCHs including a PUSCH overlapping with a PUCCH in units of symbols or slots.

Figure 44:
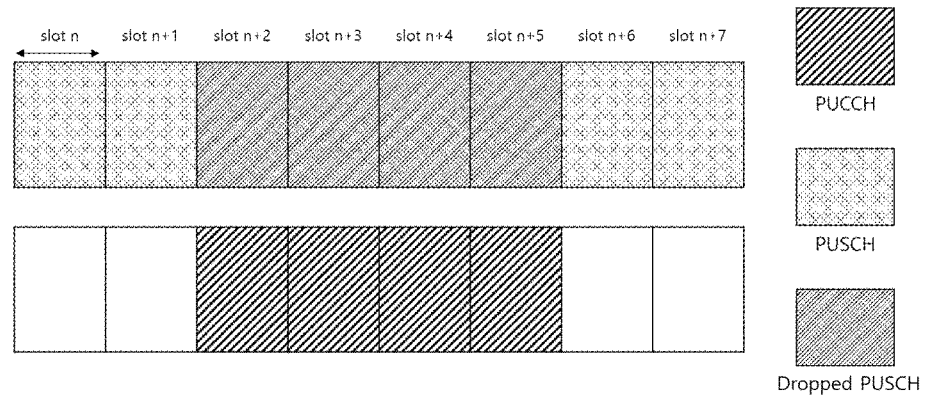
FIG. 44 illustrates transmission cancellation of a repeatedly transmitted PUSCH, based on a repeatedly transmitted PUCCH according to an embodiment of the present disclosure.

FIG. 44 illustrates transmission cancellation of a repeatedly transmitted PUSCH, based on a repeatedly transmitted PUCCH according to an embodiment of the present disclosure.

If a repeatedly transmitted PUCCH and a repeatedly transmitted PUSCH overlap in one or more slots, a terminal transmits only the PUCCH of the overlapping slot and does not transmit the PUSCH of the overlapping slot. Referring to FIG. 44, a repeatedly transmitted PUCCH and a repeatedly transmitted PUSCH may overlap during a period from slot n+2 to slot n+5. In this case, the terminal may transmit only the PUCCH without transmitting the PUSCH of slots n+2 to n+5. If the PUSCH of the overlapping period is not transmitted, the untransmitted PUSCH may not be deferred to a subsequent slot, and thus there is a problem of difficulty to obtain coverage gain due to repeated PUSCH transmission. A method for solving this problem will be described below.

If a repeatedly transmitted PUCCH overlaps with a repeatedly transmitted PUSCH, the terminal may multiplex UCI, which is included in the PUCCH, in the PUSCH and transmit the same. In this case, the overlapping PUCCH may not be transmitted. That is, in order to secure coverage gain of the PUSCH, the terminal may transmit the PUSCH by multiplexing the UCI included in the PUCCH, without dropping the overlapping PUSCH. An HARQ-ACK delay may be increased compared to a conventional scheme of dropping a PUSCH, but all information (data and UCI) to be transmitted can be transmitted, so that it is efficient in terms of reliability of a PUSCH and a PUCCH. i) When a PUCCH and a PUSCH overlap, the terminal may multiplex UCI, which is included in the overlapping PUCCH, in the PUSCH and transmit the same. Referring to FIG. 44, a PUCCH and a PUSCH overlap in a period from slot n+2 to slot n+5. Accordingly, the terminal may transmit UCI by multiplexing the same in the PUSCH, but may not transmit the PUCCH, the UCI being included in the PUCCH of the period from slot n+2 to slot n+5. The terminal may segment the UCI into the number of overlapping PUSCHs (number of slots) and multiplex the same. That is, the terminal may segment the UCI included in the PUCCH into 4 slots of the PUSCH (slots n+2 to n+5) and multiplex the same. The terminal may multiplex the UCI in one PUSCH without segmenting the UCI. That is, the PUSCH in which the UCI is multiplexed may be repeatedly transmitted 4 times. ii) When a PUSCH and a PUCCH overlap, the terminal may multiplex UCI of the PUCCH in a specific PUSCH. In this case, the specific PUSCH may be predefined between the base station and the terminal, or may be configured for the terminal via the base station. A) A specific PUSCH may be an earliest PUSCH in the time domain from among overlapping PUSCHs. For faster HARQ-ACK feedback, the terminal may multiplex the UCI only in the earliest PUSCH in the time domain. In this case, among PUSCHs overlapping with the PUCCH, a PUSCH without multiplexing may be transmitted as it is. B) A specific PUSCH may be a PUSCH which is the earliest in the time domain from among PUSCHs overlapping with the PUCCH and is transmitted in a different PRB in the frequency domain. For frequency diversity gain for the UCI as well as fast HARQ-ACK feedback, the terminal may multiplex the UCI in a PUSCH which is the earliest in the time domain and is transmitted in a different PRB. C) A specific PUSCH may be selected based on information configured or indicated by the base station. For example, if the base station configures/indicates information that an index is 1, the terminal may multiplex the UCI in a PUSCH having index 1 (i.e., a second PUSCH) from among PUSCHs overlapping with the PUCCH. As another example, the base station may configure (indicate), for the terminal, information on a start position and length of the PUSCH. If the base station configures/indicates, for the terminal, that a start position is 0 and a length of 2, then the terminal may multiplex the UCI in a first PUSCH (start position 0) and a second PUSCH (length 2) from among PUSCHs overlapping the PUCCH.

Figure 45:
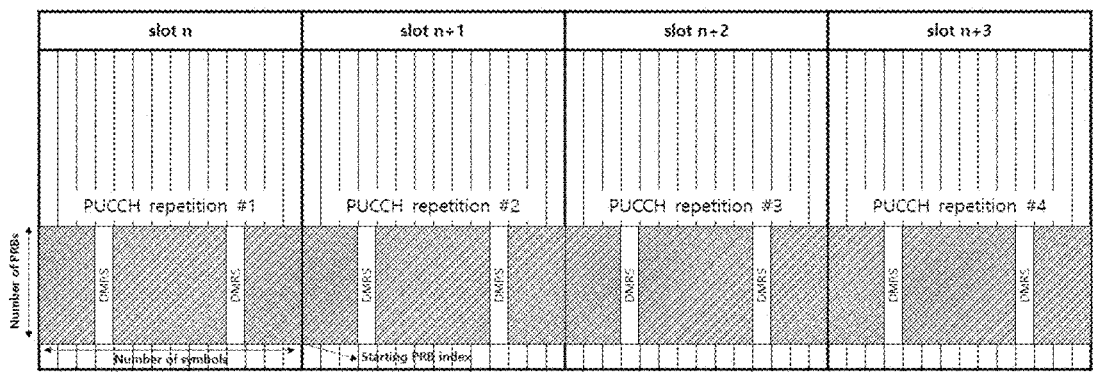
FIG. 45 illustrates a repeatedly transmitted PUCCH according to an embodiment of the present disclosure.
Figure 46:
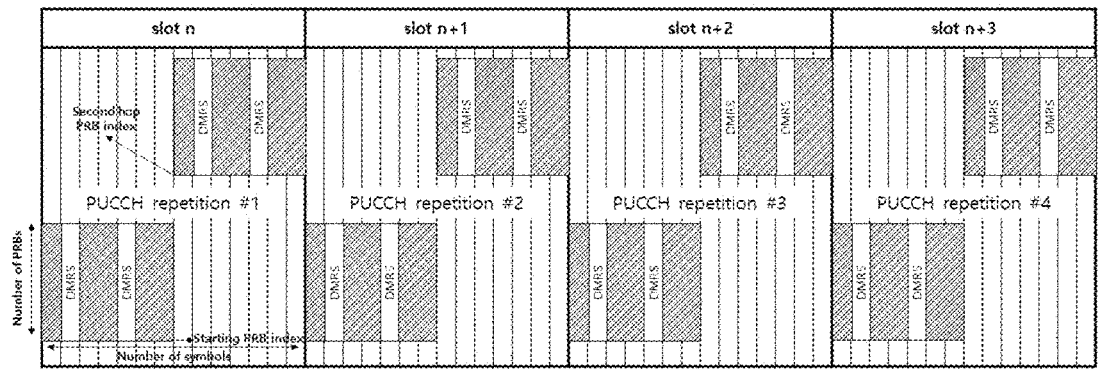
FIG. 46 illustrates a repeatedly transmitted PUCCH and intra-slot frequency hopping according to an embodiment of the present disclosure.
Figure 47:
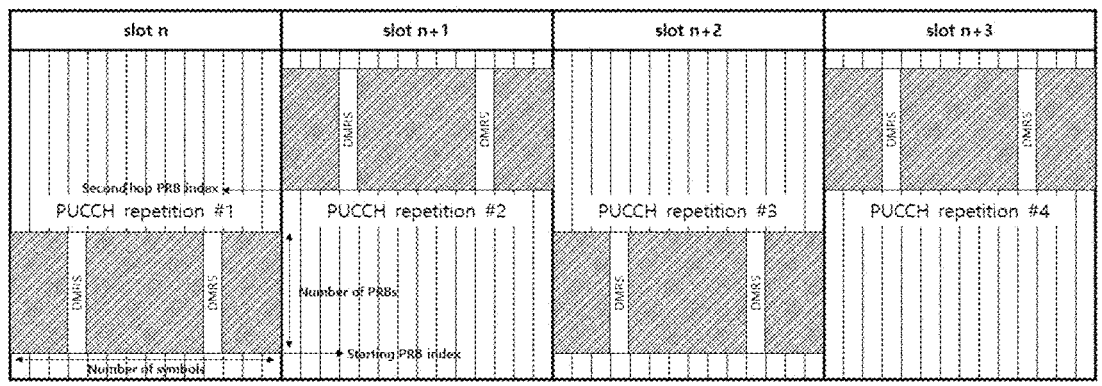
FIG. 47 illustrates a repeatedly transmitted PUCCH and inter-slot frequency hopping according to an embodiment of the present disclosure.

FIG. 45 illustrates a repeatedly transmitted PUCCH according to an embodiment of the present disclosure, FIG. 46 illustrates a repeatedly transmitted PUCCH and intra-slot frequency hopping according to an embodiment of the present disclosure, and FIG. 47 illustrates a repeatedly transmitted PUCCH and inter-slot frequency hopping according to an embodiment of the present disclosure.

Referring to FIG. 45, since DMRSs included in PUCCH repetitions #1, #2, #3, and #4 satisfy the aforementioned conditions for joint channel estimation, a base station may perform channel estimation by jointing corresponding DMRSs. In addition, if a PUCCH is repeatedly transmitted for frequency diversity gain, the PUCCH may be transmitted via frequency hopping.

A frequency hopping type includes intra-slot frequency hopping and inter-slot frequency hopping.

Intra-Slot Frequency Hopping

A terminal may divide a PUCCH in half in the time domain within a slot in which PUCCH transmission is configured, and map each of the two divided PUCCHs to two hops so as to transmit the same. In this case, the PUCCH may or may not be repeatedly transmitted. When a length of a symbol in which a PUCCH is configured within one slot is referred to as number of symbols, a first hop may include floor(number of symbols/2) symbols, and a second hop may include (number of symbols−floor(number of symbols/2)) symbols. Referring to FIG. 46, a base station may configure a terminal to repeatedly transmit a PUCCH during 4 slots starting from slot n and to perform intra-slot frequency hopping. In this case, a length of symbols, to which the PUCCH is allocated, in one slot may be 14. The terminal may configure a first hop with first 7 symbols (floor(number of symbols(14)/2)) of the PUCCH in each of slots n, n+1, n+2, and n+3, and a second hop may include 7 symbols subsequent to a last symbol constituting the first hop (number of symbols(14)−floor(number of symbols(14)/2)). In this case, the first hop may be transmitted in a first frequency band and the second hop may be transmitted in a second frequency band.

Inter-Slot Frequency Hopping

Based on a first slot of a first repeatedly transmitted PUCCH, a repetition transmission slot index (slot index for repetition) of a slot in which a PUCCH is repeatedly transmitted may be sequentially indexed. In this case, the first slot of the first repeatedly transmitted PUCCH may have slot index for repetition 0. Referring to FIG. 47, a base station may configure a terminal to repeatedly transmit a PUCCH during 4 slots starting from slot n and to perform inter-slot frequency hopping. In this case, a slot index for repetition of slot n may be 0, and slot indices for repetition of slots n+1, n+2, and n+3 may be 1, 2, and 3, respectively. The terminal may map, to a first hop, a PUCCH of a slot (i.e., slot of repetition transmission slot index 0 or 2) in which an even-numbered PUCCH is transmitted, among repeatedly transmitted PUCCHs. Similarly, the terminal may map, to a second hop, a PUCCH of a slot (i.e., slot index for repetition 1 or 3) in which an odd-numbered PUCCH is transmitted. In other words, the terminal may transmit a PUCCH in the first hop in slot n and slot n+2, and may transmit a PUCCH in the second hop in slot n+1 and slot n+3.

PRBs of the first hop may be PRBs corresponding to the number of PRBs from a PRB of a starting PRB index. PRBs of the second hop may be PRBs corresponding to the number of PRBs from a PRB of a second hop PRB index.

When PUCCHs are repeatedly transmitted via frequency hopping, a DMRS of the PUCCH transmitted in the first hop and a DMRS of the PUCCH transmitted in the second hop are transmitted in different PRBs, so that the DMRSs cannot be used for joint channel estimation. Hereinafter, descriptions will be provided for a frequency hopping method for improving coverage via frequency diversity gain and DMRS joint channel estimation. For convenience of description, a PUCCH is described, but the following descriptions may be equally applied to a PUSCH.

Frequency Hopping Method for Joint Channel Estimation

FIG. 48 to FIG. 53 illustrate a method of determining a slot index for repetition during PUCCH transmission via frequency hopping, according to an embodiment of the present disclosure.

Figure 48:
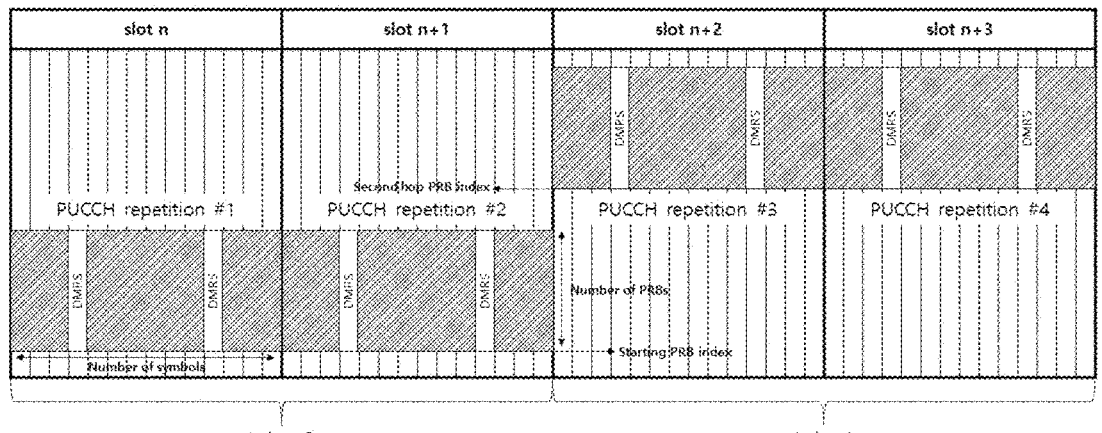

Hereinafter, a frequency hopping method for joint channel estimation will be described based on inter-slot frequency hopping. That is, a terminal may transmit an even-numbered repeatedly transmitted PUCCH by mapping the same to a first hop, and may transmit an odd-numbered repeatedly transmitted PUCCH by mapping the same to a second hop. In this case, a base station may configure the terminal to repeatedly transmit PUCCHs on N slots, and may configure that a specific number for configuration of a slot index for repetition is M.

i) The terminal may maintain the same slot indices for repetition of PUCCHs repeatedly transmitted during a specific number of slots. For each of the specific number of slots, a slot index for repetition may be sequentially increased. The specific number may be the number of PUCCHs including a DMRS for joint channel estimation. Based on a slot of a first repeatedly transmitted PUCCH, slot indices for repetition of M slots may be determined to be 0. Thereafter, a slot index for repetition of a repeatedly transmitted PUCCH may be sequentially increased in every M slots. In this case, the slot index may be independent of whether the PUCCH is repeatedly transmitted. Referring to FIG. 48, the base station may configure, for the terminal, that N is 4 and M is 2, and may configure repeated PUCCH transmission from slot n. The terminal may determine slot indices for repetition of two slots from slot n, i.e., slots n and n+1, to be 0, and may determine slot indices for repetition of two slots from slot n+2, i.e., slots n+2 and n+3, to be 1. PUCCHs of slot n and slot n+1 with the slot index for repetition of 0 may be transmitted in the first hop, and PUCCHs of slot n+2 and slot n+3 with the slot index for repetition of 1 may be transmitted in the second hop. Referring to FIG. 49, the base station may configure, for the terminal, that N is 4 and M is 2, and may configure repeated PUCCH transmission from slot n. Based on the M value (2), the terminal may determine slot indices for repetition for slots n and n+1 to be 0, may determine slot indices for repetition for slots n+2 and n+3 to be 1, and may determine slot indices for repetition for slots n+4 and n+5 to be 2. Slots with a slot index for repetition of 0 may be transmitted in the first hop, slots with a slot index for repetition of 1 may be transmitted in the second hop, and slots with a slot index for repetition of 2 may be transmitted in the first hop. However, slot n+1 is a slot unavailable for PUCCH transmission, and slot n, slot n+2, slot n+3, and slot n+4 may be slots available for PUCCH transmission. Therefore, since the terminal needs to repeatedly transmit PUCCHs on 4 slots, the PUCCHs may be transmitted in four slots available for PUCCH transmission, which are slot n, slot n+2, slot n+3, and slot n+4. That is, PUCCHs of slots (slot n and slot n+4) with even-numbered slot indices for repetition may be transmitted in the first hop, and PUCCHs of slots (slot n+2 and slot n+3) with odd-numbered slot indices for repetition may be transmitted in the second hop. The terminal may configure a slot index for repetition by binding M consecutive slots regardless of whether a slot is available for PUCCH transmission. In addition, M consecutive slots are configured with the same slot index for repetition, so as to be transmitted in the same frequency band. Accordingly, if there is a slot unavailable for PUCCH transmission among the M consecutive slots, the number of slots in which a PUCCH is actually transmitted may be fewer than M.

ii) The terminal may maintain the same slot index for repetition during a slot available for a specific number of repeated PUCCH transmissions. In addition, the terminal may sequentially increase the slot index for repetition for each slot available for the specific number of repeated PUCCH transmissions. The specific number may be the number of PUCCHs including a DRMS used for joint channel estimation. Based on a slot of a first repeatedly transmitted PUCCH, slot indices for repetition of M slots may be determined to be 0. Thereafter, a slot index for repetition of a repeatedly transmitted PUCCH may be sequentially increased in every M slots. Referring to FIG. 50, the base station may configure, for the terminal, that N is 4 and M is 2, and may configure repeated PUCCH transmission from slot n. In this case, slot n+1 is a slot unavailable for PUCCH transmission, and slot n, slot n+2, slot n+3, and slot n+4 may be slots available for PUCCH transmission. Based on the M value (2), the terminal may determine slot indices for repetition of slots n and n+2 to be 0 and may determine slot indices for repetition of slots n+3 and n+4 to be 1. Therefore, the terminal may transmit PUCCHs of slot n and n+2 with the slot index for repetition of 0 in the first hop, and may transmit PUCCHs of slots n+3 and n+4 with a slot index for repetition of 1 in the second hop.

For joint channel estimation, PUCCHs should be transmitted in the same PRB of consecutive slots. For example, referring to FIG. 48, PUCCHs configured in two consecutive slots of slot n and slot n+1 are transmitted in the first hop, and DMRSs included in the PUCCHs configured in slot n and slot n+1 may be thus used for joint channel estimation. Similarly, PUCCHs configured in two consecutive slots of slot n+2 and slot n+3 are transmitted in the second hop, and DMRSs included in the PUCCHs configured in slot n+2 and slot n+3 may be thus used for joint channel estimation. Referring to FIG. 49, PUCCHs configured in two consecutive slots of slot n+2 and slot n+3 are transmitted in the second hop, and DMRSs included in the PUCCHs configured in slot n+2 and slot n+3 may be thus used for joint channel estimation. However, although PUCCHs configured in slot n and slot n+4 are transmitted in the first hop, since slot n and slot n+4 are not consecutive in the time domain, DMRSs included in the PUCCHs configured in slot n and slot n+4 cannot be used for joint channel estimation. Referring to FIG. 50, PUCCHs configured in two consecutive slots of slot n+3 and slot n+4 are transmitted in the second hop, and DMRSs included in the PUCCHs configured in slot n+3 and slot n+4 may be thus used for joint channel estimation. However, although PUCCHs configured in slot n and slot n+2 are transmitted in the first hop, since slot n and slot n+2 are not consecutive in the time domain, DMRSs included in the PUCCHs configured in slot n and slot n+2 cannot be used for joint channel estimation.

In order for DMRSs to be used for joint channel estimation, DMRSs included in PUCCHs need to be transmitted in the same hop in consecutive slots.

Referring to FIG. 51, the base station may configure, for the terminal, that N is 4 and M is 2, and may configure repeated PUCCH transmission from slot n. In this case, slot n+1, slot n+2, and slot n+5 may be slots unavailable for PUCCH transmission, and slot n, slot n+3, slot n+4, and slot n+6 may be slots available for PUCCH transmission. Since the terminal needs to transmit PUCCHs on 4 slots, the PUCCHs may be transmitted in slot n, slot n+3, slot n+4, and slot n+6. Referring to FIG. 51(*a*), slot indices for repetition may be configured according to i) described above. Slot indices for repetition of slot n and slot n+1 may be configured to be 0, slot indices for repetition of slot n+2 and slot n+3 may be configured to be 1, slot indices for repetition of slot n+4 and slot n+5 may be configured to be 2, and a slot index for repetition of slot n+6 may be configured to be 3. Therefore, the PUCCHs configured in slot n and slot n+4 with slot indices for repetition corresponding to even numbers may be transmitted in the first hop, and the PUCCHs configured in slot n+3 and slot n+6 with slot indices for repetition corresponding to odd numbers may be transmitted in the second hop. Referring to FIG. 51(b), slot indices for repetition may be configured according to ii) described above. Slot indices for repetition of slot n and slot n+3 may be configured to be 0, and slot indices for repetition of slot n+4 and slot n+6 may be configured to be 1. Therefore, the PUCCHs configured in slot n and slot n+3 with slot indices for repetition corresponding to even numbers may be transmitted in the first hop, and the PUCCHs configured in slot n+4 and slot n+6 with slot indices for repetition corresponding to odd numbers may be transmitted in the second hop. According to FIG. 51(a) and FIG. 51(b), PUCCHs configured in slot n+3 and slot n+4 may be transmitted in different hops.

Referring to FIG. 52, the base station may configure, for the terminal, that N is 8 and M is 2, and may configure repeated PUCCH transmission from slot n. Slot n+3, slot n+4, and slot n+7 are slots unavailable for PUCCH transmission, and slot n, slot n+1, slot n+2, slot n+5, slot n+6, slot n+8, slot n+9, and slot n+10 are slots available for PUCCH transmission. Since the terminal needs to transmit PUCCHs on 8 slots, the PUCCHs may be transmitted in slot n, slot n+1, slot n+2, slot n+5, slot n+6, slot n+8, slot n+9, and slot n+10. Referring to FIG. 52(a), slot indices for repetition may be configured according to i) described above. Slot indices for repetition of slot n and slot n+1 may be configured to be 0, slot indices for repetition of slot n+2 and slot n+3 may be configured to be 1, slot indices for repetition of slot n+4 and slot n+5 may be configured to be 2, slot indices for repetition of slot n+6 and slot n+7 may be configured to be 3, slot indices for repetition of slot n+8 and slot n+9 may be configured to be 4, and a slot index for repetition of slot n+10 may be configured to be 5. Therefore, the PUCCHs configured in slot n, slot n+1, slot n+5, slot n+8, and slot n+9 with slot indices for repetition corresponding to even numbers may be transmitted in the first hop, and the PUCCHs configured in slot n+2, slot n+6, and slot n+10 with slot indices for repetition corresponding to odd numbers may be transmitted in the second hop. Referring to FIG. 52(b), slot indices for repetition may be configured according to ii) described above. Slot indices for repetition of slot n and slot n+1 may be configured to be 0, slot indices for repetition of slot n+2 and slot n+5 may be configured to be 1, slot indices for repetition of slot n+6 and slot n+8 may be configured to be 2, and slot indices for repetition of slot n+9 and slot n+10 may be configured to be 3. Therefore, the PUCCHs configured in slot n, slot n+1, slot n+6, and slot n+8 with slot indices for repetition corresponding to even numbers may be transmitted in the first hop, and the PUCCHs configured in slot n+2, slot n+5, slot n+9, and slot n+10 with slot indices for repetition corresponding to odd numbers may be transmitted in the second hop. Referring to FIG. 52, PUCCHs configured in consecutive slots of slot n+5 and slot n+6 may be transmitted in different hops. According to FIG. 51 and FIG. 52, even if PUCCHs are configured in consecutive slots, different slot indices for repetition are configured and the PUCCHs are thus transmitted in different hops. Therefore, DMRSs included in the PUCCHs configured in consecutive slots cannot be used for joint channel estimation. Hereinafter, descriptions will be provided for a method of using DRMSs included in PUCCHs configured in consecutive slots, for joint channel estimation.

iii) The terminal may configure, with the same slot index for repetition, slots available for joint channel estimation from among a specific number of slots available for transmitting repeatedly transmitted PUCCHs. The slots available for joint channel estimation may be consecutive slots in the time domain from among slots available for transmitting repeatedly transmitted PUCCHs. The specific number may be the number of PUCCHs including a DMRS used for joint channel estimation. The terminal may configure the same slot index for repetition by grouping M consecutive slots among slots available for PUCCH transmission. In addition, slot indices for repetition of consecutive slots among slots available for PUCCH transmission may be sequentially increased every M slots. In this case, if the number of consecutive slots is fewer than M, the same slot index for repetition may be configured for the consecutive slots fewer than M. Inconsecutive slots may be configured with different slot indices for repetition. Slot indices for repetition of an earliest slot among inconsecutive slots and subsequent slots may be sequentially indexed. If a slot index for repetition of a slot configured for a first repeatedly transmitted PUCCH, which is configured (indicated) by the base station, is 0, and there are M slots consecutive to the slot configured for the first PUCCH, slot indices for repetition of M slots may be 0. Thereafter, slot indices for repetition of M slots consecutive from the slot available for PUCCH transmission may be 1. If there are not M consecutive slots, that is, if there is an inconsecutive slot, the terminal may obtain consecutive slots after the inconsecutive slot. For example, if a slot index for repetition of a slot preceding the inconsecutive slot is X, a slot index for repetition of a first slot among consecutive slots after the inconsecutive slot may be X+1. Similarly, slot indices for repetition of M consecutive slots including a first slot among consecutive slots after the inconsecutive slot may be X+1. Referring to FIG. 53(a), the terminal may configure the same slot index for repetition by grouping two (M=2) consecutive slots available for PUCCH transmission. Since slot n+1 and slot n+2 are slots unavailable for PUCCH transmission, a slot used for PUCCH transmission consecutive to slot n does not exist. Therefore, only slot n may be configured with slot index for repetition 0. A slot index for repetition of slot n+3, which is a first slot used for PUCCH transmission after slot n, may be configured to be 1. Since slot n+3 and a subsequent slot of slot n+4 are consecutive, slot indices for repetition of slot n+3 and slot n+4 may be configured to be the same. A slot index for repetition of slot n+6, which is a slot used for PUCCH transmission after slot n+4, may be configured to be 2 (due to slot n+5 being unavailable for PUCCH transmission). Therefore, the terminal may transmit, in the first hop, the PUCCHs configured in slot n and slot n+6 with slot indices for repetition corresponding to even numbers, and may transmit, in the second hop, the PUCCHs configured in slot n+3 and slot n+4 with slot indices for repetition corresponding to odd numbers. In comparison with the description in FIG. 51, since the PUCCHs configured in slot n+3 and slot n+4 are transmitted in the same hop, DMRSs configured in the PUCCHs may be used for joint channel estimation. Referring to FIG. 53(b), the terminal may configure 0 as a slot index for repetition of a first repeatedly transmitted PUCCH, and may configure 0 as a slot index for repetition of slot n+1 consecutive to slot n among slots available for PUCCH transmission. After slot n+1, a slot index for repetition of slot n+2, which is an earliest slot available for PUCCH transmission, may be configured to 1. There is no slot available for PUCCH transmission consecutive to slot n+2 (slot n+3 and slot n+4 are slots unavailable for PUCCH transmission). Therefore, after slot n+2, a slot index for repetition of slot n+5, which is an earliest slot available for PUCCH transmission, may be configured to 2. In addition, a slot index for repetition of slot n+6, which is a slot adjacent to slot n+5, may be indexed identically to slot n+5.

Figure 54:
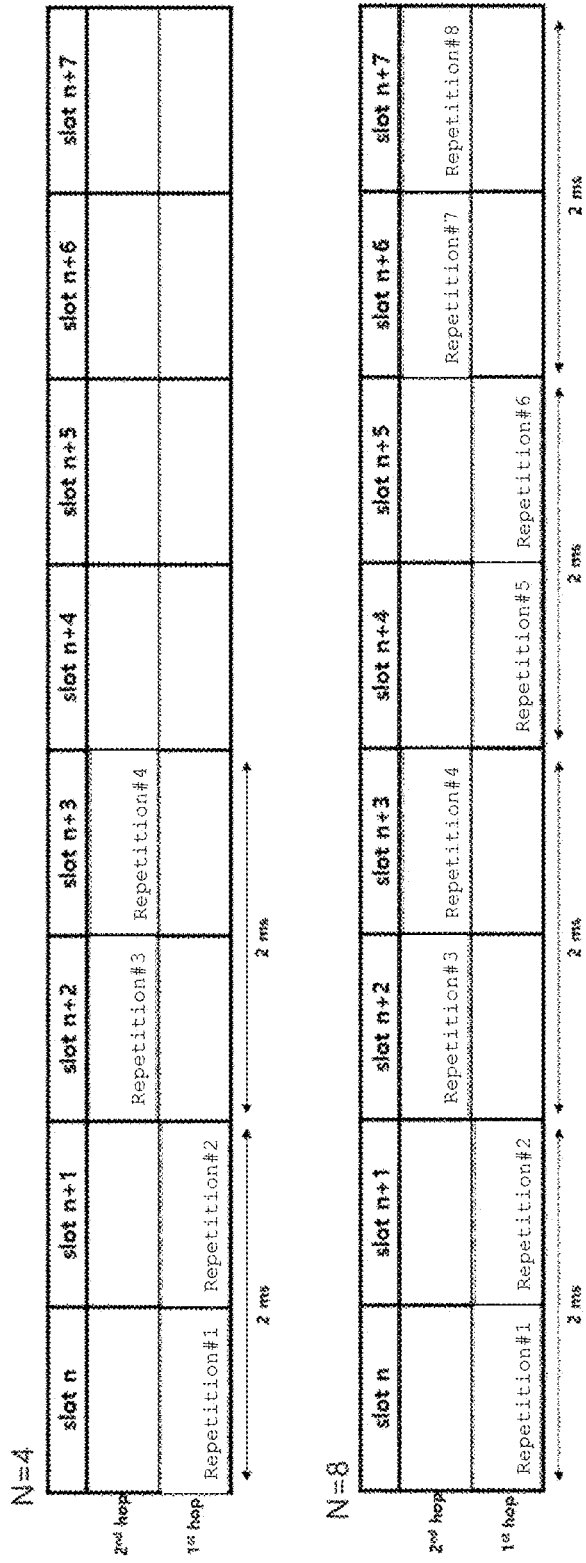
Figure 55:
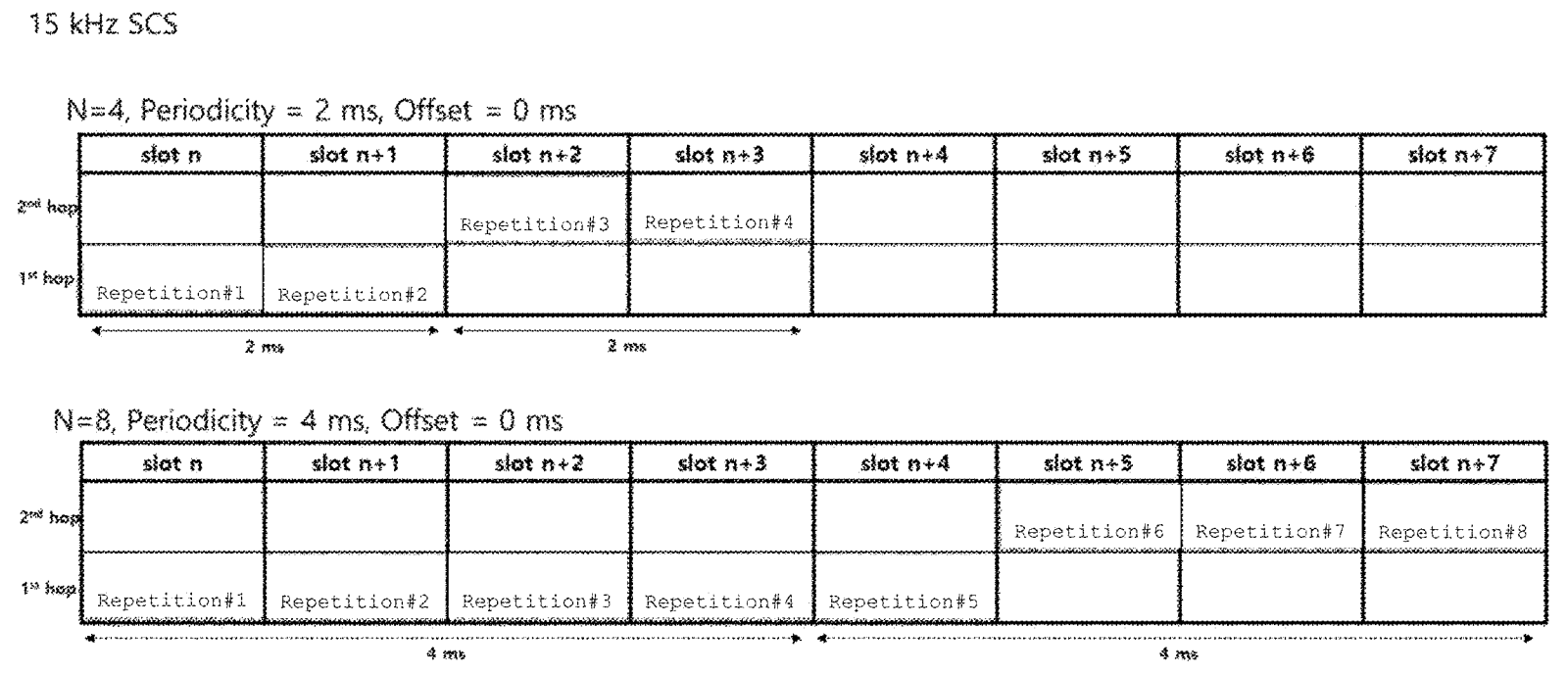

FIG. 54 to FIG. 59 illustrate a method of mapping PUCCH repetitions to frequency hops according to an embodiment of the present disclosure.

iv) A base station may configure (indicate), for a terminal, an offset and a period of a time window for frequency hopping. The terminal may apply the period and offset to slots configured for repeated PUCCH transmission, and may map PUCCHs within the period to the same hop so as to transmit the PUCCHs. In this case, the base station may configure (indicate) the period and offset regardless of repeated PUCCH transmission. Referring to FIG. 54, the base station may configure N to be 4 or 8 in a cell with a subcarrier spacing of 15 kHz, and may configure a period to be 2 ms and an offset to be 0 ms regardless of the N value. Accordingly, when N is 4 or 8, the terminal may transmit two PUCCHs by mapping the same to one hop. The base station may configure (indicate) another period and offset for the terminal according to the number of repeated PUCCH transmissions. Referring to FIG. 55, the base station may configure, for the terminal, that in a cell with a subcarrier spacing of 15 kHz, if N is 4, a period is 2 ms and an offset is 0 ms, and if N is 8, a period is 4 ms and an offset is 0 ms. Accordingly, if N is 4, the terminal may map two repeatedly transmitted PUCCHs to one hop so as to transmit the same, and if N is 8, the terminal may map four repeatedly transmitted PUCCHs to one hop so as to transmit the same.

The number of slots (N) in which PUCCHs are repeatedly transmitted and the number (M) of slots (or a specific number to determine a slot index for repetition) included in one hop may be explicitly configured or implicitly configured by the base station. Hereinafter, a method of configuring N and M will be described in more detail.

N and M Configuration Method i) The terminal may map, to the same frequency hop, PUCCHs repeatedly transmitted during a preconfigured number of slots so as to transmit the same. In this case, M may be configured regardless of the number of repeated PUCCH transmissions. Referring to FIG. 56, if the terminal is configured with the number (N) of repeated PUCCH transmissions of 2, 4, or 8, M may be configured to be 2 regardless of the number of repeated transmissions. That is, the terminal may map, to one hop, two slots of repeatedly transmitted PUCCHs and transmit the same regardless of the number of repeated transmissions.

ii) The terminal may map, to the same frequency hop, PUCCHs repeatedly transmitted during a preconfigured number of slots so as to transmit the same. In this case, M may be configured differently according to the number of repeated PUCCH transmissions. In this case, M may be configured by a function of N. Accordingly, flexible frequency hopping may be possible for repeatedly transmitted PUCCHs according to the number of repeated transmissions. Referring to FIG. 57, M may be configured to be 1 if N is 2, M may be configured to be 2 if N is 4, and M may be configured to be 4 if N is 8. That is, 1 slot may be mapped to one hop if N is 2, 2 slots may be mapped to one hop if N is 4, and 4 slots may be mapped to one hop if N is 8.

Figure 58:
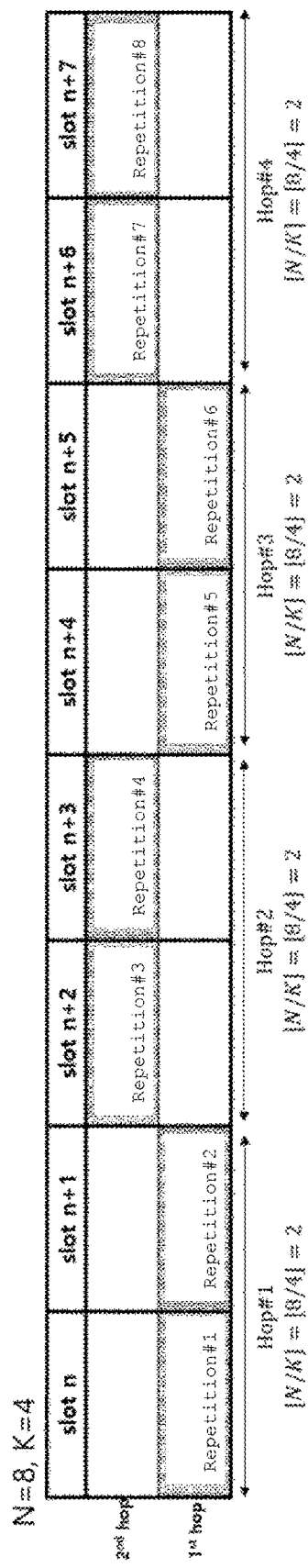
Figure 59:
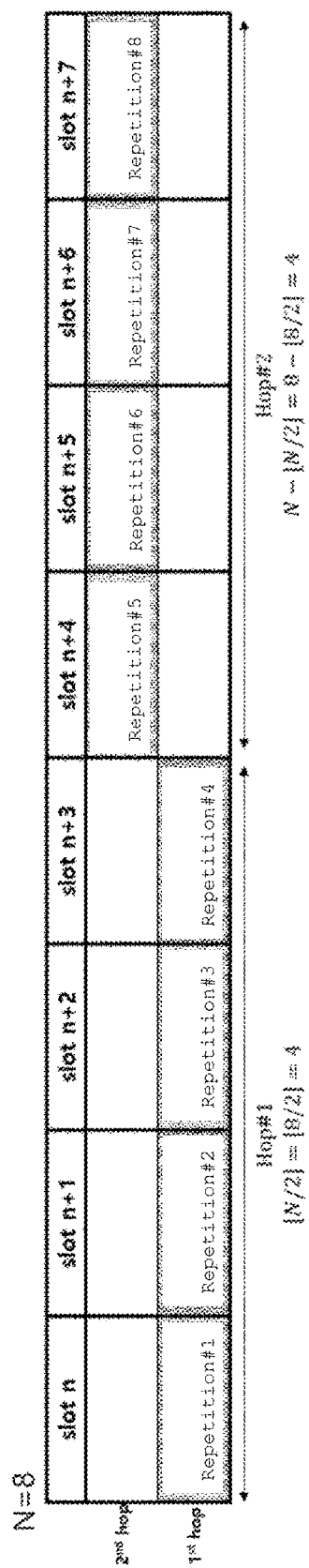

Hereinafter, descriptions will be provided for a method in which the terminal performs repeated PUCCH transmission via frequency hopping without a separate configuration of M from the base station.

iii) The terminal may perform repeated PUCCH transmission via frequency hopping, based on the number of hops. The terminal may determine the number of hops to which repeatedly transmitted N PUCCHs are mapped for transmission, and may determine PUCCHs mapped to each hop. In this case, the number of hops may refer to the number of PUCCHs satisfying a condition for joint channel estimation. Referring to FIG. 54, when N is 8, there may be a total of four hops that are a first hop (repetition #1, repetition #2), a second hop (repetition #3, repetition #4), a third hop (repetition #5, repetition #6), and a fourth hop #4 (repetition #7, repetition #8).

iii-a) The base station may configure the number of hops for the terminal, and the terminal may perform repeated PUCCH transmission via frequency hopping, based on the configured number of hops. Specifically, the terminal may map repeatedly transmitted N PUCCHs to K hops and transmit the same. For example, the terminal may map floor(N/K) PUCCHs in ascending order from the first hop to an (K−1)th hop and may map ceil(N/K) PUCCHs in ascending order to a K-th hop, so as to transmit the same. Referring to FIG. 58, if the number (N) of repeated PUCCH transmissions is 8 and the number (K) of hops is configured to be 4, the terminal may map 2(floor(8/4))PUCCHs to frequency hops #1, #2, and #3 and may map 2(ceil(8/4)) PUCCHs to frequency hop #4, so as to transmit the same. That is, the terminal maps repetition #1 and repetition #2 to hop #1, maps repetition #3 and repetition #4 to hop #2, maps repetition #5 and repetition #6 to hop #3, and maps repetition #7 and repetition #8 to hop #4, so as to transmit the same. According to another embodiment, the terminal may map ceil(N/K) PUCCH repetitions to the first hop in ascending order, and may map floor(N/K) PUCCH repetitions in ascending order from the second hop to the K-th hop, so as to transmit the same.

iii-b) The terminal may map PUCCHs which are repeatedly transmitted always in the same number of hops without configuration of the number of hops from the base station, so as to transmit the PUCCHs via frequency hopping. If iii-b) is used, when frequency hopping and joint channel estimation are applied together, a maximum possible number of repeatedly transmitted PUCCHs may be distributed and transmitted in equal frequency hops. The terminal may always divide N repeatedly transmitted PUCCHs into two hops and transmit the same. Floor(N/2) PUCCHs may be mapped to the first hop in ascending order, and N-floor (N/2) PUCCHs may be mapped to the second hop in ascending order. Referring to FIG. 59, when the number (N) of repeated PUCCH transmissions is 8, the terminal may map 4 (floor(8/2)) PUCCHs to hop #1 and may map 4 (ceil(8/2)) PUCCHs to hop #2, so as to transmit the same. That is, repetition #1, repetition #2, repetition #3, and repetition #4 may be mapped to hop #1, and repetition #5, repetition #6, repetition #7, and repetition #8 may be mapped to hop #2. As another embodiment, the terminal may map ceil(N/2) PUCCHs to the first hop in ascending order and may map floor(N/2) PUCCHs to the second hop in ascending order, so as to transmit the same.

Figure 60:
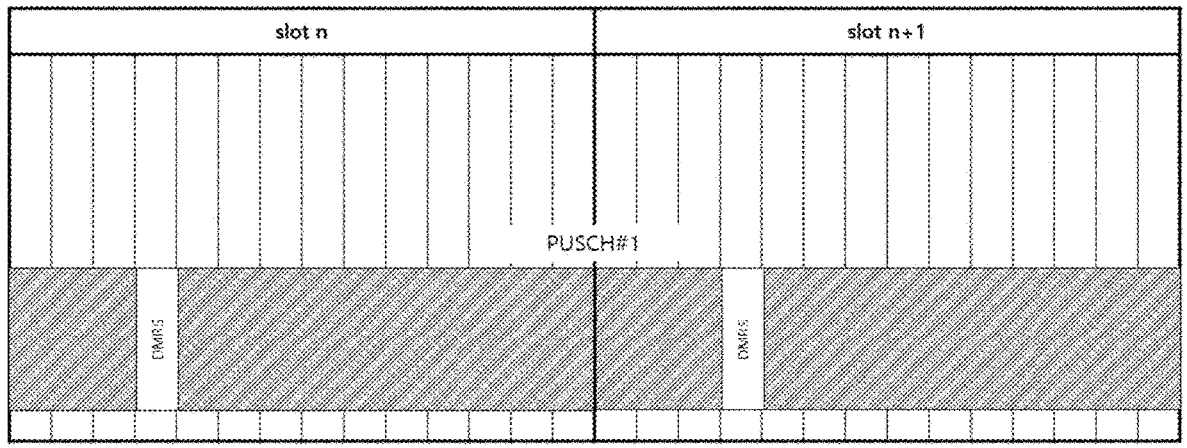
FIG. 60 illustrates scheduling of one physical uplink shared channel according to an embodiment of the present disclosure.

FIG. 60 illustrates scheduling of one physical uplink shared channel according to an embodiment of the present disclosure.

A PUSCH including a DMRS available for joint channel estimation may be a PUSCH including one transport block. A transport block size (TB size (TBS)) may be determined based on one slot or multiple slots. Referring to FIG. 60, a terminal may determine, as one TBS, two slots of slot n and slot n+1, for which PUSCH #1 is configured. In this case, DMRSs are included in different slots, but if the aforementioned joint channel estimation condition is satisfied, the DMRSs may be used for joint channel estimation.

Figure 61:
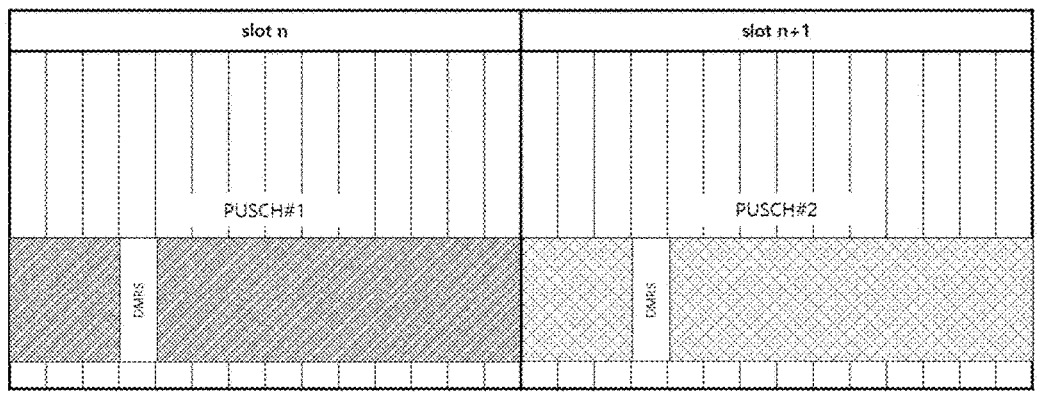
FIG. 61 illustrates scheduling of multiple physical uplink shared channels according to an embodiment of the present disclosure.

FIG. 61 illustrates scheduling of multiple physical uplink shared channels according to an embodiment of the present disclosure.

a) PUSCHs including DMRSs available for joint channel estimation may be repeatedly transmitted PUSCHs including one transport block. A transport block size may be determined based on one slot, and the PUSCHs may be repeatedly transmitted on multiple slots. For example, the terminal may transmit PUSCH repetition 1 in slot n and may transmit PUSCH repetition 2 in slot n+1. In this case, DMRSs are transmitted in different slots (slot n to slot n+1), but if the aforementioned joint channel estimation condition is satisfied, the DMRSs may be used for joint channel estimation. b) The PUSCHs may be PUSCHs including different transport blocks. In this case, the PUSCHs may be scheduled or activated via different DCI. Alternatively, the PUSCHs may be PUSCHs including different transport blocks scheduled or activated via one piece of DCI. For example, referring to FIG. 61, the base station may configure the terminal to transmit PUSCH #1 in slot n and transmit PUSCH #2 in slot n+1. In this case, each of PUSCH #1 and PUSCH #2 may be scheduled via different DCI. DMRSs included in respective PUSCH #1 and PUSCH #2 are transmitted in different slots (slot n to slot n+1), but if the aforementioned joint channel estimation condition is satisfied, the DMRSs may be used for joint channel estimation.

The base station may configure, for the terminal, a time domain window (or bundling window) for joint channel estimation. In this case, the base station may configure a DMRS to satisfy the aforementioned joint channel estimation condition, the DMRS being included in an uplink channel (PUCCH or PUSCH) transmitted in a specific time domain window. The described PUCCH or PUSCH may be repeatedly transmitted within a time domain window. In this case, the PUCCH or PUSCH may include one transport block or may include different transport blocks. In this case, the time domain window may be explicitly configured or implicitly configured by the base station. Hereinafter, a method of determining a time domain window will be described.

Time Domain Window Determination Method

Figure 62:
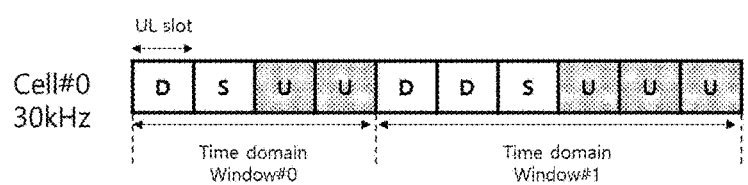
FIG. 62 illustrates a method of determining a time domain window according to an embodiment of the present disclosure.

FIG. 62 illustrates a method of determining a time domain window according to an embodiment of the present disclosure.

i) The base station may explicitly transmit information on a time domain window to the terminal, and the terminal may determine the time domain window, based on the transmitted information on the time domain window. In this case, information on the time domain window may be information on a duration of the time domain window, and may specifically include at least one information of the number of slots, the number of symbols, and the number of repeated uplink channel transmissions. The terminal may transmit a PUCCH or PUSCH to satisfy a joint channel estimation condition in a time domain window configured by the base station. If the terminal receives information on the time domain window from the base station, the terminal needs to determine a time point at which the time domain window starts.

i-a) A time point at which a time domain window starts may be a first symbol of a first slot of radio frame index 0. For example, if a duration of the time domain window is 5 slots, the time domain window may be determined by grouping 5 slots from the first slot of radio frame index 0. In this case, an index of the first slot of radio frame index 0 may be 0.

i-b) A time point at which a time domain window starts may be a first uplink symbol of a first uplink slot of radio frame index 0. An uplink slot refers to a slot including only an uplink symbol. For example, if a duration of the time domain window is 5 slots, the time domain window may be determined by grouping 5 slots from the first uplink slot of radio frame index 0.

i-c) A time point at which a time domain window starts may be a first non-downlink symbol of a first non-downlink slot of radio frame index 0. A non-downlink slot may be a slot including at least one non-downlink symbol. A non-downlink symbol is a symbol other than a downlink symbol, and may be an uplink symbol or a flexible symbol. For example, if a duration of the time domain window is 5 slots, the time domain window may be determined by grouping 5 slots from the first non-downlink slot of radio frame index 0.

i-d) The base station may configure, for the terminal, an offset value for determination of a time point at which a time domain window starts. An offset value may be at least one of the number of slots, the number of symbols, and the number of repeated uplink channel transmissions. For example, if the offset value is X slots, X symbols, or X repetitions, the time domain window may be configured by grouping durations corresponding to X slots, X symbols, or X repetitions. In this case, the X value may be a value smaller than a duration of the time domain section.

The base station may configure information (duration information) on multiple time domain windows for the terminal. Referring to FIG. 62, when a base station configures TDD for a terminal, two patterns may be configured. In this case, different periods may be configured for the two patterns, respectively. If a period of a first pattern is P1 and a period of a second pattern is P2, P1+P2 may be a value of one of divisors of 20. Each pattern may include a DL symbol, a UL symbol, and a flexible symbol, and may be configured in the order of a DL symbol, a flexible symbol, and a UL symbol. Referring to FIG. 62, the base station may configure P1 to be 2 ms and P2 to be 3 ms, and may configure a subcarrier spacing to be 30 KHz. In this case, the base station may configure, for the terminal, multiple patterns constituting the time domain. In this case, if only one time domain window is configured for multiple patterns, the configured one time domain window may not be suitable for multiple patterns. Accordingly, the base station may configure, for the terminal, multiple time domain windows corresponding to respective multiple patterns. Specifically, the base station may configure, for the terminal, a time domain window configured by the first pattern and a time domain window configured by the second pattern, i.e., two time domain windows. In this case, a duration of a first time domain window may be configured to be X1 slots, X1 symbols, and X1 repetitions, and a duration of a second time domain window may be configured to be X2 slots, X2 symbols, and X2 repetitions. The terminal may configure time domain window #0 based on X1 slots, X1 symbols, or X1 repetitions and may configure time domain window #1 based on X2 slots, X2 symbols, or X2 repetitions, from a time point at which the time domain window starts. That is, multiple time domain windows having different durations may be configured. In this case, the values of X1 and X2 may be values configured by the base station for the terminal. On the other hand, information on time domain windows indicated by X1 and X2 values may not be explicitly indicated by the base station and may be inferred by the terminal. That is, X1 may correspond to period P1, and X2 may correspond to period P2. Each of the first pattern and the second pattern may be a time domain window. Therefore, a DMRS included in a slot constituting the first pattern may be used for joint channel estimation, and a DMRS included in a slot constituting the second pattern may be used for joint channel estimation.

- ii) The terminal may determine a time domain window without receiving explicit information on the time domain window from the base station. That is, if the terminal does not receive explicit information on a time domain window from the base station, the terminal may implicitly determine a specific period as a time domain window.
- ii-a) The terminal may implicitly determine a time domain window, based on the number of repeated PUCCH or PUSCH transmissions. That is, the terminal may determine a time domain window from a time point at which repeated PUCCH or PUSCH transmission starts to a time point at which the repeated transmission ends. In other words, since the repeatedly transmitted PUCCHs or PUSCHs are transmitted within the same time domain window, DMRSs included in the PUCCHs or PUSCHs in this case may be used for joint channel estimation.
- ii-b) The terminal may implicitly determine a time domain window, based on a slot configuration. That is, the terminal may determine a time domain window according to a slot configuration in an unpaired spectrum.
- ii-c) The terminal may implicitly determine a time domain window, based on consecutive uplink slots.
- ii-d) The terminal may implicitly determine a time domain window, based on consecutive non-downlink slots.

One or more slots or symbols may be included between resource areas (e.g., slots) in which repeated uplink channel transmission is configured. Specifically, one or more slots or symbols may be included between a resource area in which a repeatedly transmitted first PUSCH/PUCCH is configured and a resource area in which a repeatedly transmitted second PUSCH/PUCCH is configured. In this case, one or more slots or symbols may be a maximum of X slots or symbols. In this case, X may be a value configured by the base station. One or more slots or symbols may be resources that are not used for uplink channel transmission. That is, a certain period (gap) may exist between resource areas in which repeatedly transmitted uplink channels are configured. In other words, a time domain window may be determined based on a certain gap existing between resource areas in which repeatedly transmitted uplink channels are configured.

When the terminal determines a time domain window, based on consecutive uplink slots or non-downlink slots, if the number of slots constituting one time domain window is large, this may be disadvantageous in terms of terminal or base station complexity. Accordingly, one time domain window may be divided into multiple sub-time domain windows. In this case, DMRSs included in PUSCHs or PUCCHs transmitted in sub-time domain windows may be available for joint channel estimation.

Sub-Time Domain Window Determination Method

- i) One time domain window may be divided based on a duration of a sub-time domain window. The base station may transmit duration information on a sub-time domain window to the terminal, and the terminal may divide a time domain window into multiple sub-time domain windows, based on the received duration information. In this case, the duration information may be at least one of the number of slots, the number of symbols, and the number of repeated uplink channel transmissions. Specifically, if a duration of a time domain window is N (N slots/symbols/repetitions) and a duration of a sub-time domain window is M (M slots/symbols/repetitions), the terminal may determine a first sub-time domain window by grouping a first slot/symbol/repetition to an M-th slot/symbol/repetition. In addition, the terminal may determine a second sub-time domain window by grouping an (M+1)th slot/symbol/repetition to a 2M-th slot/symbol/repetition. In this case, the number of slots/symbols/repetitions included in a last sub-time domain window may be fewer than M. Similarly, the terminal may determine an M-th sub-time domain window by grouping a (k*M+1)th slot/symbol/repetition to the remaining (N-th) slots/symbols/repetitions. In this case, the number of slots/symbols/repetitions included in the M-th sub-time domain window may be fewer than M. In this case, k may be calculated with floor(N/M).
- ii) A time domain window may be divided based on the number of sub-time-domain windows. That is, the terminal may receive information on the number of sub-time domain windows from the base station, and the terminal may divide a time domain windows into the number of sub-time domain windows. For example, if the time domain window is N (N slots/symbols/repetitions) and the number of sub-time domain windows is M, the number of slots/symbols/repetitions included in one sub-time domain window may be ceil(N/M) or floor(N/M). Specifically, (N mod M) sub-time domain windows may include ceil(N/M) slots/symbols/repetitions, and (M−(N mod M)) sub-time domain windows may include floor(N/M) slots/symbols/repetitions. As another example, the number of slots/symbols/repetitions included in M−1 sub-time domain windows may be floor(N/M), and the number of slots/symbols/repetitions included in one sub-time domain window may be N−(M−1)*floor(N/M). Here, A mod B refers to a remainder obtained by dividing A by B.

If the terminal determines a time domain window, based on consecutive uplink slots, a time domain window including uplink slots may be determined. In this case, it is necessary to determine a time domain window including a slot which is not an uplink slot but is available for uplink transmission. Specifically, it is necessary to determine a time domain window including a non-downlink slot. A non-downlink slot may be included in a time domain window of an adjacent uplink slot. For example, if slot n is a non-downlink slot and slot n+1 is an uplink slot, slot n may be included in a time domain window including slot n+1.

In the NR system, various subcarrier spacings may be configured, and therefore the described symbols/slots/repetitions for determination of a (sub-)time domain window may vary according to subcarrier spacings. Therefore, it is necessary to determine a subcarrier spacing for determination of a (sub-)time domain window. In the present specification, a subcarrier spacing that may be referenced to determine a time domain window is referred to as reference subcarrier spacing.

Reference Subcarrier Spacing Determination Method
  i) When the base station configures TDD for the terminal, the base station may also configure information on a subcarrier spacing. That is, the terminal may use the subcarrier spacing, which is configured together when the base station configures TDD, as a reference subcarrier spacing which may be referenced to determine a time domain window.
  ii) When the base station configures one or multiple UL BWPs of a cell for the target, subcarrier spacings of the one or multiple UL BWPs may be configured. When determining a time domain window, the terminal may use, as a reference subcarrier spacing, one value among one or multiple subcarrier spacings. For example, if multiple subcarrier spacings are configured, a smallest subcarrier spacing may be a reference subcarrier spacing.
  iii) When one UL BWP of each cell is activated, the terminal may use, as a reference subcarrier spacing, a subcarrier spacing of the activated UL BWP.
  iv) The terminal may use a random subcarrier spacing as a reference subcarrier spacing. A random subcarrier spacing may be determined differently for each frequency range (FR). A random subcarrier spacing may be one value of subcarrier spacings available in each FR, and may be a lowest subcarrier spacing. For example, for FR1, since 15 kHz, 30 kHz, and 60 kHz are available for a subcarrier spacing, a reference subcarrier spacing may be 15 KHz. For FR2, since 60 kHz and 120 kHz are available for a subcarrier spacing, a reference subcarrier spacing may be 60 KHz.
  v) The base station may configure a reference subcarrier spacing of a cell for the terminal. In this case, the reference subcarrier spacing may not be greater than a subcarrier spacing configured in a UL BWP.

Hereinafter, descriptions will be provided for a method in which the terminal autonomously determines a time domain window and transmits information on the determined time domain window to the base station.

Method of Autonomous Time Domain Window Determination by Terminal
  i) The terminal may transmit information on a start time or an end time of a time domain window to the base station. For example, the terminal may inform, using a 1-bit value, the base station of information on the start time or end time of the time domain window. For example, the terminal may indicate a start time of a PUCCH or PUSCH by using "0" and may indicate a period other than the start time by using "1". Specifically, if resource areas in which PUCCHs or PUSCHs are transmitted within the time domain window is slot n to slot n+3, the terminal may indicate "0" with a 1-bit value for PUCCHs or PUSCHs transmitted in slot n, and may indicate "1" with a 1-bit value for PUCCHs or PUSCHs transmitted in slot n+1, slot n+2, and slot n+3. In this case, indication targets of the indication value "0" or "1" may be interchanged. A 1-bit value may be multiplexed in a PUSCH, and may be multiplexed in a PUSCH in the same manner as HARQ-ACK.
  ii) When a time domain window is changed, the terminal may transmit, to the base station, information on the time domain window via toggling. For example, if the terminal has transmitted a 1-bit value of "0" for a PUSCH or PUCCH transmitted in a first time domain window, the terminal may transmit a 1-bit value of "1" for a PUSCH or PUCCH transmitted in a second time domain window.

FIG. 63 to FIG. 66 illustrate a method of indicating a time domain window according to an embodiment of the present disclosure.

If a base station fails to receive a PUSCH or PUCCH in a time domain window indicated by a terminal, ambiguity may occur between the terminal and the base station with respect to the time domain window. Referring to FIG. 63A, the terminal may transmit information on a time domain window to the base station by using an autonomous interpretation method of terminal i). For example, the terminal may inform the base station of slots 0 to 3 as one time domain window and may inform of slot 4 or 5 as another time domain window. In this case, if the base station fails to receive a PUCCH or PUSCH in slots 3 and 4, the base station may determine slots 0 to 5 as one time domain window so as to perform joint channel estimation. Referring to FIG. 63B, the terminal may transmit information on a time domain window to the base station by using an autonomous interpretation method of terminal ii). For example, the terminal may inform the base station of slots 0 to 2 as one time domain window, may inform of slot 3 or 4 as another time domain window, and may inform of slot 5 as another time domain window. In this case, if the base station fails to receive a PUCCH or PUSCH in slots 3 and 4, the base station may determine slots 0 to 5 as one time domain window so as to perform joint channel estimation. In this case, since the PUCCH or PUSCH transmitted by the terminal does not satisfy the joint channel estimation condition, the base station may fail to perform channel estimation, and coverage performance cannot be improved. Therefore, a method of reducing ambiguity between a terminal and a base station with respect to a time domain window is required.

Method of Solving Ambiguity for Time Domain Window
  i) The terminal may transmit a counter indicator as information on a time domain window to the base station. That is, the terminal may transmit, to the base station, information on a symbol set number within one time domain window. In this case, the symbol set may include repeated transmission of uplink channels, symbols, and slots. Referring to FIG. 64(*a*), the terminal may indicate to the base station that joint channel estimation is possible via uplink DMRSs transmitted in slots 0 to 3 and joint channel estimation is possible via an uplink DMRS transmitted in slot 4 or 5. In this case, a starting slot available for joint channel estimation may be indicated with 0 via a counter indicator, and subsequent slots may be indicated with counter values of 1, 2, . . . , 3 in ascending order. Referring to FIG. 64(*b*), uplink DMRSs transmitted in slots 0 to 2 are available for joint channel estimation, and an uplink DMRS transmitted in slot 3 or 4 is available for joint channel estimation. In this case, the terminal may indicate, with 0 via a counter indicator, a starting slot available for joint channel estimation, and subsequent slots may be indicated by counter values in ascending order. Therefore, in FIG. 64(a) and FIG. 64(b), even when the base station fails to decode uplink transmissions in slots 3 and 4, it may be seen, via the counter indicator, that joint channel estimation is not possible for uplink transmissions in slots 2 and 5. This is because the counter indicator value of slot 2 and the counter indicator value of slot 5 do not satisfy an ascending order.

i-a) The terminal may transmit, to the base station, information on a total indicator as information for joint channel estimation, in addition to a counter indicator. In this case, the total indicator may indicate a symbol set included in one time domain window. A symbol set may include slots, symbols, and repeated repeated transmissions. Referring to FIG. 65(b), there may be cases in which the base station fails to receive uplink channels transmitted in slots 2 and 3. In this case, if only a counter indicator exists as information for joint channel estimation, ambiguity may occur between the base station and the terminal with respect to a time domain window. Therefore, the terminal may inform the base station of a total indicator in addition to a counter indicator, thereby reducing ambiguity in a time domain window. In (a, b) of each slot in FIG. 65(b), a is a value indicated by a counter indicator and b is a value indicated by a total indicator. That is, in slot 0, the counter indicator indicates 0 and a value indicated by the total indicator is 2. Slot 0 and slot 1 are in one time domain window including two symbol sets, and therefore slot 0 and slot 1 have the same total indicator value.

ii) The terminal may transmit information on an index of the time domain window to the base station. One time domain window is configured with the same index, and another time domain window is configured with a sequentially increased index, so that the terminal may inform the base station that the time domain windows are different time domain windows. Referring to FIG. 66, the terminal may inform the base station, via an identical index, that an uplink channel transmission is performed within the same time domain window, and may inform, via an increased index, that an uplink channel transmission is performed within another time domain window. This enables the base station to, when the base station fails to receive uplink channels transmitted in slot 3 and slot 4 as described with reference to FIG. 66(b), recognize the failure and request retransmission of the uplink channels from the terminal. That is, since indices of slots 0 to 2 and an index of slot 5 are different, the base station may recognize that slots 0 to 2 and slot 5 are included in different time domain windows.

Hereinafter, descriptions will be provided for a method of determining a time domain window when multiple uplink cells are configured for a terminal.

Figure 67:
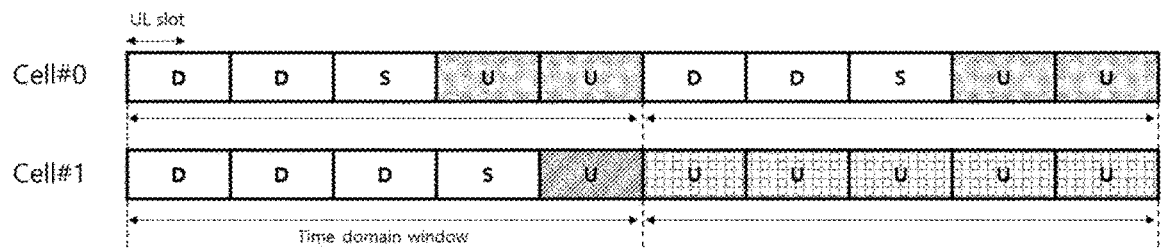
FIG. 67 and FIG. 68 illustrate a method of determining a time domain window in a carrier aggregation situation according to an embodiment of the present disclosure.
Figure 68:
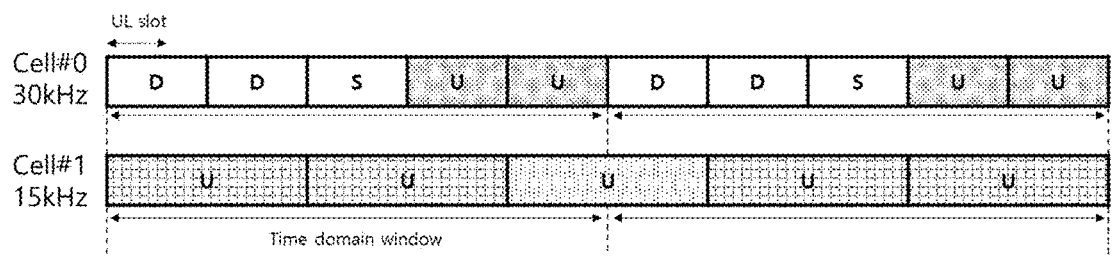

FIG. 67 and FIG. 68 illustrate a method of determining a time domain window in a carrier aggregation situation according to an embodiment of the present disclosure.

First, a terminal may be configured with multiple uplink cells from a base station. Configuration of multiple uplink cells may be described as uplink carrier aggregation. In this case, a cell configured for the terminal for the first time may be a primary cell (PCell), and a cell additionally configured, in addition to the PCell, may be a secondary cell (SCell). The terminal may transmit an uplink channel in the configured PCell or SCell. An uplink physical channel may be at least one of a PUSCH and a PUCCH. When transmitting uplink channels in multiple cells configured in the same frequency band, the terminal may share transmission power. When multiple uplink cells are configured for the terminal, configuration may be performed so that the described joint channel estimation conditions are satisfied. When uplink carrier aggregation is configured, if the terminal is configured with one time domain window, there is a problem of determining a time domain window to be applied in multiple cells. In this case, one configured time domain window may be a time domain window configured based on a PCell. If different TDD configurations are configured for respective cells, a time domain window configured based on a PCell may not be suitable for joint channel estimation for uplink channels transmitted on an SCell. Referring to FIG. 67, the terminal may be configured with two uplink cells of cell #0 and cell #1, and different TDD configurations may be configured for respective cells. A time domain window is configured based on cell #0, and time domain windows may be configured every 5 slots from a first slot in a certain frame. Although the number of consecutive uplink slots of cell #1 is 6, since time domain windows are configured every 5 slots, the time domain window configured based on cell #0 may not be suitable for cell #1.

The base station may configure different subcarrier spacings for multiple uplink cells. In this case, the subcarrier spacing may be a subcarrier spacing for a TDD configuration or a subcarrier spacing for a BWP configuration. In a carrier aggregation situation, if the subcarrier spacing for the TDD configuration of the SCell is smaller than the subcarrier spacing for the TDD configuration of the PCell, a boundary of a time domain configuration determined based on the PCell may not be accurately configured. Referring to FIG. 68, a subcarrier spacing for a TDD configuration may be configured to be 30 KHz in cell #0 and 15 kHz in cell #1. A time domain window for joint channel estimation may be determined based on cell #0 and may be configured every 5 slots or every 2.5 ms from a first slot within a radio frame. In this case, the same time domain window may be applied to cell #1. However, a boundary of the time domain window may be located within a third uplink slot of cell #1. Accordingly, some symbols of the third uplink slot of cell #1 may be included in a first time domain window and the remaining symbols may be included in a second time domain window. That is, if a subcarrier spacing for a TDD configuration of an SCell is smaller than a subcarrier spacing for a TDD configuration of a PCell, the time domain window may not be suitable. Therefore, a time domain window that is suitably applicable to all uplink cells in a carrier aggregation situation is required.

Method of Determining Time Domain Window in Carrier Aggregation Situation

Figure 69:
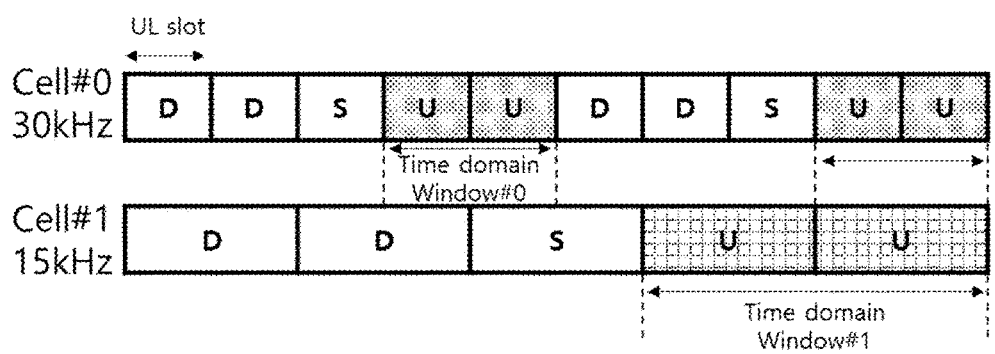
FIG. 69 to FIG. 74 illustrate a method of configuring a time domain window according to an embodiment of the present disclosure.
Figure 70:
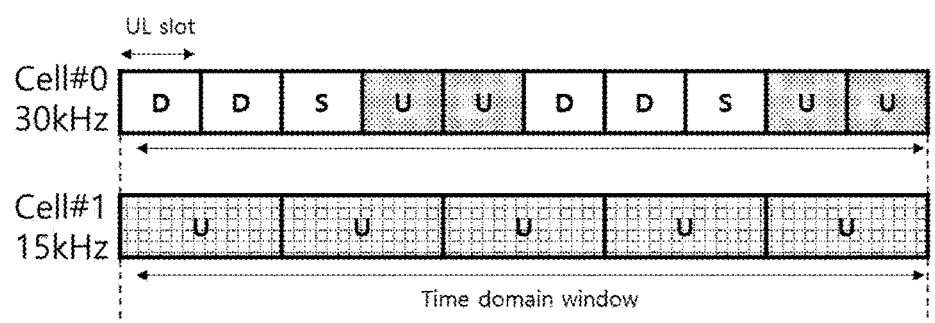
Figure 71:
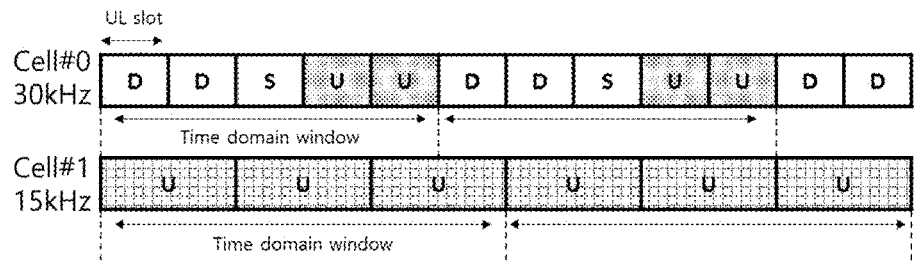

FIG. 69 to FIG. 74 illustrate a method of configuring a time domain window according to an embodiment of the present disclosure.

i) In a carrier aggregation situation, a base station may configure a separate time domain window for each of multiple cells. That is, when N uplink cells including a PCell are configured for a terminal, the base station may configure time domain windows applied to the N cells, respectively. Referring to FIG. 69, the terminal may be configured with cell #0 with a subcarrier spacing of 30 KHz and cell #1 with a subcarrier spacing of 15 KHz. Time domain window #0 and time domain window #1 may be configured for cell #0 and cell #1, respectively. Time domain window #0 may include two slots of 1 ms, and time domain window #1 may include two slots of 2 ms. In this case, in order to reduce signaling overhead, a specific parameter commonly applied to each cell may be used when the base station configures a time domain window for each cell.

i-a) A reference subcarrier spacing may be commonly used in each cell. That is, the base station may configure, for the terminal, only a reference subcarrier spacing for one time domain window. Alternatively, the terminal may implicitly infer a reference subcarrier spacing for one time domain window. In this case, the reference subcarrier spacing may be applied to all cells. The terminal may obtain subcarrier spacings for the time domain windows of respective cells. For example, the terminal may select one subcarrier spacing from among the obtained subcarrier spacings of respective cells and may apply the selected one subcarrier spacing to the time domain windows of all cells. In this case, the one subcarrier spacing may be a lowest subcarrier spacing among the subcarrier spacings of respective cells. As another example, the terminal may apply, to the time domain windows of all cells, the subcarrier spacing for the time domain window of the PCell among respective cells. As another example, the terminal may apply, to the time domain windows of all cells, a subcarrier spacing of a time domain window of a cell having a lowest index from among respective cells. As another example, the terminal may be configured with a reference subcarrier spacing applied to the time domain windows of all cells from the base station. In this case, the reference subcarrier spacing applied to the time domain windows of all cells, which is configured for the terminal, should not be larger than a subcarrier spacing configured in UL BWPs of all cells.

ii) The base station may be configured with a duration of a time domain window commonly applied to all cells. In this case, a duration of a time domain window may be described as a duration of a cell-common time domain window. A duration of the cell-common time domain window may be adjusted according to a reference subcarrier spacing and subcarrier spacings of the cells. That is, when a duration of the cell-common time domain window is M slots/symbols/repetitions, a duration of the time domain window applied to a cell may be f(M*(SCS_cell/SCS_refer)) slots/symbols/repetitions. SCS_refer is a reference subcarrier spacing, and SCS_cell is a subcarrier spacing of an applied cell. f(x) may be at least one of ceil(x), floor(x), and round(x). Referring to FIG. 70, cell #0 may be configured with a subcarrier spacing of 30 kHz, and cell #1 may be configured with a subcarrier spacing of 15 kHz. In this case, a reference subcarrier spacing may be configured with a subcarrier spacing of 15 kHz. A duration of the cell-common time domain window may be configured to be 5 slots. A duration of the time domain window applied to cell #0 may be 10 (f(5*(30 kHz/15 kHz))) slots/symbols/repetitions, and a duration of the time domain window applied to cell #1 may be determined to be 5 (f(5*(15 kHz/15 kHz))) slots/symbols/repetitions. Referring to FIG. 71, for example, cell #0 may be configured with a subcarrier spacing of 30 kHz, and cell #1 may be configured with a subcarrier spacing of 15 kHz. A reference subcarrier spacing may be configured to be 30 kHz. A cell-common time domain window may be configured to be 5 slots. In this case, if f(x) is ceil(x), a duration of the time domain window applied to cell #0 is 5 (ceil(5*(30 kHz/30 kHz))) slots/symbols/repetitions, and a duration of the time domain window applied to cell #1 may be determined to be 3 (ceil(5*(15 kHz/30 kHz))) slots/symbols/repetitions.

ii-a) The terminal may select one reference cell from among multiple uplink cells. In addition, a time domain window determined based on the selected reference cell may be applied to all cells. A method of determining a reference cell is as follows.

PCell: A reference cell may be a PCell. That is, the terminal may extend and apply a time domain window determined based on a PCell to an SCell.

The lowest cell index: A reference cell may be a cell having a lowest cell index. The lowest cell index may be 0. That is, a PCell may be a reference cell. The lowest cell index may be 1 or higher. That is, a cell having a lowest cell index from among SCells, except for a PCell, may be a reference cell.

The lowest SCS: A reference cell may be a cell configured with a lowest subcarrier spacing. As described with reference to FIG. 68, this is to prevent a case of a time domain window boundary being included in a slot of another cell. In this case, if there are multiple cells configured with a lowest subcarrier spacing, a reference cell may be selected in consideration of other criteria. Other criteria may be a cell index, a TDD configuration periodicity, and an uplink slot ratio. For example, if there are two cells configured with a lowest subcarrier spacing, a cell having a lower cell index among the two may be a reference cell.

Figure 72:
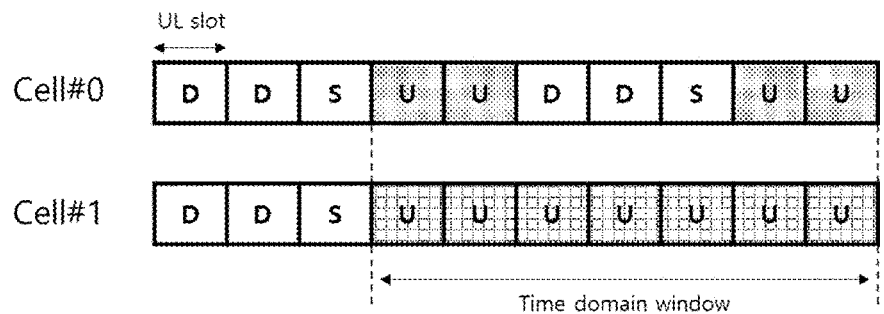

The longest TDD configuration periodicity: A reference cell may be a cell having a longest TDD configuration periodicity. A TDD configuration periodicity refers to a periodicity in which one TDD configuration according to 3GPP standards is repeated. Referring to FIG. 72, subcarrier spacings of all cells may be 15 KHz, a TDD configuration periodicity of cell #0 may be 5 ms, and a TDD configuration periodicity of cell #1 may be 10 ms. In order to include as many uplink slots as possible for multiple uplink cells, the terminal may determine, as a reference cell, a cell having a longest TDD configuration periodicity, and may apply a time domain window of the reference cell to all cells. Accordingly, since the TDD configuration periodicity of cell #0 is 5 slots and the TDD configuration periodicity of cell #1 is 10 slots, cell #1 is selected as a reference cell, and the time domain window of cell #1 may be applied to all cells. If there are multiple cells having the longest TDD configuration periodicity, a reference cell may be selected in consideration of other criteria. Other criteria may be a cell index, a subcarrier spacing, and an uplink slot ratio. If there are two cells having the longest TDD configuration periodicity, a cell having a lower SCS may be selected as a reference cell.

Figure 73:
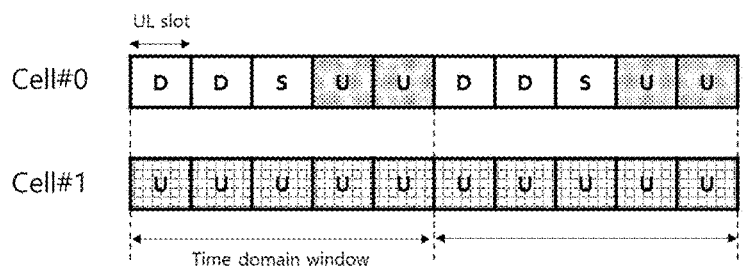
Figure 74:
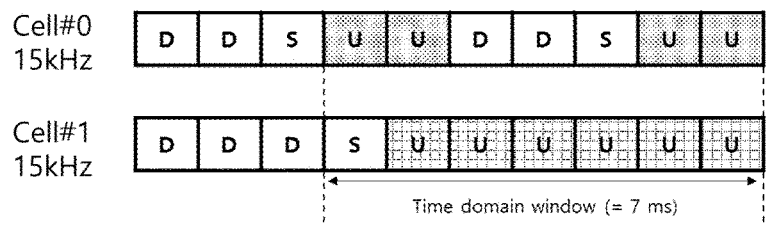

The most UL slot portion: A reference cell may be a cell including a largest number of UL slots. That is, the terminal may perform uplink transmission for joint channel estimation, by determining, as a reference cell, a cell having a largest number of uplink slots during the same time interval from among multiple uplink cells. The same time interval may be the longest TDD configuration periodicity of multiple cells. Referring to FIG. 73, cell #1 including more uplink slots compared to cell #0 may be a reference cell. If there are multiple cells having the largest number of uplink slots, a reference cell may be selected in consideration of other criteria. Other criteria may be a cell index, a subcarrier spacing, and a TDD configuration periodicity. If there are two cells including the largest number of uplink slots, a cell having a longer TDD configuration periodicity among the two may be selected as a reference cell.

iii) The terminal may determine a time domain window, based on consecutive slots in a union of uplink slots with respect to multiple uplink cells. In order to include, in a time domain window, as many configured TDD configurations as possible for multiple uplink cells, the terminal may determine the time domain window, based on consecutive slots in the union of multiple inter-cell uplink slots. A union of uplink slots refers to a slot including uplink symbols in at least one cell. Referring to FIG. 74, different TDD configurations may be configured for two uplink cells, wherein the two uplink cells have the same subcarrier spacing of 15 KHz. For cell #0 and cell #1, the terminal may determine the union of consecutive uplink slots, as one time domain window. That is, the terminal may determine one time domain window including a 4th slot, a 5th slot, a 9th slot, and a 10th slot of cell #0, and a 5th slot to a 10th slot of cell #1, and may apply the determined one time domain window to all cells.

Figure 75:
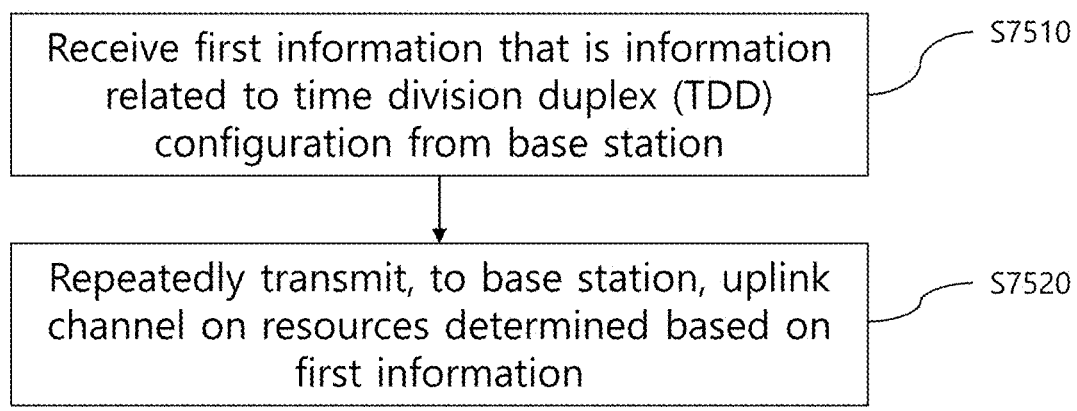
FIG. 75 is a flowchart illustrating a method of transmitting an uplink channel according to an embodiment of the disclosure.

FIG. 75 is a flowchart illustrating a method of transmitting an uplink channel according to an embodiment of the disclosure.

Hereinafter, the methods of transmitting an uplink channel by a terminal, described with reference to FIG. 1 to FIG. 74, will be described via FIG. 75.

A terminal may receive, from a base station, first information which is information related to a time division duplex (TDD) configuration, in S7510. The first information may include information on types of symbols constituting a slot, and the types of the symbols include one of a downlink symbol configured to be available for downlink transmission, an uplink symbol configured to be available for uplink transmission, and a flexible symbol configured to be neither the downlink symbol nor the uplink symbol. The terminal may repeatedly transmit an uplink channel to the base station on a resource determined based on the first information, in S7520. The uplink channel may be repeatedly transmitted in a first hop and a second hop. Each of the first hop and the second hop may be configured by bundling a preconfigured number of slots used for uplink channel transmission. The slots used for uplink channel transmission may include the uplink symbol. Each of the first hop and the second hop may include consecutive slots in the time domain, and each of the first hop and the second hop may be transmitted on a different physical resource block (PRBs) via frequency hopping. The preconfigured number may be received from the base station. Slots included in the first hop may be indexed with an identical index, and slots included in the second hop may be indexed with an identical index. If the number of the consecutive slots used for uplink channel transmission is fewer than the preconfigured number, the first hop or the second hop may include fewer consecutive slots than the preconfigured number. The slots used for uplink channel transmission include the uplink symbol and the flexible symbol. The first hop may include a first slot and a second slot, the first slot may include a first demodulation reference signal (DM-RS), the second slot may include a second DM-RS, and the first DM-RS and the second DM-RS may be transmitted on resources of the same number of PRBs starting at the same PRB position in the frequency domain, and may be transmitted using the same phase, the same transmission power, the same Quasi co-location (QCL), and the same beamforming. The second hop may include a third slot and a fourth slot, the third slot may include a third DM-RS, the fourth slot may include a fourth DM-RS, and the third DM-RS and the fourth DM-RS may be transmitted on resources of the same number of PRBs starting at the same PRB position in the frequency domain, and may be transmitted using the same phase, the same transmission power, the same Quasi co-location (QCL), and the same beamforming. That is, the DM-RSs included in the first and second slots may be combined and used for channel estimation, and similarly, the DM-RSs included in the third and fourth slots may be combined and used for channel estimation. At least one of the downlink symbol or the flexible symbol may exist between a last symbol to which the repeatedly transmitted uplink channel is mapped in the first slot, and a first symbol to which the repeatedly transmitted uplink channel is mapped in the second slot. At least one of the downlink symbol or the flexible symbol may exist between a last symbol to which the repeatedly transmitted uplink channel in the third slot is mapped and a first symbol to which the repeatedly transmitted uplink channel in the fourth slot is mapped. The uplink channel may be a physical uplink control channel (PUCCH) or a physical uplink shared channel (PUSCH).

The uplink channel may be transmitted within a time domain window. The terminal may receive information on the time domain window from the base station. In this case, the time domain window may be configured based on the information on the time domain window. The information on the time domain window may include one of the number of slots, the number of symbols, and the number of repeated transmissions of the uplink channel. The time domain window may be from a time point at which the repeated transmission of the uplink channel starts to a time point at which the repeated transmission of the uplink channel ends. The time domain window may include consecutive slots in the time domain, which include at least one of the uplink symbol and the flexible symbol. The time domain window may include a first time domain window and a second time domain window, the first time domain window may be configured to correspond to a first pattern, the second time domain window may be configured to correspond to a second pattern, the first pattern and the second pattern may include multiple slots, and multiple slot configurations for configuring each of the first pattern and the second pattern may be different from each other. DM-RSs included in the respective multiple slots constituting the first pattern may be transmitted on resources of the same number of PRBs starting at the same PRB position in the frequency domain, and may be transmitted using the same phase, the same transmission power, the same Quasi co-location (QCL), and the same beamforming. DM-RSs included in the respective multiple slots constituting the second pattern may be transmitted on resources of the same number of PRBs starting at the same PRB position in the frequency domain, and may be transmitted using the same phase, the same transmission power, the same Quasi co-location (QCL), and the same beamforming. That is, DM-RSs included in the multiple slots constituting the first pattern may be combined and used for channel estimation, and DM-RSs included in the multiple slots constituting the second pattern may be combined and used for channel estimation.

The terminal performing the method described with reference to FIG. 75 may be the terminal described with reference to FIG. 11. Specifically, the terminal may include a communication module configured to transmit or receive a radio signal, and a processor configured to control the communication module. In this case, the processor of the terminal may perform the method of transmitting an uplink channel, described in the present specification.

In addition, a base station receiving an uplink channel transmitted by a terminal, described in the present specification, may include a communication module configured to transmit or receive a radio signal, and a processor configured to control the communication module. In this case, the base station may be the base station described with respect to FIG. 11. The processor of the base station may perform the method of receiving an uplink channel, described in the present specification.

The method and system of the present disclosure are described in relation to specific embodiments, but configuration elements, a part of or the entirety of operations of the present disclosure may be implemented using a computer system having a general-purpose hardware architecture.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A terminal for performing wireless communication in a wireless communication system, the terminal comprising:
   a transceiver; and
   a processor configured to control the transceiver,
   wherein the processor is configured to:
   receive slot configuration information,
   repeatedly transmit an uplink channel including a demodulation reference signal (DM-RS) on a resource determined based on the slot configuration information, using frequency hopping on a first hop and a second hop,
   wherein the uplink channel is repeatedly transmitted in a first interval at the first hop and the uplink channel is repeatedly transmitted in a second interval at the second hop,
   wherein the first interval comprises first consecutive slots and the second interval comprises second consecutive slots, and
   wherein power consistency and phase continuity are maintained across the uplink channel repeatedly transmitted within each interval of the first interval and the second interval.

2. The terminal of claim 1,
   wherein a number of the first consecutive slots and a number of the second consecutive slots are received from a base station.

3. The terminal of claim 1,
   wherein each slot of the first consecutive slots has a same identification number, and
   wherein each slot of the second consecutive slots has a same identification number.

4. The terminal of claim 1,
   wherein the uplink channel at the first hop is transmitted on resources of a same number of physical resource blocks (PRBs) starting at a same PRB position in the frequency domain,
   wherein the uplink channel at the second hop is transmitted on resources of a same number of PRBs starting at a same PRB position in the frequency domain.

5. The terminal of claim 1,
   wherein the slot configuration information comprises information related to types of symbols of the resource.

6. The terminal of claim 1,
   wherein each slot of the first consecutive slots and each slot of the second consecutive slots includes at least one of an uplink symbol and a flexible symbol.

7. The terminal of claim 1,
   wherein the uplink channel is transmitted within a time domain window configured by a base station.

8. The terminal of claim 1,
   wherein the uplink channel is a physical uplink control channel (PUCCH) or a physical uplink shared channel (PUSCH).

9. A method performed by a terminal in a wireless communication system, the method comprising:
   receiving slot configuration information; and
   repeatedly transmitting an uplink channel including a demodulation reference signal (DM-RS) on a resource determined based on the slot configuration information, using frequency hopping on a first hop and a second hop,
   wherein the uplink channel is repeatedly transmitted in a first interval at the first hop and the uplink channel is repeatedly transmitted in a second interval at the second hop,
   wherein the first interval comprises first consecutive slots and the second interval comprises second consecutive slots,
   wherein power consistency and phase continuity are maintained across the uplink channel repeatedly transmitted within each interval of the first interval and the second interval.

10. The method of claim 9,
    wherein a number of the first consecutive slots and a number of the second consecutive slots are received from a base station.

11. The method of claim 9,
    wherein each slot of the first consecutive slots has a same identification number, and
    wherein each slot of the second consecutive slots has a same identification number.

12. The method of claim 9,
    wherein the uplink channel at the first hop is transmitted on resources of a same number of physical resource blocks (PRBs) starting at a same PRB position in the frequency domain,
    wherein the uplink channel at the second hop is transmitted on resources of a same number of PRBs starting at a same PRB position in the frequency domain.

13. The method of claim 9,
    wherein the slot configuration information comprises information related to types of symbols of the resource.

14. The method of claim 9,
    wherein each slot of the first consecutive slots and each slot of the second consecutive slots includes at least one of an uplink symbol and a flexible symbol.

15. The method of claim 9,
    wherein the uplink channel is transmitted within a time domain window configured by a base station.

16. The method of claim 9,
wherein the uplink channel is a physical uplink control channel (PUCCH) or a physical uplink shared channel (PUSCH).

17. A base station for performing wireless communication in a wireless communication system, the base station comprising:
a transceiver; and
a processor configured to control the transceiver,
wherein the processor is configured to:
transmit slot configuration information,
repeatedly receive an uplink channel including a demodulation reference signal (DM-RS) on a resource determined based on the slot configuration information, using frequency hopping on a first hop and a second hop,
wherein the uplink channel is repeatedly received in a first interval at the first hop and the uplink channel is repeatedly received in a second interval at the second hop,
wherein the first interval comprises first consecutive slots and the second interval comprises second consecutive slots,
wherein power consistency and phase continuity are maintained across the uplink channel repeatedly transmitted within each interval of the first interval and the second interval.

18. The base station of claim 17,
wherein each slot of the first consecutive slots has a same identification number, and
wherein each slot of the second consecutive slots has a same identification number.

19. The base station of claim 17,
wherein the uplink channel at the first hop is transmitted on resources of a same number of physical resource blocks (PRBs) starting at a same PRB position in the frequency domain,
wherein the uplink channel at the second hop is transmitted on resources of a same number of PRBs starting at a same PRB position in the frequency domain.

20. A method performed by a base station in a wireless communication system, the method comprising:
transmitting slot configuration information; and
repeatedly receiving an uplink channel including a demodulation reference signal (DM-RS) on a resource determined based on the slot configuration information, using frequency hopping on a first hop and a second hop,
wherein the uplink channel is repeatedly received in a first interval at the first hop and the uplink channel is repeatedly transmitted in a second interval at the second hop,
wherein the first interval comprises first consecutive slots and the second interval comprises second consecutive slots,
wherein power consistency and phase continuity are maintained across the uplink channel repeatedly transmitted within each interval of the first interval and the second interval.

\* \* \* \* \*